(12) United States Patent
Fukushima et al.

(10) Patent No.: US 11,196,343 B2
(45) Date of Patent: Dec. 7, 2021

(54) DC-DC CONVERTER

(71) Applicant: Rohm Co., Ltd., Kyoto (JP)

(72) Inventors: Shun Fukushima, Kyoto (JP); Yuhei Yamaguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/073,721

(22) Filed: Oct. 19, 2020

(65) Prior Publication Data

US 2021/0036616 A1      Feb. 4, 2021

Related U.S. Application Data

(63) Continuation of application No. 15/916,350, filed on Mar. 9, 2018, now Pat. No. 10,892,681.

(30) Foreign Application Priority Data

| Mar. 10, 2017 | (JP) | 2017-046183 |
| Mar. 10, 2017 | (JP) | 2017-046185 |
| Mar. 10, 2017 | (JP) | 2017-046187 |
| Mar. 10, 2017 | (JP) | 2017-046190 |
| Mar. 10, 2017 | (JP) | 2017-046195 |
| Feb. 13, 2018 | (JP) | 2018-023007 |

(51) Int. Cl.
| *H02M 3/158* | (2006.01) |
| *H02M 1/32*  | (2007.01) |
| *H02M 3/156* | (2006.01) |
| *H02M 1/08*  | (2006.01) |
| *H02M 1/00*  | (2006.01) |

(52) U.S. Cl.
CPC ............ *H02M 3/158* (2013.01); *H02M 1/08* (2013.01); *H02M 1/32* (2013.01); *H02M 3/156* (2013.01); *H02M 1/0009* (2021.05); *H02M 1/0025* (2021.05); *H02M 1/0035* (2021.05); *Y02B 70/10* (2013.01)

(58) Field of Classification Search
CPC ...... H02M 3/158; H02M 3/157; H02M 3/156; H02M 1/08; H02M 1/32; H02M 2001/009; H02M 2001/0025; H02M 2001/35; Y02B 70/10
See application file for complete search history.

(56) References Cited

U.S. PATENT DOCUMENTS

| 5,717,322 A  | 2/1998  | Hawkes et al. |
| 9,819,268 B2 | 11/2017 | Thomas |

(Continued)

FOREIGN PATENT DOCUMENTS

| JP | 2004-304871 | 10/2004 |
| JP | 2013-121174 | 6/2013 |

OTHER PUBLICATIONS

Communication Pursuant to Article 94(3) EPC issued in European Application 18160846.4 dated May 11, 2020.

(Continued)

*Primary Examiner* — Adolf D Berhane
(74) *Attorney, Agent, or Firm* — Fish & Richardson P.C.

(57) ABSTRACT

A DC-DC converter generates an output voltage from an input voltage through current-mode control output feedback control using a current sense signal commensurate with a sampled value obtained by sampling a coil current in a switching output stage, for example, at the midpoint of the ON period or the OFF period of the switching output stage.

11 Claims, 36 Drawing Sheets

(56) References Cited

U.S. PATENT DOCUMENTS

| | | |
|---|---|---|
| 10,892,681 B2 * | 1/2021 | Fukushima ............. H02M 1/08 |
| 2011/0211377 A1 | 9/2011 | Uno |
| 2012/0200277 A1 | 8/2012 | Silva et al. |
| 2014/0191743 A1 | 7/2014 | O'Driscoll |
| 2014/0292288 A1 | 10/2014 | Yan |
| 2014/0369097 A1 | 12/2014 | Prescott et al. |
| 2016/0164407 A1 | 6/2016 | Wu et al. |
| 2020/0161973 A1 * | 5/2020 | Fukushima ........... H03F 1/0205 |

OTHER PUBLICATIONS

European Patent Office, Extended EP Search Report, Office Action in EP application No. 18160846,4 (dated Jul. 17, 2018).

European Patent Office; Communication mailed in European Application No. 18 160 846.4 (dated May 15, 2019).

Yan et al., "I2 Average Current Mode Control for Switching Converters," IEEE Transactions on Power Electronics, vol. 29, No. 4, Apr. 2014, pp. 2027-2036.

* cited by examiner

DC-DC CONVERTER

CROSS-REFERENCE TO RELATED APPLICATIONS

This application is a continuation of U.S. patent application Ser. No. 15/916,350, filed Mar. 9, 2018, which claims priority to Japanese Patent Applications listed below, the entire contents of which are hereby incorporated by reference.

(1) No. 2017-46183 filed on Mar. 10, 2017
(2) No. 2017-46185 filed on Mar. 10, 2017
(3) No. 2017-46187 filed on Mar. 10, 2017
(4) No. 2017-46190 filed on Mar. 10, 2017
(5) No. 2017-46195 filed on Mar. 10, 2017
(6) No. 2018-23007 filed on Feb. 13, 2018

BACKGROUND OF THE INVENTION

Field of the Invention

The invention disclosed in this specification relates to a DC-DC converter.

Description of Related Art

Conventionally, a DC-DC converter (so-called switching power supply), which generates a desired output voltage from an input voltage by turning on and off an output transistor, is used as power supply means for various applications.

Note that as examples of a conventional technique related to the above description, there are publications such as JP-A-2004-304871 and JP-A-2013-121174.

As an output feedback control method for a DC-DC converter, a current-mode control method is widely and generally known, in which both an output voltage and a coil current are detected so as to perform the output feedback control. However, in a conventional current-mode control method (peak value detection type or bottom value detection type), the average coil current varies depending on input and output conditions, and hence operations of the DC-DC converter (such as overcurrent protection operation and light load detection operation) may be badly affected.

SUMMARY OF THE INVENTION

In view of the above-mentioned problem found by the inventors of this application, it is an object of the invention disclosed in this specification to provide a DC-DC converter that can maintain an average value of the coil current at a constant value without depending on the input and output conditions.

Accordingly, a DC-DC converter disclosed in this specification is arranged to sample coil current of a switching output stage at the midpoint of an ON period or an OFF period of the switching output stage, and to perform current-mode control output feedback control using a current sense signal commensurate with the sampled value, so as to generate a desired output voltage from an input voltage.

In addition, the DC-DC converter disclosed in this specification includes a comparator arranged to compare a first analog signal with a first ramp signal so as to generate a control signal for a switching output stage, a current detecting portion arranged to sample coil current of the switching output stage at a timing corresponding to a timing control signal so as to generate a current sense signal, and a timing control unit arranged to generate the timing control signal so that the coil current is sampled at the midpoint of an ON period or an OFF period of the switching output stage using a second ramp signal having a slew rate that is twice that of the first ramp signal, in which the DC-DC converter performs current-mode control output feedback control using the current sense signal, so as to generate a desired output voltage from an input voltage.

In addition, the DC-DC converter disclosed in this specification includes a comparator arranged to compare a first analog signal with a ramp signal so as to generate a control signal for a switching output stage, a current detecting portion arranged to sample coil current of the switching output stage at a timing corresponding to a timing control signal so as to generate a current sense signal, an average value generation portion arranged to generate a second analog signal having a simple average value of a signal value of the first analog signal and a start point value or an end point value of the ramp signal, and a timing control unit arranged to generate the timing control signal so that the coil current is sampled at the midpoint of an ON period or an OFF period of the switching output stage using the ramp signal and the second analog signal, in which the DC-DC converter performs current-mode control output feedback control using the current sense signal, so as to generate a desired output voltage from an input voltage.

In addition, the DC-DC converter disclosed in this specification includes a comparator arranged to compare a first analog signal with a first ramp signal so as to generate a control signal for a switching output stage, a current detecting portion arranged to sample coil current of the switching output stage at a timing corresponding to a timing control signal so as to generate a current sense signal, an average value generation portion arranged to generate a second analog signal having a weighted average value of a signal value of the first analog signal and a start point value or an end point value of the first ramp signal, and a timing control unit arranged to generate the timing control signal so that the coil current is sampled at the midpoint of an ON period or an OFF period of the switching output stage using a second ramp signal having a slew rate different from that of the first ramp signal and the second analog signal, in which the DC-DC converter performs current-mode control output feedback control using the current sense signal, so as to generate a desired output voltage from an input voltage.

In addition, the DC-DC converter disclosed in this specification includes an oscillator arranged to generate a ramp signal of a triangular waveform having the same slew rate for upward and downward changes, a comparator arranged to compare an analog signal with the ramp signal so as to generate a control signal for a switching output stage, a current detecting portion arranged to sample coil current of the switching output stage at a timing corresponding to a timing control signal so as to generate a current sense signal, and a timing control unit arranged to generate the timing control signal so that the coil current is sampled at a timing when the ramp signal has a peak value or a bottom value, in which the DC-DC converter performs current-mode control output feedback control using the current sense signal, so as to generate a desired output voltage from an input voltage.

In addition, the DC-DC converter disclosed in this specification includes an oscillator arranged to generate a ramp signal and an inverted ramp signal of sawtooth waveforms that repeat increase or decrease and reset at the same switching period with opposite polarities, a first comparator and a second comparator arranged to compare an analog signal with the ramp signal and the inverted ramp signal so as to generate a first comparison signal and a second comparison signal, respectively, a logical arithmetic unit arranged to generate a control signal for a switching output stage by logical operation using the first comparison signal and the second comparison signal, a current detecting portion arranged to sample coil current of the switching output stage at a timing corresponding to a timing control signal so as to generate a current sense signal, and a timing control unit arranged to generate the timing control signal so that the coil current is sampled at a reset timing of the ramp signal and the inverted ramp signal, in which the DC-DC converter performs current-mode control output feedback control using the current sense signal, so as to generate a desired output voltage from an input voltage.

In addition, the DC-DC converter disclosed in this specification includes a current detecting portion arranged to sample coil current at a timing corresponding to a timing control signal so as to generate a current sense signal, and a timing control unit arranged to generate the timing control signal so that the coil current is sampled at the midpoint of an OFF period of the switching output stage using a first internal signal and a second internal signal generated by itself in synchronization with ON/OFF control of the switching output stage, in which the DC-DC converter performs current-mode control output feedback control using the current sense signal, so as to generate a desired output voltage from an input voltage.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

First Embodiment

Figure 1:
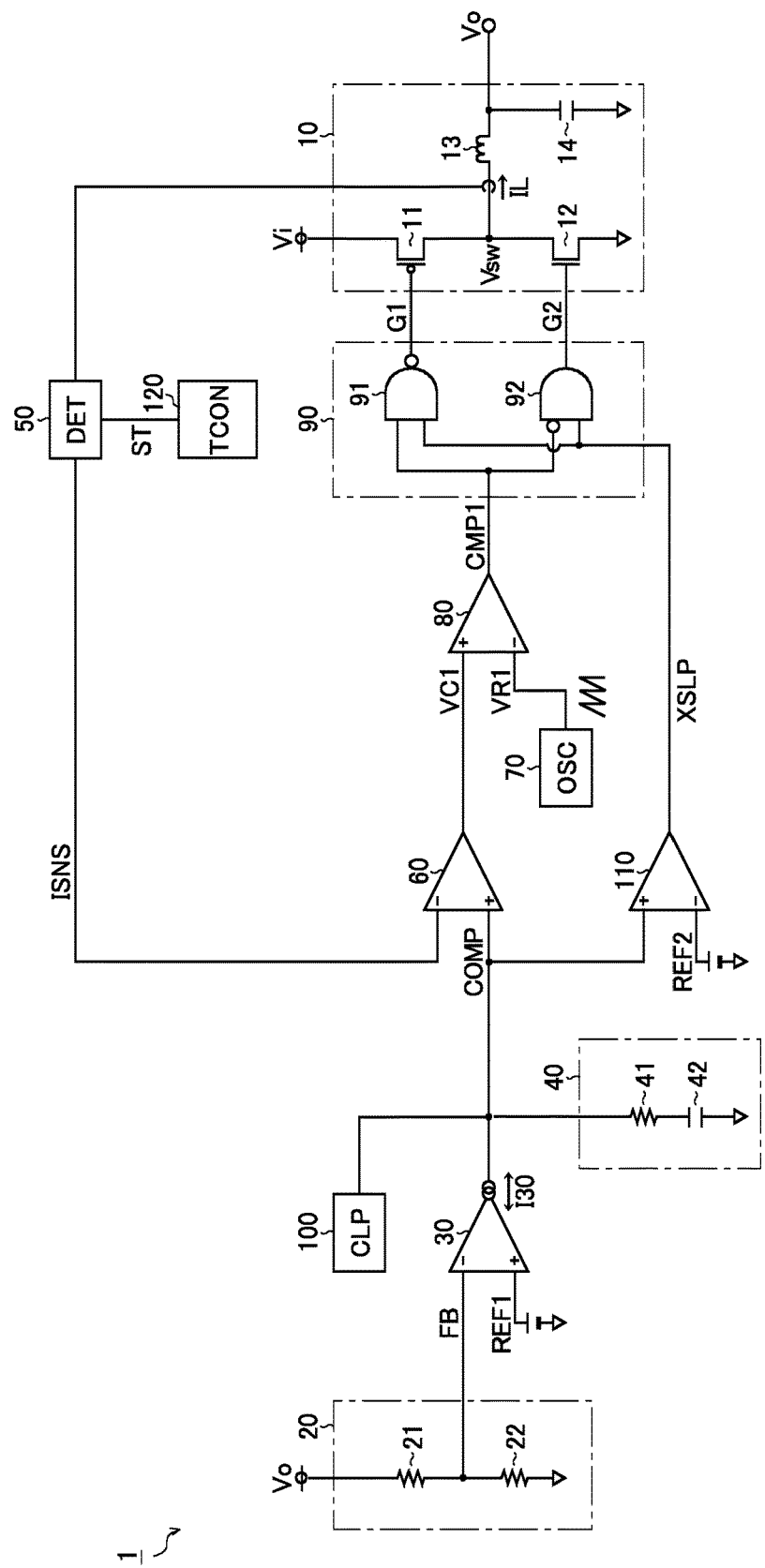
FIG. 1 is a diagram showing a first embodiment of a DC-DC converter.

FIG. 1 is a circuit diagram showing a first embodiment of a DC-DC converter. A DC-DC converter 1 of this embodiment is a step-down type switching power supply that generates a desired output voltage Vo from an input voltage Vi and supplies it to a load (not shown) such as a central processing unit (CPU). The DC-DC converter 1 includes a switching output stage 10, a feedback voltage generating portion 20, an error amplifier 30, a phase compensation portion 40, a current detecting portion 50, a differential amplifier 60, an oscillator 70, a pulse width modulation (PWM) comparator 80, a driver 90, a damper 100, a light load detection comparator 110, and a timing control unit 120.

Note that the DC-DC converter 1 may appropriately include other protection circuits (such as an undervoltage protection circuit, an overvoltage protection circuit, and a temperature protection circuit) in addition to the circuit elements described above.

The switching output stage 10 is a step-down type that steps down the input voltage Vi so as to generate the desired output voltage Vo. The switching output stage 10 includes an output transistor 11 (P-channel metal oxide semiconductor field effect transistor (PMOSFET) in this diagram), a synchronous rectification transistor 12 (N-channel MOSFET (NMOSFET) in this diagram), a coil 13, and a capacitor 14.

The source of the output transistor 11 is connected to an application terminal of the input voltage Vi. The drain of the output transistor 11 is connected to a first terminal of the coil 13. The gate of the output transistor 11 is connected to an application terminal of a gate signal G1. The output transistor 11 is turned off when the gate signal G1 is at high level and is turned on when the gate signal G1 is at low level.

The source of the synchronous rectification transistor 12 is connected to a ground terminal (i.e. an application terminal of a ground voltage GND). The drain of the synchronous rectification transistor 12 is connected to the first terminal of the coil 13. The gate of the synchronous rectification transistor 12 is connected to an application terminal of a gate signal G2. The synchronous rectification transistor 12 is turned on when the gate signal G2 is at high level and is turned off when the gate signal G2 is at low level.

Note that if the switching output stage 10 is applied with a high voltage, it is preferred to use a high withstand voltage element such as a power MOSFET, an insulated gate bipolar transistor (IGBT), or a SiC transistor as each of the output transistor 11 and the synchronous rectification transistor 12.

The output transistor 11 and the synchronous rectification transistor 12 are turned on and off in a complementary manner according to the gate signals G1 and G2. This turning on and off operation generates a switch voltage Vsw of a rectangular wave pulse-driven between the input voltage Vi and the ground voltage GND at the first terminal of the coil 13. Note that the above language "in a complementary manner" includes not only a case where on/off states of the output transistor 11 and the synchronous rectification transistor 12 are completely reversed but also a case where there is a simultaneous OFF period (dead time) of both the transistors.

In addition, when integrating structural elements of the DC-DC converter 1 is into an IC, the output transistor 11 and the synchronous rectification transistor 12 may be incorporated in the IC or may be externally connected to the IC. In addition, the output transistor 11 may be replaced with an MOSFET. However, in that case, it is necessary to use a bootstrap circuit or the like so that the high level of the gate signal G1 becomes higher than the input voltage Vi. In addition, it is also possible to use a rectifying diode instead of the synchronous rectification transistor 12.

The coil 13 and the capacitor 14 constitute an LC filter that rectifies and smooths the switch voltage Vsw so as to generate the output voltage Vo. Note that as described above, the first terminal of the coil 13 is connected to the rains of the output transistor 11 and the synchronous rectification transistor 12 (i.e. the application terminal of the switch voltage Vsw). A second terminal of the coil 13 and a first terminal of the capacitor 14 are both connected to the application terminal of the output voltage Vo. A second terminal of the capacitor 14 is connected to the ground terminal.

The feedback voltage generating portion 20 includes resistors 21 and 22 connected in series between the application terminal of the output voltage Vo and the ground terminal and outputs a feedback voltage FB corresponding to the output voltage Vo from a connection node between the resistors (divided voltage of the output voltage Vo). Note that if the output voltage Vo is within an input dynamic range of the error amplifier 30, the feedback voltage generating portion 20 may be eliminated so that the output voltage Vo is directly input to the error amplifier 30.

The error amplifier 30 is a current output type transconductance amplifier (so-called gm amplifier) and generates an error current signal 130 corresponding to a difference between the feedback voltage FB input to an inverting input terminal (−) and a first reference voltage REF1 input to a noninverting input terminal (+) (i.e. corresponding to a target set value of the output voltage Vo). The error current signal 130 flows in a positive direction (i.e. direction from the error amplifier 30 to the phase compensation portion 40) when the feedback voltage FB is lower than the first reference voltage REF1, while it flows in a negative direction (i.e. direction from the phase compensation portion 40 to the error amplifier 30) when the feedback voltage FB is higher than the first reference voltage REF1.

The phase compensation portion 40 includes a resistor 41 and a capacitor 42 connected in series between the output terminal of the error amplifier 30 and the ground terminal, and generates an error voltage signal COMP when receiving an input of the error current signal 130. Note that by appropriately setting a resistance value of the resistor 41 and a capacitance value of the capacitor 42, a phase of the error voltage signal COMP is compensated so that oscillation in an output feedback loop can be prevented.

The current detecting portion 50 samples coil current IL flowing in the coil 13 at timing corresponding to a timing control signal ST, so as to generate a current sense signal ISNS commensurate with the sampled value. The current sense signal ISNS is, for example, a voltage signal that has a higher value as the sampled value of the coil current IL is larger, and has a lower value as the sampled value of the coil current IL is smaller on the contrary.

The differential amplifier 60 generates a first analog signal VC1 corresponding to a difference between the error voltage signal COMP input to the noninverting input terminal (+) and the current sense signal ISNS input to the inverting input terminal (−). The first analog signal VC1 becomes lower as the current sense signal ISNS is higher, while it becomes higher as the current sense signal ISNS is lower. In other words, the first analog signal VC1 becomes lower as the coil current IL is larger, while it becomes higher as the coil current IL is smaller. Thus, in the DC-DC converter 1 of this embodiment, the current-mode control method is adopted, in which both the output voltage Vo and the coil current IL are detected so as to perform the output feedback control.

The oscillator 70 generates a first ramp signal VR1 of a ramp waveform (a sawtooth waveform in this embodiment) that is pulse-driven at a predetermined switching period T (i.e. at a predetermined switching frequency fsw (=1/T)).

The PWM comparator 80 compares the first analog signal VC1 input to the noninverting input terminal (+) with the first ramp signal VR1 input to the inverting input terminal (−) so as to generate a first comparison signal CMP1 (i.e. corresponding to a control signal for the switching output stage 10). The first comparison signal CMP1 becomes high level when the first analog signal VC1 is higher than the first ramp signal VR1, while it becomes low level when the first analog signal VC1 is lower than the first ramp signal VR1. In other words, an on-duty ratio Don of the switching output stage 10 (=ton/T, i.e. a ratio of an ON period ton to the switching period T) becomes larger as the first analog signal VC1 is higher, while it becomes smaller as the first analog signal VC1 is lower on the contrary.

The driver 90 includes a NAND gate 91 and an AND gate 92, and it generates the gate signals G1 and G2 (i.e. corresponding to drive signals for the switching output stage 10) responding to the first comparison signal CMP1. Specifically, the NAND gate 91 outputs a NAND signal of a sleep control signal XSLP and the first comparison signal CMP1, as the gate signal G1. In addition, the AND gate 92 outputs an AND signal of the sleep control signal XSLP and an inverted input of the first comparison signal CMP1, as the gate signal G2.

Therefore, when the sleep control signal XSLP is at high level (i.e. a logical level when waking up), the gate signals G1 and G2 basically become logically inverted signals of the first comparison signal CMP1. More specifically, when the first comparison signal CMP1 is at high level, both the gate signals G1 and G2 become low level, and hence the output transistor 11 is turned on while the synchronous rectification transistor 12 is turned off. On the contrary, when the first comparison signal CMP1 is at low level, both the gate signals G1 and G2 become high level, and hence the output transistor 11 is turned off while the synchronous rectification transistor 12 is turned on.

On the other hand, when the sleep control signal XSLP is at low level (i.e. a logical level when sleeping), the gate signal G1 becomes high level regardless of the first comparison signal CMP1, and the gate signal G2 becomes low level regardless of the first comparison signal CMP1. Therefore, both the output transistor 11 and the synchronous rectification transistor 12 are turned off.

In this way, the DC-DC converter 1 of this embodiment has a function of turning off both the output transistor 11 and the synchronous rectification transistor 12 so as to switch to a sleep mode (i.e. an output stop state) when the sleep control signal XSLP is at low level.

The damper 100 limits the error voltage signal COMP to be a predetermined upper limit value or lower, or to be a predetermined lower limit value or higher, so as to perform overcurrent protection (OCP) or negative current protection (NCP) of the coil current IL (thus, load current flowing in the load).

As also described above, in the DC-DC converter 1 of this embodiment, the current sense signal ISNS corresponding to the coil current IL is fed back and input to the differential amplifier 60. Therefore, when the error voltage signal COMP is increased, the coil current IL is increased, while when the error voltage signal COMP is decreased, the coil current IL is decreased. In this way, the amplitude of the coil current IL can be controlled according to the error voltage signal COMP.

On the contrary, when the coil current IL is increased, the on-duty ratio Don is decreased, and hence the output voltage Vo is decreased so that the error voltage signal COMP is increased. When the coil current IL is decreased, the on-duty ratio Don is increased, and hence the output voltage Vo is increased so that the error voltage signal COMP is decreased. In other words, it can be said that the error voltage signal COMP has information about the amplitude of the coil current IL (current value). Therefore, by using the damper 100 to limit the error voltage signal COMP, it is possible to indirectly limit the coil current IL.

The light load detection comparator 110 compares the error voltage signal COMP input to the noninverting input terminal (+) with a second reference voltage REF2 (i.e. corresponding to the light load detection threshold value) input to the inverting input terminal (−), so as to generate the sleep control signal XSLP. The sleep control signal XSLP becomes high level (i.e. a logical level when waking up) when the error voltage signal COMP is higher than the second reference voltage REF2, while it becomes low level (i.e. a logical level when sleeping) when the error voltage signal COMP is lower than the second reference voltage REF2.

In this way, the sleep control signal XSLP becomes low level when the coil current IL (i.e. the load current) is deceased until the error voltage signal COMP becomes lower than the second reference voltage REF2. Therefore, when the DC-DC converter 1 is in a light load state, the switching operation of the switching output stage 10 is stopped, and hence efficiency in a light load state can be largely improved.

The timing control unit 120 generates the timing control signal ST for determining sampling timing of the coil current IL in the current detecting portion 50. Next, an operational example of the timing control unit 120 (generation method of the timing control signal ST) is described in detail.

<Timing Control Unit>

Figure 2:
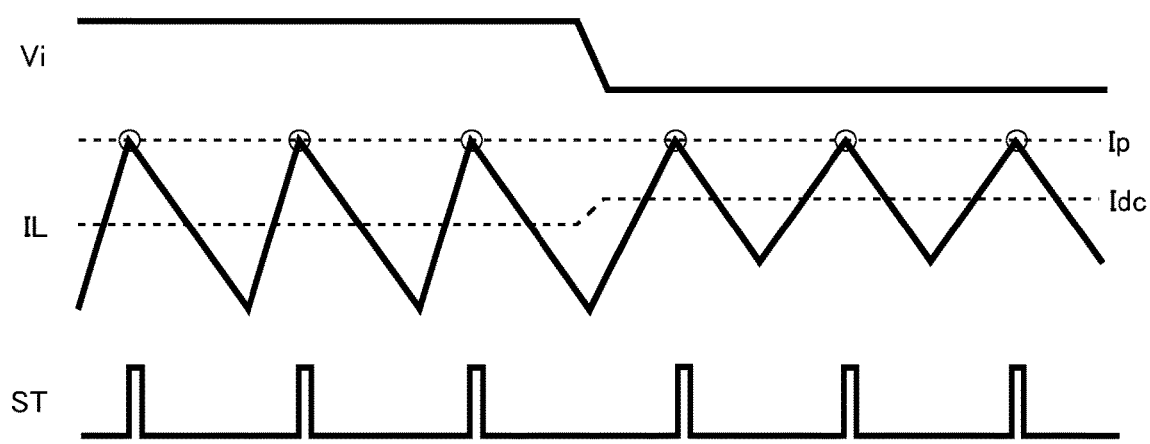
FIG. 2 is a diagram showing a first operational example (peak value detection type) of a timing control unit.

FIG. 2 is a waveform diagram showing a first operational example (peak value detection type) of the timing control unit 120, in which the input voltage Vi, the coil current IL, and the timing control signal ST are shown in order from upper to lower. In the first operational example of this diagram, the timing control signal ST is generated so that a peak value Ip (the maximum value) of the coil current IL is sampled. Therefore, the DC-DC converter 1 performs output feedback control so as to maintain the peak value Ip of the coil current IL at a constant value.

Figure 3:
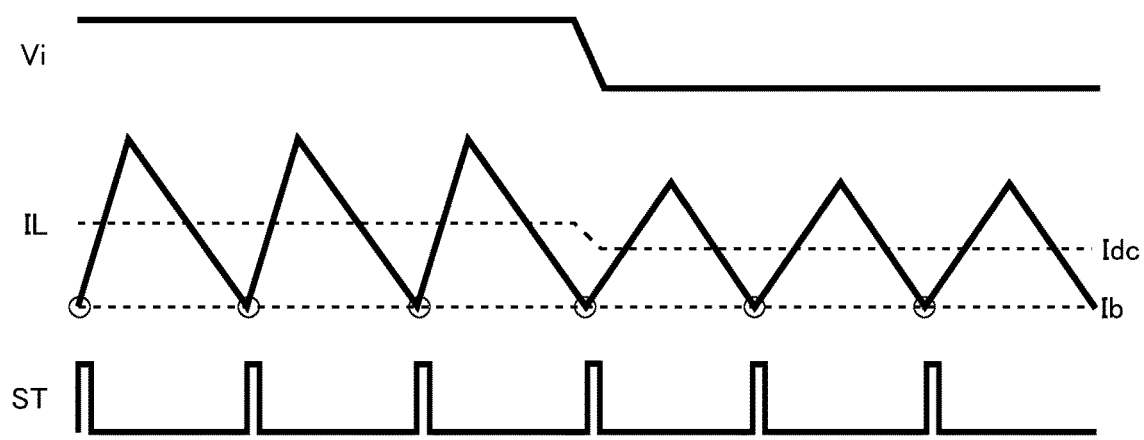
FIG. 3 is a diagram showing a second operational example (bottom value detection type) of the timing control unit.

FIG. 3 is a waveform diagram showing a second operational example (bottom value detection type) of the timing control unit 120, in which the input voltage Vi, the coil current IL, and the timing control signal ST are shown in order from upper to lower in the same manner as FIG. 2 described above. In the second operational example of this diagram, the timing control signal ST is generated so that a bottom value Ib (the minimum value) of the coil current IL is sampled. Therefore, the DC-DC converter 1 performs the output feedback control so as to maintain the bottom value Ib of the coil current IL at a constant value.

In this way, general current-mode control methods are classified into the peak value detection type (FIG. 2) and the bottom value detection type (FIG. 3) according to the sampling timing of the coil current IL. However, in these control methods, when a ripple component of the coil current IL varies according to a variation of the input voltage Vi, for example, average coil current Idc when maintaining the error voltage signal COMP at a constant value (i.e. corresponding to a DC component of the coil current Idc) is varied. As a result, a threshold value for the overcurrent protection operation or the light load detection operation is varied according to input and output conditions, and hence it becomes difficult to design the application. In the following description, a countermeasure thereto is described.

Figure 4:
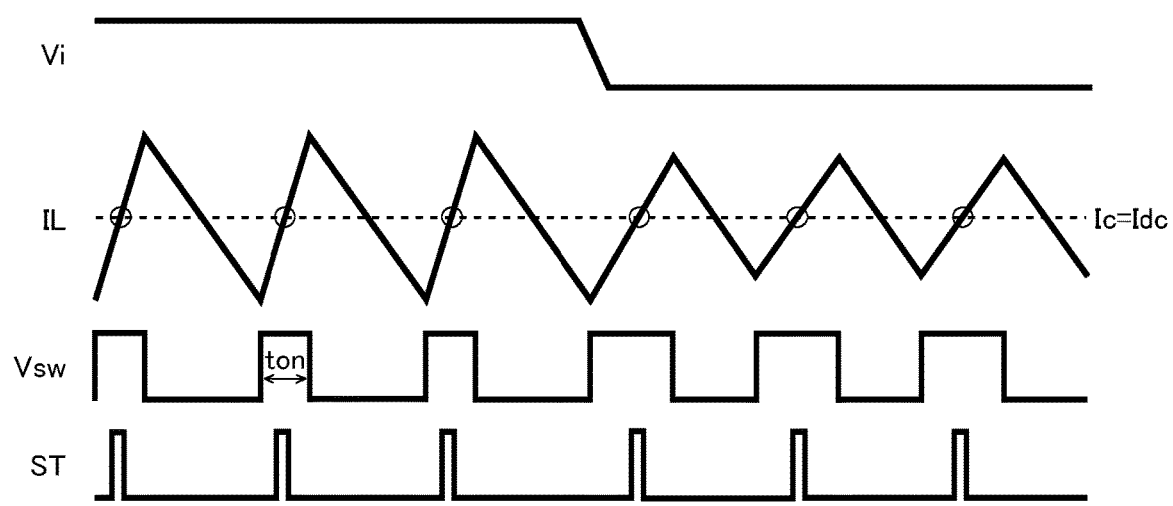
FIG. 4 is a diagram showing a third operational example (ON period center value detection type) of the timing control unit.

FIG. 4 is a waveform diagram showing a third operational example (ON period center value detection type) of the timing control unit 120, in which the input voltage Vi, the coil current IL, the switch voltage Vsw, and the timing control signal ST are shown in order from upper to lower. In the third operational example of this diagram, the timing control signal ST is generated so that a center value Ic of the coil current IL is sampled at the midpoint of the ON period ton of the switching output stage 10 (corresponding to a period in which the output transistor 11 is turned on while the synchronous rectification transistor 12 is turned off, i.e.

a high level period of the switch voltage Vsw). Therefore, the DC-DC converter 1 performs the output feedback control so that the center value Ic of the coil current IL is maintained at a constant value.

Further, the center value Ic of the coil current IL is equal to the average coil current Idc described above (thus, the load current). Therefore, by limiting the error voltage signal COMP to a predetermined upper limit value or lower, or by limiting the same to a predetermined lower limit value or higher, it is possible to perform overcurrent protection or negative current protection at a constant load current regardless of the input and output conditions. In addition, by stopping the switching operation of the switching output stage 10 at a time point when the error voltage signal COMP becomes lower than a predetermined threshold value, it is possible to switch to the sleep mode at a constant load current regardless of the input and output conditions.

Figure 5:
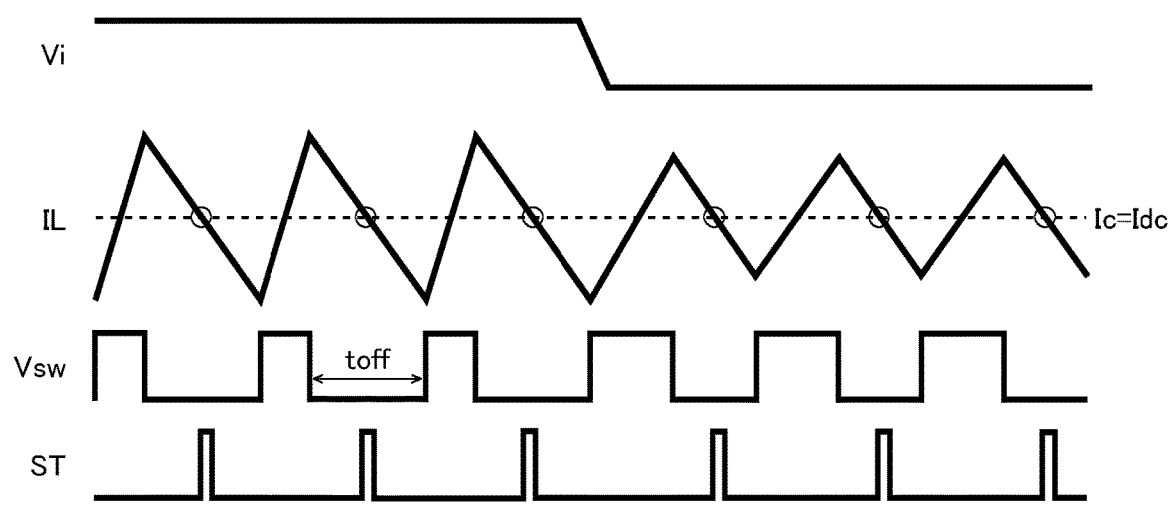
FIG. 5 is a diagram showing a fourth operational example (OFF period center value detection type) of the timing control unit.

FIG. 5 is a waveform diagram showing a fourth operational example (OFF period center value detection type) of the timing control unit 120, in which the input voltage Vi, the coil current IL, the switch voltage Vsw, and the timing control signal ST are shown in order from upper to lower in the same manner as FIG. 4 described above. The fourth operational example of this diagram generates the timing control signal ST so that the center value Ic of the coil current IL is sampled at the midpoint of an OFF period toff of the switching output stage 10 (corresponding to a period in which the output transistor 11 is turned off while the synchronous rectification transistor 12 is turned on, i.e. a low level period of the switch voltage Vsw). Therefore, in the same manner as the case of adopting the third operational example described above, the DC-DC converter 1 performs the output feedback control so that the center value Ic of the coil current IL is maintained at a constant value.

Note that when the ON period ton is short, it is difficult to complete the sampling of the coil current IL in this period, and therefore it is desired to set the sampling timing to be in the OFF period Toff. On the contrary, when the OFF period toff is short, sampling of the coil current IL should be performed in the ON period Ton.

Second Embodiment

Figure 6:
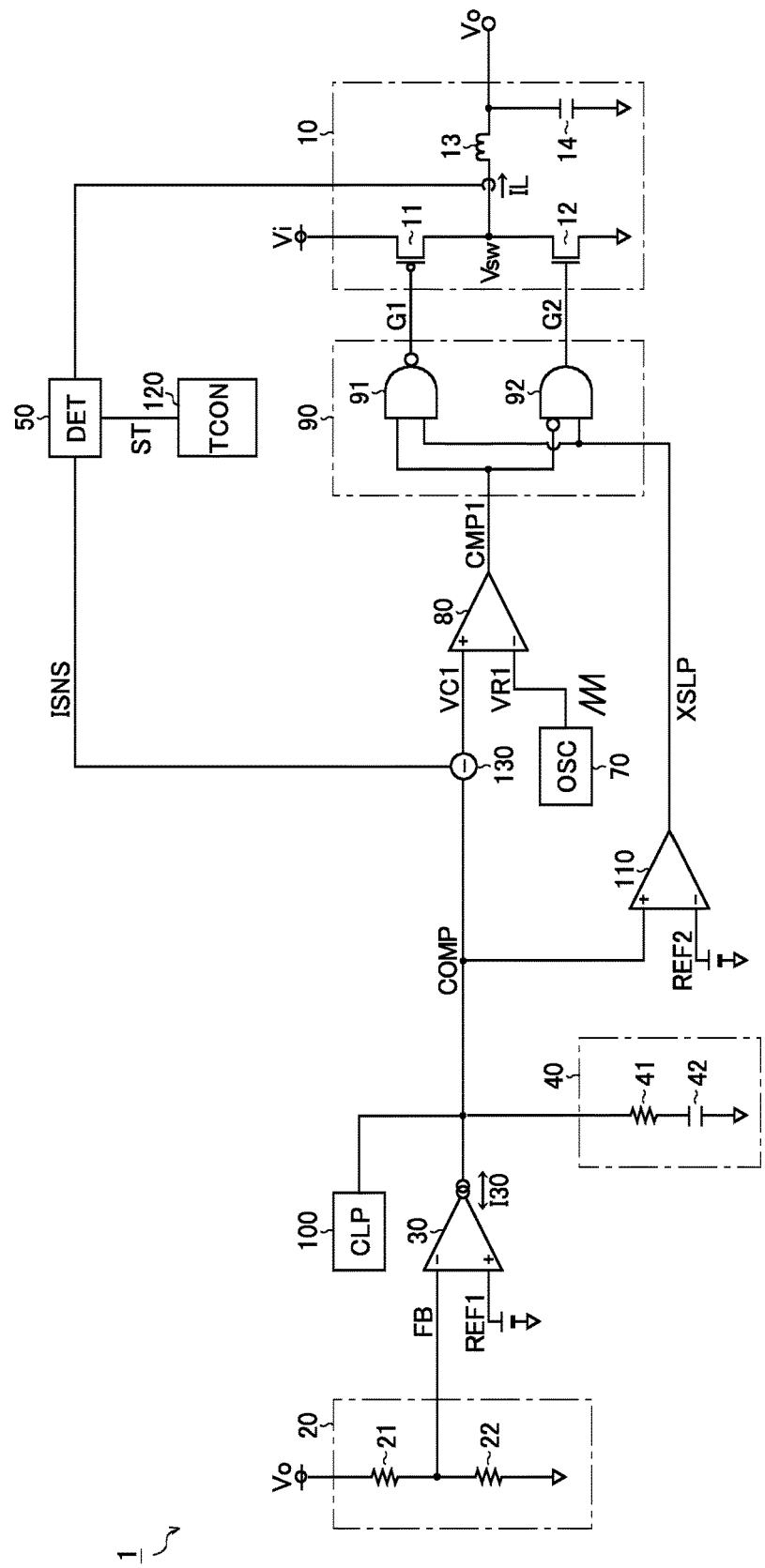
FIG. 6 is a diagram showing a second embodiment of the DC-DC converter.

FIG. 6 is a circuit diagram showing a third embodiment of the DC-DC converter. The DC-DC converter 1 of this embodiment is based on the first embodiment (FIG. 1) and is characterized in that it includes a computing unit 130 instead of the differential amplifier 60 so that the current sense signal ISNS is fed back and input to the computing unit 130 instead of the differential amplifier 60. Therefore the same structural element as the first embodiment is denoted by the same numeral or symbol as in FIG. 1 so that overlapping description is omitted, and a characterized part of the second embodiment is mainly described below.

The computing unit 130 performs a computing process between the error voltage signal COMP and the current sense signal ISNS (for example, a subtraction process in which the current sense signal ISNS is subtracted from the error voltage signal COMP), so as to generate the first analog signal VC (=COMP-ISNS).

In this way, when performing the current-mode control output feedback control, the current sense signal ISNS is subtracted from the error voltage signal COMP input to the noninverting input terminal (+) of the PWM comparator 80.

Third Embodiment

Figure 7:
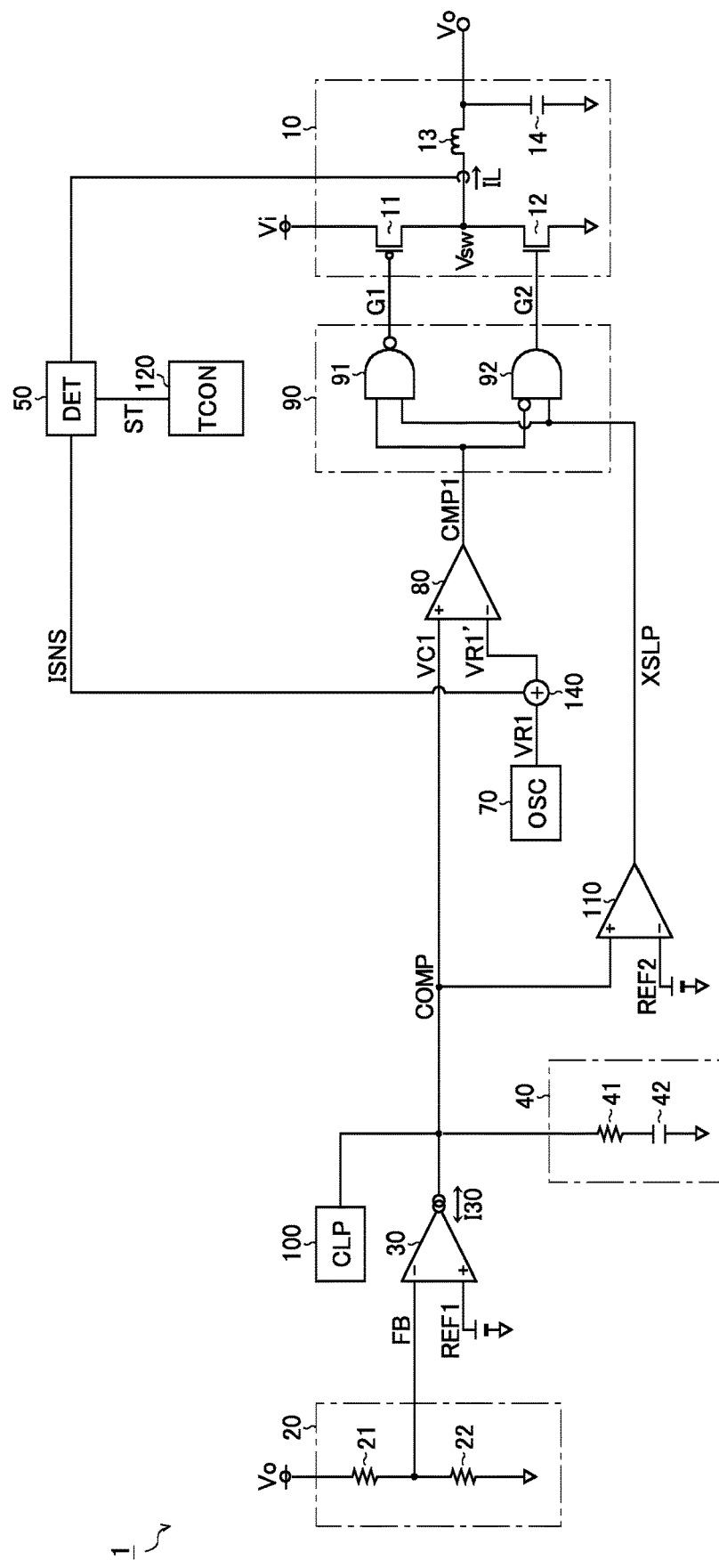
FIG. 7 is a diagram showing a third embodiment of the DC-DC converter.

FIG. 7 is a circuit diagram showing a third embodiment of the DC-DC converter. The DC-DC converter 1 of this embodiment is based on the second embodiment (FIG. 6) and is characterized in that it uses a computing unit 140 instead of the computing unit 130. Therefore the same structural element as in the second embodiment is denoted by the same numeral or symbol as in FIG. 6 so that overlapping description is omitted, and a characterized part of the third embodiment is mainly described below.

The computing unit 140 performs a computing process between the first ramp signal VR1 and the current sense signal ISNS (for example, an addition process of the first ramp signal VR1 and the current sense signal ISNS), so as to generate a first ramp signal after offset VR1' (=VR1+ISNS).

Along with the above-mentioned change, the PWM comparator 80 compares the first analog signal VC1 input to the noninverting input terminal (+) with the first ramp signal after offset VR1' input to the inverting input terminal (−) so as to generate the first comparison signal CMP1.

In this way, when performing the current-mode control output feedback control, the current sense signal ISNS may be added to the first ramp signal VR1 input to the inverting input terminal (−) of the PWM comparator 80.

Note that various variations can be considered as a method for realizing the current-mode control method in addition to the above description, but all of them are not described because of limited pages. For example, addition or subtraction is performed between the current sense signal and a signal having error information of the output voltage, and the result thereof is input to the amplifier or the comparator so as to perform the current-mode control output feedback control. Alternatively, a current sense signal or a signal obtained by performing a predetermined computing process (addition, subtraction, multiplication, or division) on the current sense signal and the signal having error information of the output voltage are input to the amplifier or the comparator so as to perform the current-mode control output feedback control.

In the embodiments described above, merits of adopting the current-mode control method of the center value detection type (FIGS. 4 and 5) are described. In the following embodiments, a timing control method for correctly detecting the center value Ic of the coil current IL is described in detail with specific examples.

Fourth Embodiment

Figure 8:
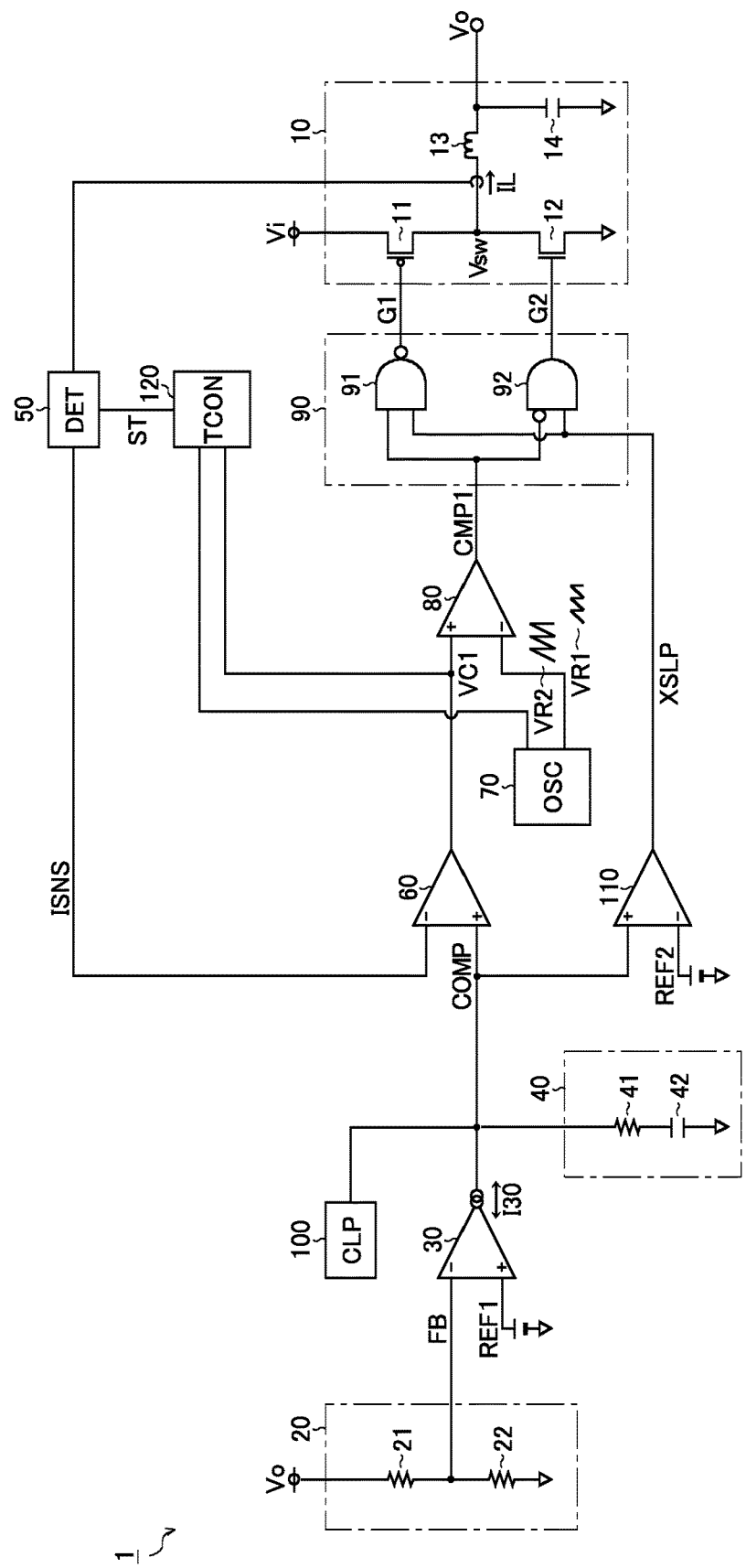
FIG. 8 is a diagram showing a fourth embodiment of the DC-DC converter.

FIG. 8 is a diagram showing a fourth embodiment of the DC-DC converter. The DC-DC converter 1 of this embodiment is based on the first embodiment (FIG. 1) and is characterized in that the first analog signal VC1 and a second ramp signal VR2 are used so as to generate the timing control signal ST. Therefore the same structural element as in the first embodiment is denoted by the same numeral or symbol as in FIG. 1 so that overlapping description is omitted, and a characterized part of the fourth embodiment is mainly described below.

In the DC-DC converter 1 of this embodiment, the oscillator 70 generates the first ramp signal VR1 and supplies it to the inverting input terminal (−) of the PWM comparator 80, while it generates the second ramp signal VR2 synchronizing with the first ramp signal VR1 and supplies it to the timing control unit 120. Note that the second ramp signal VR2 is a signal of a sawtooth waveform having a slew rate that is twice that of the first ramp signal VR1.

The timing control unit 120 uses both the first analog signal VC1 and the second ramp signal VR2, and generates the timing control signal ST so that the coil current IL is sampled at the midpoint of the ON period ton or the OFF period toff of the switching output stage 10. In the following description, a specific operational example of the timing control unit 120 is described in detail.

Figure 9:
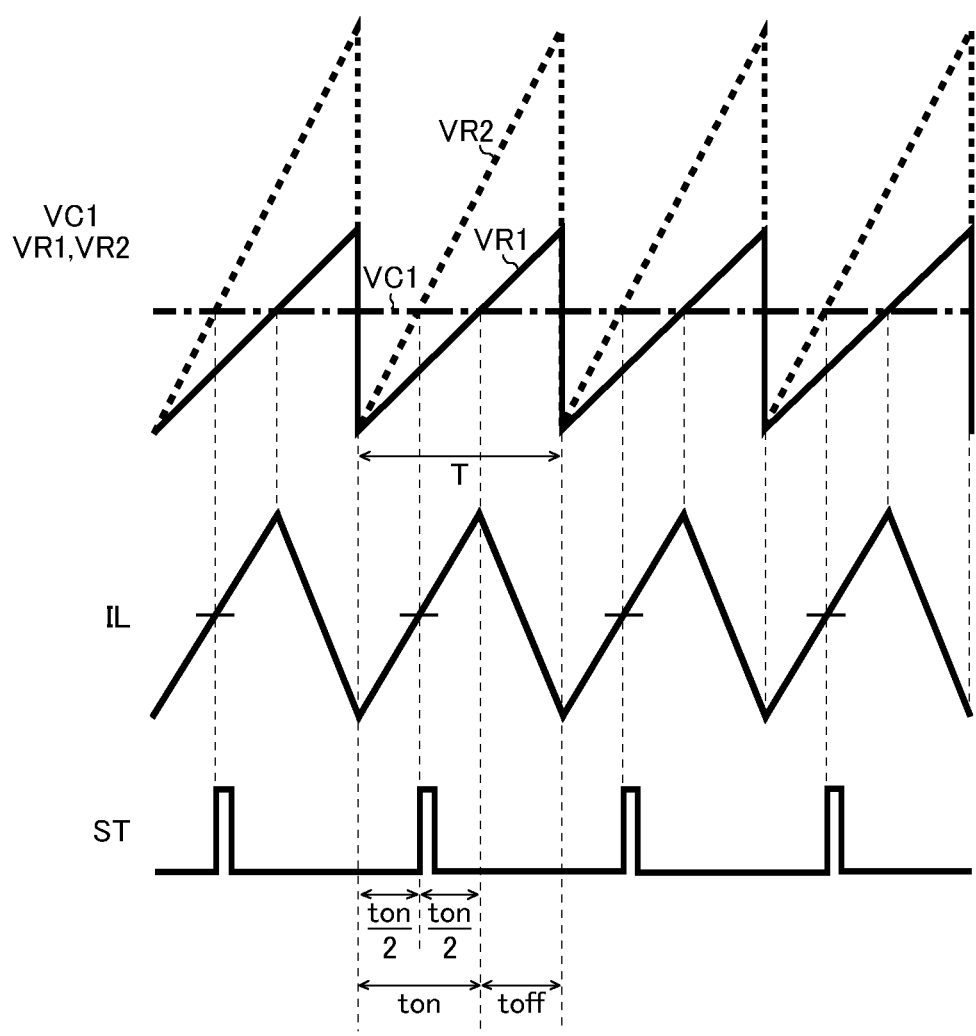
FIG. 9 is a diagram showing a first operational example of the timing control unit in the fourth embodiment.

FIG. 9 is a waveform diagram showing a first operational example of the timing control unit 120 in the fourth embodiment, in which the first analog signal VC1 (dot-dashed line), the first ramp signal VR1 (solid line), and the second ramp signal VR2 (broken line), the coil current IL, and the timing control signal ST are shown in order from upper to lower.

As shown in this diagram, each of the first ramp signal VR1 and the second ramp signal VR2 repeats to increase and reset at the same switching period T.

Note that when the first analog signal VC1 is higher than the first ramp signal VR1, the switching output stage 10 becomes the ON period ton, and the coil current IL is increased. On the other hand, when the first analog signal VC1 is lower than the first ramp signal VR1, the switching output stage 10 becomes the OFF period toff, and the coil current IL is decreased.

In other words, the on-duty ratio Don (=ton/T) of the switching output stage 10 becomes larger as the first analog signal VC1 is higher. On the contrary, the on-duty ratio Don of the switching output stage 10 becomes smaller as the first analog signal VC1 is lower.

The timing control unit 120 compares the first analog signal VC1 with the second ramp signal VR2 so as to generate the timing control signal ST. More specifically, the timing control unit 120 generates a one-shot pulse in the timing control signal ST at a timing when the second ramp signal VR2 is increased to cross the first analog signal VC1.

Note that as shown in this diagram, the timing when the second ramp signal VR2 and the first analog signal VC1 cross each other coincides with the midpoint of the ON period ton (i.e. the timing when ton/2 has elapsed after the coil current IL starts to increase).

Therefore, the current detecting portion 50 performs sampling of the coil current IL using the one-shot pulse of the timing control signal ST as a trigger, and hence can generate the current sense signal ISNS commensurate with the center value Ic of the coil current IL in the ON period ton.

Figure 10:
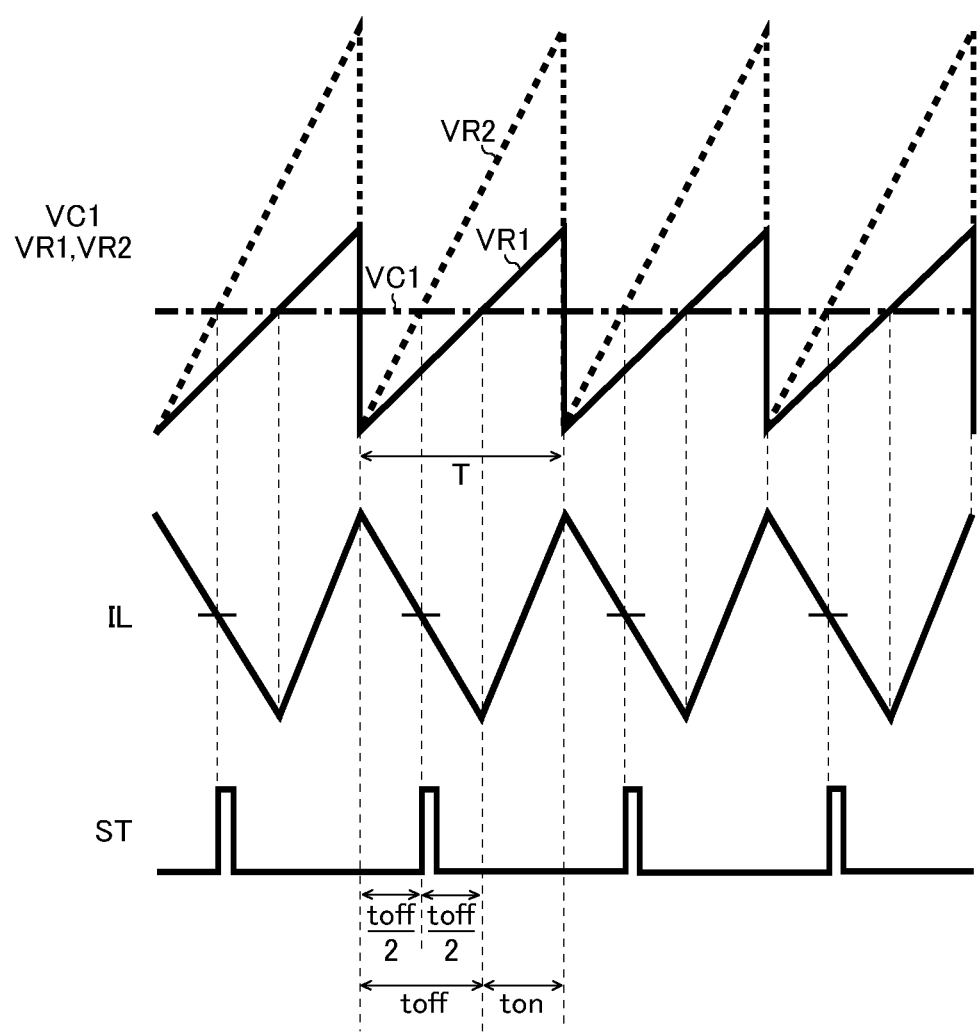
FIG. 10 is a diagram showing a second operational example of the timing control unit in the fourth embodiment.

FIG. 10 is a waveform diagram showing a second operational example of the timing control unit 120 according to the fourth embodiment, in which the first analog signal VC1 (dot-dashed line), the first ramp signal VR1 (solid line), and the second ramp signal VR2 (broken line), the coil current IL, and the timing control signal ST are shown in order from upper to lower in the same manner as FIG. 9 described above.

Also in the second operational example shown in this diagram, each of the first ramp signal VR1 and the second ramp signal VR2 repeats to increase and reset at the same switching period T. However, a relationship between the first analog signal VC1 and the on-duty ratio Don is opposite to that of the first operational example (FIG. 9).

Specifically, when the first analog signal VC1 is higher than the first ramp signal VR1, the switching output stage 10 becomes the OFF period toff, and the coil current IL is decreased. On the other hand, when the first analog signal VC1 is lower than the first ramp signal VR1, the switching output stage 10 becomes the ON period ton, and the coil current IL is increased.

In other words, as the first analog signal VC1 is higher, the on-duty ratio Don of the switching output stage 10 (=ton/T) becomes smaller. On the contrary, as the first analog signal VC1 is lower, the on-duty ratio Don of the switching output stage 10 becomes larger.

In order to realize this operation, the input polarity of the error amplifier 30 and the input polarity of the PWM comparator 80 should be inverted from those in FIG. 8, respectively, for example.

In the same manner as the first operational example (FIG. 9) described above, the timing control unit 120 compares the first analog signal VC1 with the second ramp signal VR2 so as to generate the timing control signal ST. More specifically, the timing control unit 120 generates a one-shot pulse in the timing control signal ST at a timing when the second ramp signal VR2 is increased to cross the first analog signal VC1.

Note that as shown in this diagram, the timing when the second ramp signal VR2 and the first analog signal VC1 cross each other coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff.

Figure 11:
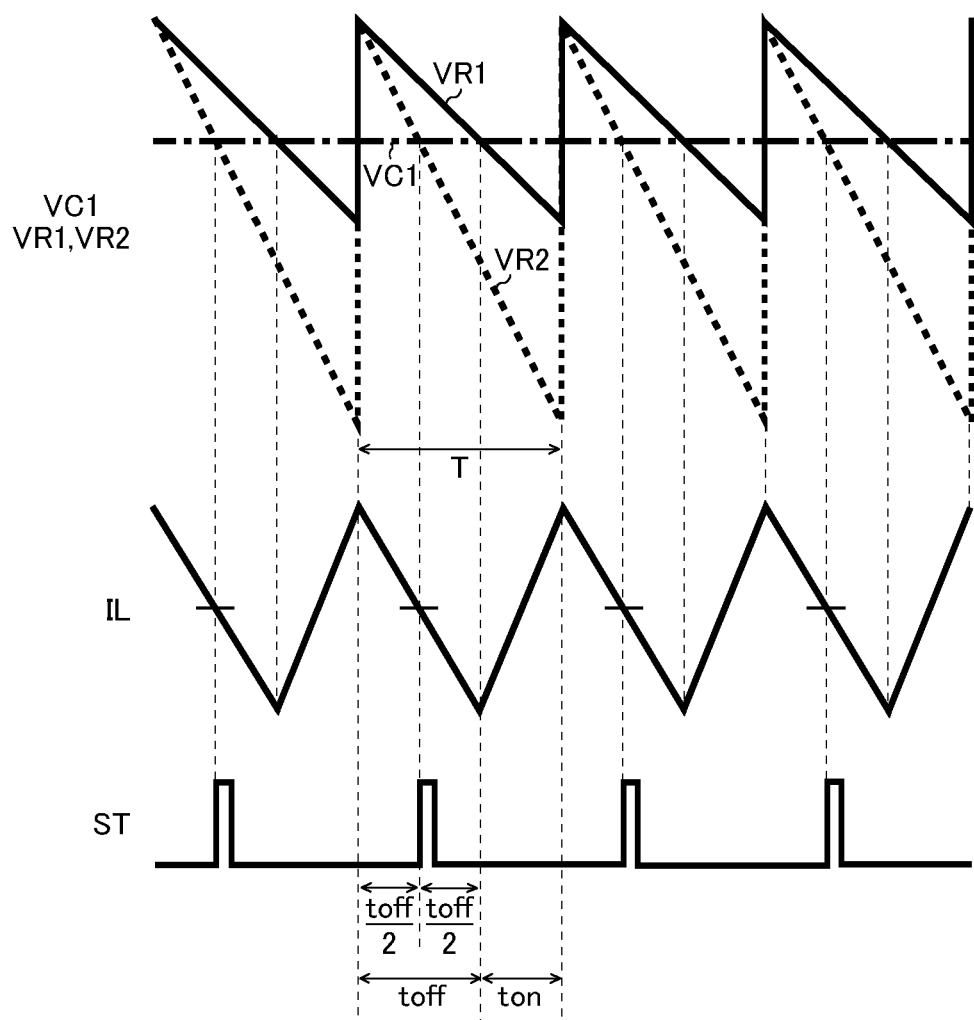
FIG. 11 is a diagram showing a third operational example of the timing control unit in the fourth embodiment.

FIG. 11 is a waveform diagram showing a third operational example of the timing control unit 120 according to the fourth embodiment, in which the first analog signal VC1 (dot-dashed line), the first ramp signal VR1 (solid line), and the second ramp signal VR2 (broken line), the coil current IL, and the timing control signal ST are shown in order from upper to lower in the same manner as FIG. 9 or 10 as described above.

In the third operational example of this diagram, the polarities of the first ramp signal VR1 and the second ramp signal VR2 are inverted from those in the first operational example (FIG. 9), respectively. In other words, each of the first ramp signal VR1 and the second ramp signal VR2 repeats to decrease and reset at the same switching period T.

Note that when the first analog signal VC1 is higher than the first ramp signal VR1, the switching output stage 10 becomes the ON period ton, and the coil current IL is increased. On the other hand, when the first analog signal VC1 is lower than the first ramp signal VR1, the switching output stage 10 becomes the OFF period toff, and the coil current IL is decreased.

In other words, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller. This point is the same as the first operational example (FIG. 9) described above.

Further, in the same manner as the first operational example (FIG. 9) described above, the timing control unit 120 compares the first analog signal VC1 with the second ramp signal VR2 so as to generate the timing control signal ST. More specifically, the timing control unit 120 generates a one-shot pulse in the timing control signal ST at a timing when the second ramp signal VR2 is decreased to cross the first analog signal VC1.

Note that as shown in this diagram, the timing when the second ramp signal VR2 and the first analog signal VC1 cross each other coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff.

In this way, unlike the second operational example (FIG. 10) described above, the third operational example of this diagram can sample the center value Ic of the coil current IL in the OFF period toff, while maintaining the relationship between the first analog signal VC1 and the on-duty ratio Don as before.

Figure 12:
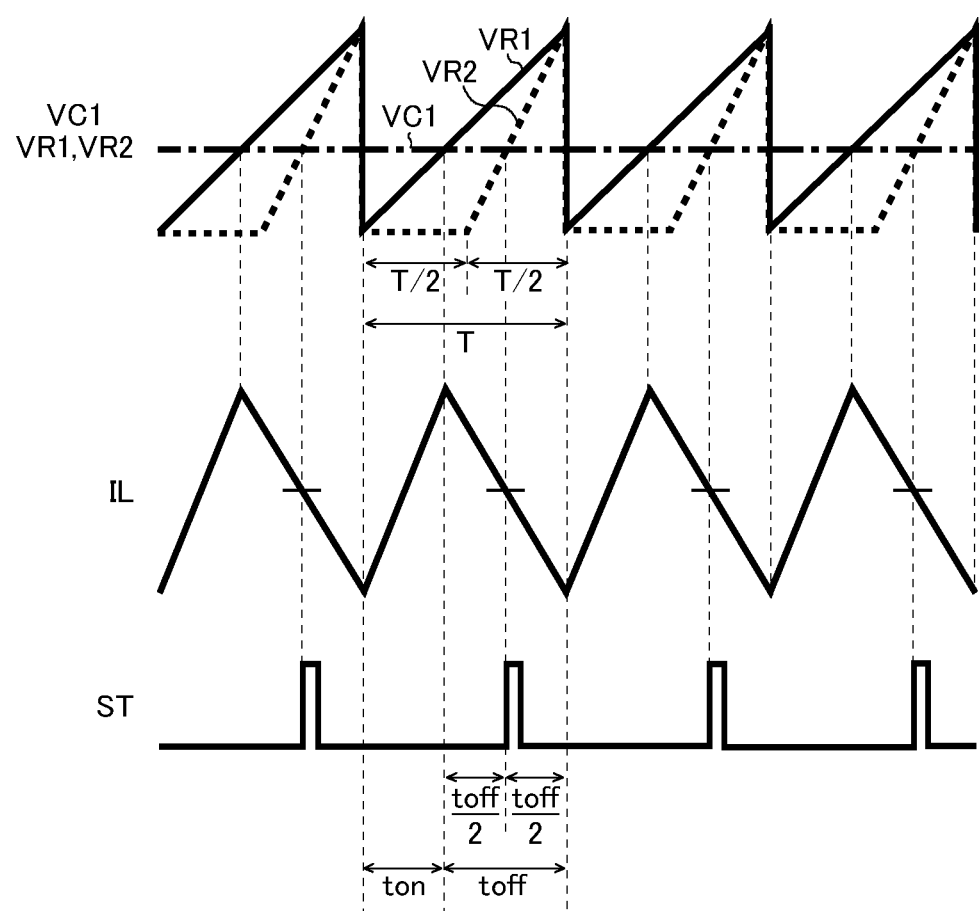
FIG. 12 is a diagram showing a fourth operational example of the timing control unit in the fourth embodiment.

FIG. 12 is a waveform diagram showing a fourth operational example of the timing control unit 120 according to the fourth embodiment, in which the first analog signal VC1 (dot-dashed line), the first ramp signal VR1 (solid line), and the second ramp signal VR2 (broken line), the coil current IL, and the timing control signal ST are shown in order from upper to lower in the same manner as FIGS. 9 to 11 described above.

Also in the fourth operational example of this diagram, in the same manner as the first operational example (FIG. 9) described above, each of the first ramp signal VR1 and the second ramp signal VR2 repeats to increase and reset at the same switching period T. However, the second ramp signal VR2 starts to increase after a delay of half the switching period T from the increase starting time point of the first ramp signal VR1.

Note that when the first analog signal VC1 is higher than the first ramp signal VR1, the switching output stage 10 becomes the ON period ton, and the coil current IL is increased. On the other hand, when the first analog signal VC1 is lower than the first ramp signal VR1, the switching output stage 10 becomes the OFF period toff, and the coil current IL is decreased.

In other words, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller. This point is the same as the first operational example (FIG. 9) described above.

In the same manner as the first operational example (FIG. 9) described above, the timing control unit 120 compares the first analog signal VC1 with the second ramp signal VR2 so as to generate the timing control signal ST. More specifically, the timing control unit 120 generates a one-shot pulse in the timing control signal ST at a timing when the second ramp signal VR2 is increased so as to cross the first analog signal VC1.

Note that as shown in this diagram, the timing when the second ramp signal VR2 and the first analog signal VC1 cross each other coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff.

In this way, unlike the third operational example (FIG. 11) described above, the fourth operational example of this diagram can sample the center value Ic of the coil current IL in the OFF period toff, while maintaining the relationship between the first analog signal VC1 and the on-duty ratio Don as before, without inverting the polarities of the first ramp signal VR1 and the second ramp signal VR2.

Figure 13:
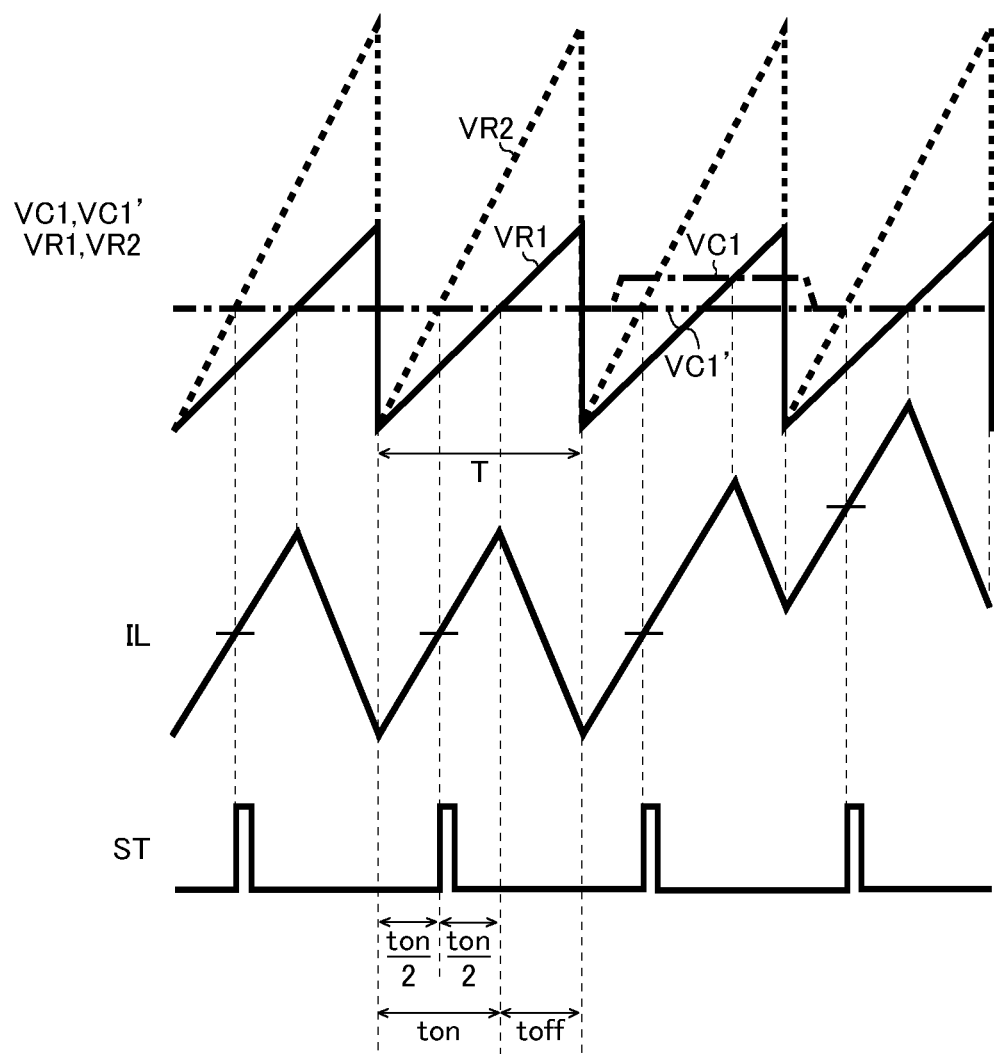
FIG. 13 is a diagram showing a fifth operational example of the timing control unit in the fourth embodiment.

FIG. 13 is a waveform diagram showing a fifth operational example of the timing control unit 120 according to the fourth embodiment, in which the first analog signal VC1 (dot-dashed line), an equivalent analog signal VC1' (two-dot dashed line), the first ramp signal VR1 (solid line), and the second ramp signal VR2 (broken line), the coil current IL, and the timing control signal ST are shown in order from upper to lower.

The fifth operational example of this diagram is basically the same as the first operational example (FIG. 9) described above. However, it is different in that the timing control unit 120 compares the second ramp signal VR2 with not the first analog signal VC1 but the equivalent analog signal VC1' having equivalent information so as to generate the timing control signal ST.

The structure in which the first analog signal VC1 is compared with a plurality of ramp signals (i.e. the first ramp signal VR1 and the second ramp signal VR2) has higher risk that the first analog signal VC1 is fluctuated by noise (i.e. risk of unstable PWM control), than the structure in which the first analog signal VC1 is compared with a single ramp signal (i.e. only the first ramp signal VR1).

Therefore, in view of improving stability of the PWM control, it is desired to compared the second ramp signal VR2 with not the first analog signal VC1 itself but the equivalent analog signal VC1' having information equivalent to that of the first analog signal VC1.

Note that as a method for generating the equivalent analog signal VC1', it is convenient to simply buffer the first analog signal VC1, for example.

In addition, it is also possible to calculate a theoretical value of the first analog signal VC1 ($=\alpha \times (Vo/Vi) \times T$, where $\alpha$ is a slew rate of the first ramp signal VR1) based on an actual value of the input voltage Vi and a target value of the output voltage Vo, and to generate the equivalent analog signal VC1' having the value.

In the latter method, as shown in this diagram, when the first analog signal VC1 is transiently varied, the center value Ic of the coil current IL cannot be correctly sampled. However, a shift of the sampling timing is merely temporary, and the overcurrent protection operation or the light load detection operation is not particularly affected badly.

Note that the fifth operational example of this diagram describes an example based on the first operational example (FIG. 9) described above, but it is of course possible to perform a comparison process between the equivalent analog signal VC1' and the second ramp signal VR2 in the second to fourth operational examples (FIGS. 10 to 12).

Fifth Embodiment

Figure 14:
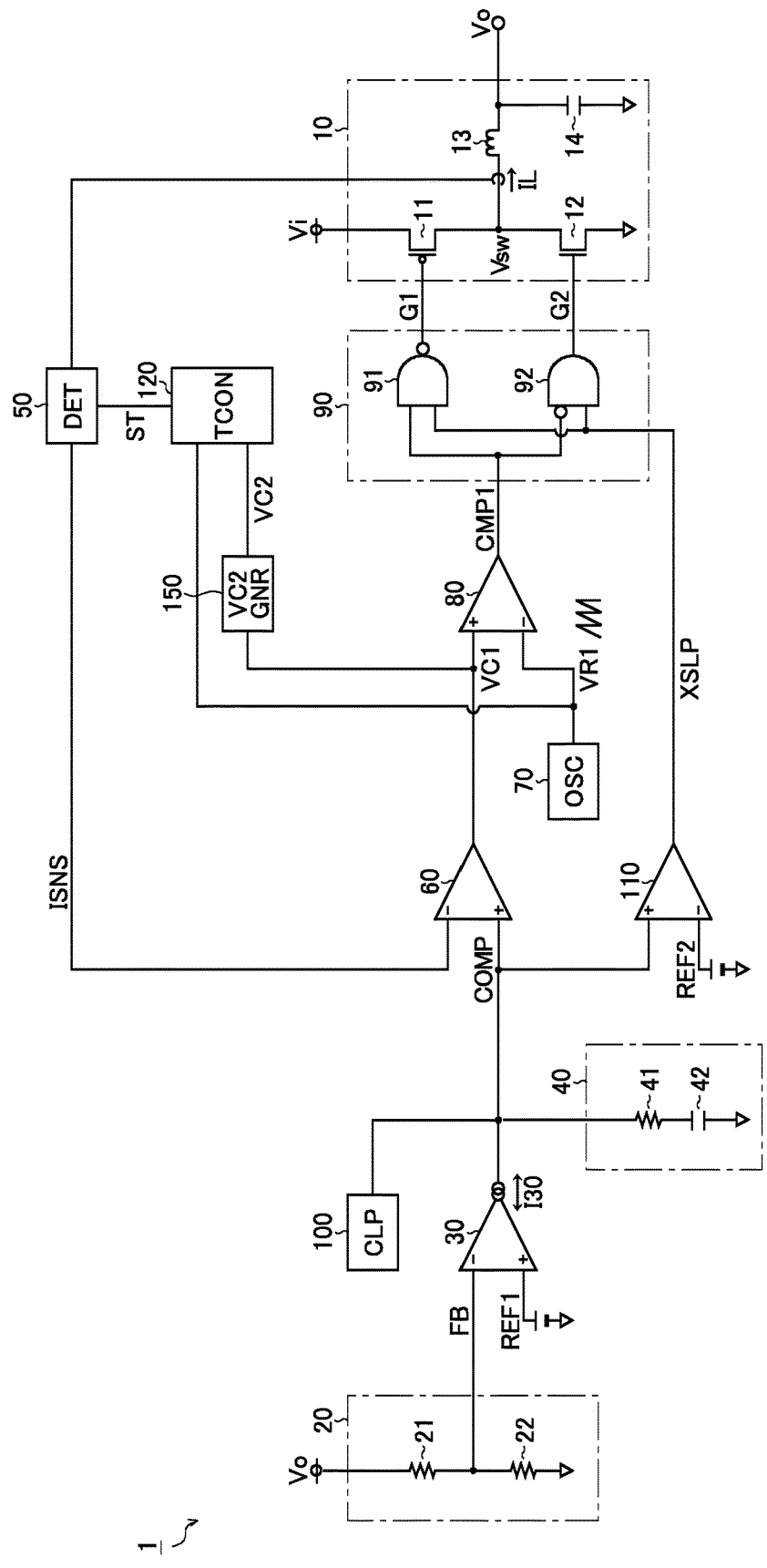
FIG. 14 is a diagram showing a fifth embodiment of the DC-DC converter.

FIG. 14 is a diagram showing a fifth embodiment of the DC-DC converter. The DC-DC converter 1 of this embodiment is based on the first embodiment (FIG. 1) and is characterized in that the first ramp signal VR1 and a second analog signal VC2 are used for generating the timing control signal ST. Therefore the same structural element as in the first embodiment is denoted by the same numeral or symbol as in FIG. 1 so that overlapping description is omitted, and a characterized part of the fifth embodiment is mainly described below.

The DC-DC converter 1 of this embodiment includes an average value generation portion 150 as means for generating the second analog signal VC2. The average value generation portion 150 generates the second analog signal VC2 having a simple average value of a signal value of the first analog signal VC1 and a start point value or an end point value of the first ramp signal VR1.

The timing control unit 120 uses both the first ramp signal VR1 and the second analog signal VC2 to generate the timing control signal ST so that the coil current IL is sampled at the midpoint of the ON period ton or the OFF period toff of the switching output stage 10. In the following description, a specific operational example of the timing control unit 120 is described in detail.

Figure 15:
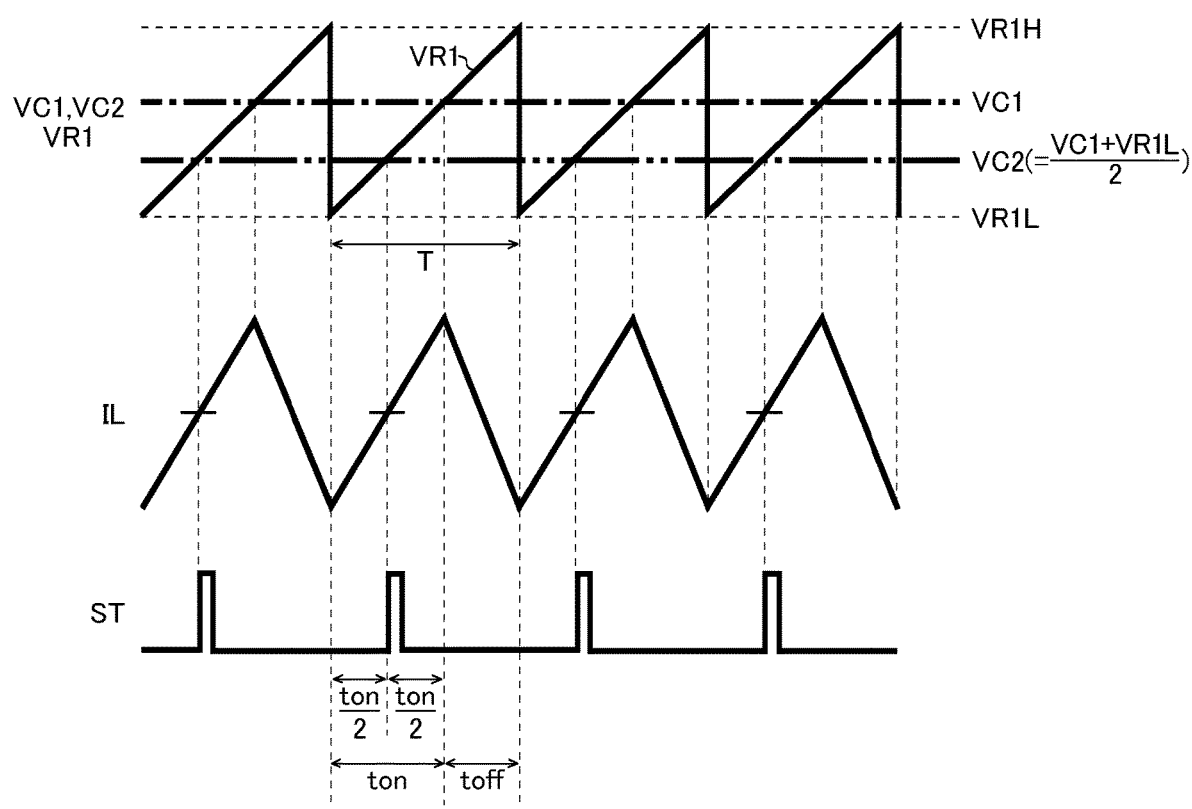
FIG. 15 is a diagram showing a first operational example of the timing control unit in the fifth embodiment.

FIG. 15 is a waveform diagram showing a first operational example of the timing control unit 120 in the fifth embodiment, in which the first analog signal VC1 (dot-dashed line), the second analog signal VC2 (two-dot dashed line), and the first ramp signal VR1 (solid line), the coil current IL, and the timing control signal ST are shown in order from upper to lower.

As shown in this diagram, the first ramp signal VR1 is a signal of a sawtooth waveform that repeats to increase and reset at a predetermined switching period T.

Note that when the first analog signal VC1 is higher than the first ramp signal VR1, the switching output stage 10 becomes the ON period ton, and the coil current IL is increased. On the other hand, when the first analog signal VC1 is lower than the first ramp signal VR1, the switching output stage 10 becomes the OFF period toff, and the coil current IL is decreased.

In other words, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller.

Further, the average value generation portion 150 generates the second analog signal VC2 (=(VC1+VR1L)/2) having a simple average value of the signal value of the first analog signal VC1 and the start point value of the first ramp signal VR1 (i.e. a bottom value VR1L of the first ramp signal VR1 in this diagram).

In addition, the timing control unit 120 compares the first ramp signal VR1 with the second analog signal VC2 so as to generate the timing control signal ST. More specifically, the timing control unit 120 generates a one-shot pulse in the timing control signal ST at a timing when the first ramp signal VR1 is increased to cross the second analog signal VC2.

Note that as shown in this diagram, the timing when the first ramp signal VR1 and the second analog signal VC2 cross each other coincides with the midpoint of the ON period ton (i.e. the timing when ton/2 has elapsed after the coil current IL starts to increase).

Therefore, the current detecting portion 50 performs sampling of the coil current IL using the one-shot pulse of the timing control signal ST as a trigger, and hence can generate the current sense signal ISNS commensurate with the center value Ic of the coil current IL in the ON period ton.

Note that in the fourth embodiment (FIGS. 8 to 13) described above, it is required to generate the second ramp signal VR2 that follows the first ramp signal VR1 whose voltage value varies fast and has a slew rate that is twice that of the first ramp signal VR1. However, this embodiment does not need the second ramp signal VR2. Therefore, it is preferred to adopt this embodiment if it is difficult to generate the second ramp signal VR2.

Figure 16:
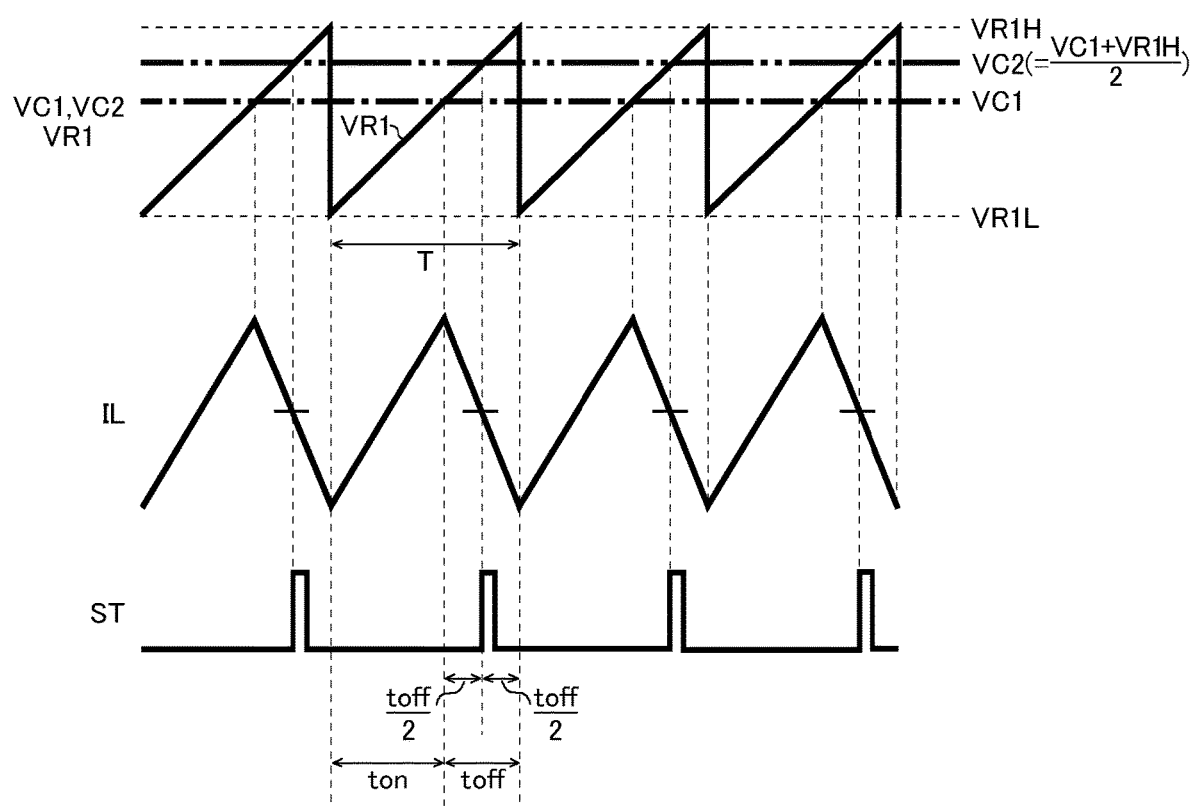
FIG. 16 is a diagram showing a second operational example of the timing control unit in the fifth embodiment.

FIG. 16 is a waveform diagram showing a second operational example of the timing control unit 120 in the fifth embodiment, in which the first analog signal VC1 (dot-dashed line), the second analog signal VC2 (two-dot dashed line), and the first ramp signal VR1 (solid line), the coil current IL, and the timing control signal ST are shown in order from upper to lower in the same manner as FIG. 15 described above.

The second operational example of this diagram is basically the same as the first operational example (FIG. 15) described above and is different in that the average value generation portion 150 generates the second analog signal VC2 (=(VC1+VR1H)/2) having a simple average value of the signal value of the first analog signal VC1 and the end point value of the first ramp signal VR1 (i.e. a peak value VR1H of the first ramp signal VR1 in this diagram).

In this case, the timing when the first ramp signal VR1 and the second analog signal VC2 cross each other coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff.

Figure 17:
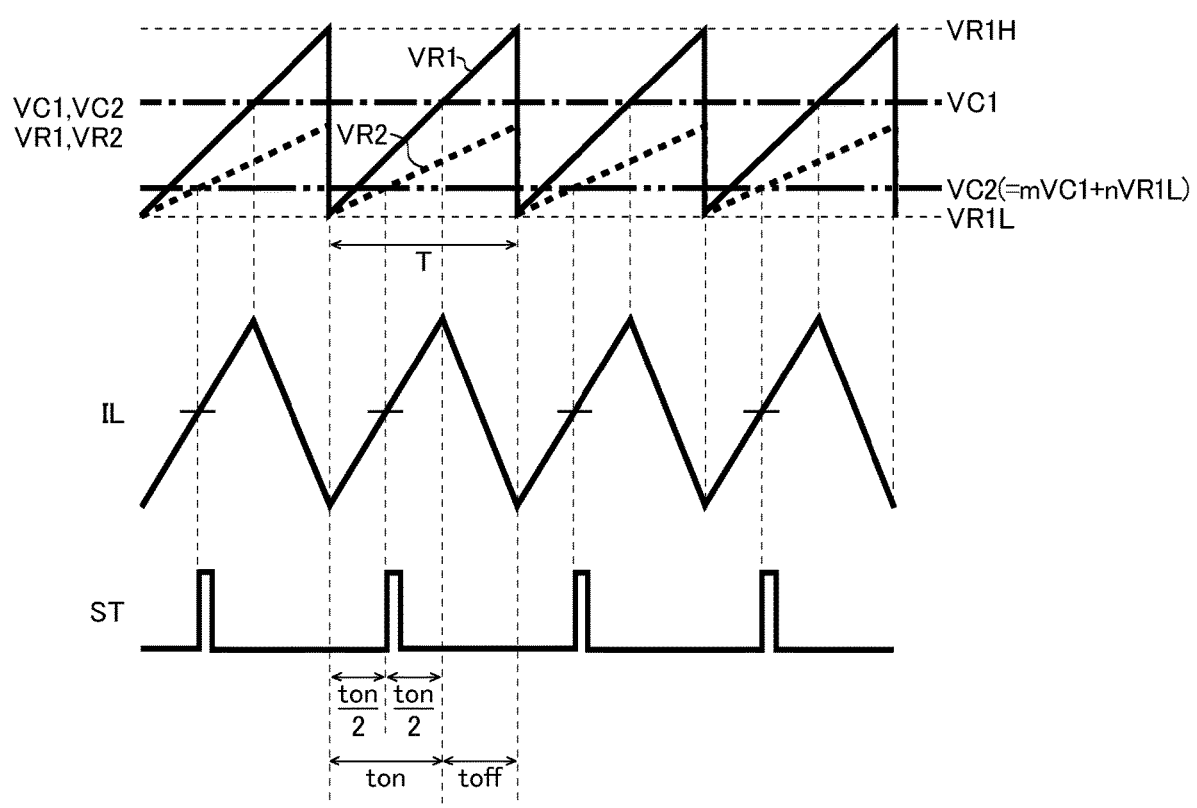
FIG. 17 is a diagram showing a third operational example of the timing control unit in the fifth embodiment.

FIG. 17 is a waveform diagram showing a third operational example of the timing control unit 120 in the fifth embodiment, in which the first analog signal VC1 (dot-dashed line), the second analog signal VC2 (two-dot dashed line), the first ramp signal VR1 (solid line), and the second ramp signal VR2 (broken line), the coil current IL, and the timing control signal ST are shown in order from upper to lower.

The operational example of this diagram is basically the same as the first operational example (FIG. 15) described above and is different in that the average value generation portion 150 generates the second analog signal VC2 having a weighted average value of the signal value of the first analog signal VC1 and the start point value or the end point value of the first ramp signal VR1.

In addition, along with the above-mentioned change, the timing control unit 120 uses the second ramp signal VR2 having a slew rate different from that of the first ramp signal VR1 and the second analog signal VC2, and generates the timing control signal ST so that the coil current IL is sampled at the midpoint of the ON period ton or the OFF period toff of the switching output stage 10. Note that unlike the fourth embodiment (FIGS. 8 to 13) described above, the second ramp signal VR2 does not necessarily have a slew rate that is twice that of the first ramp signal VR1.

For example, specifically with reference to this diagram, the second analog signal VC2 has a weighted average value (=mVC1+nVR1L) of the signal value of the first analog signal VC1 (weight m) and the bottom value VR1L of the first ramp signal VR1 (weight n). In addition, the second ramp signal VR2 has a slew rate that is 2 m/(m+n) times that of the first ramp signal VR1.

With this structure, the timing when the second ramp signal VR2 and the second analog signal VC2 cross each other coincides with the midpoint of the ON period ton (i.e. the timing when ton/2 has elapsed after the coil current IL starts to increase).

Therefore, the current detecting portion 50 performs sampling of the coil current IL using the one-shot pulse of the timing control signal ST as a trigger, and hence can generate the current sense signal ISNS commensurate with the center value Ic of the coil current IL in the ON period ton.

Sixth Embodiment

Figure 18:
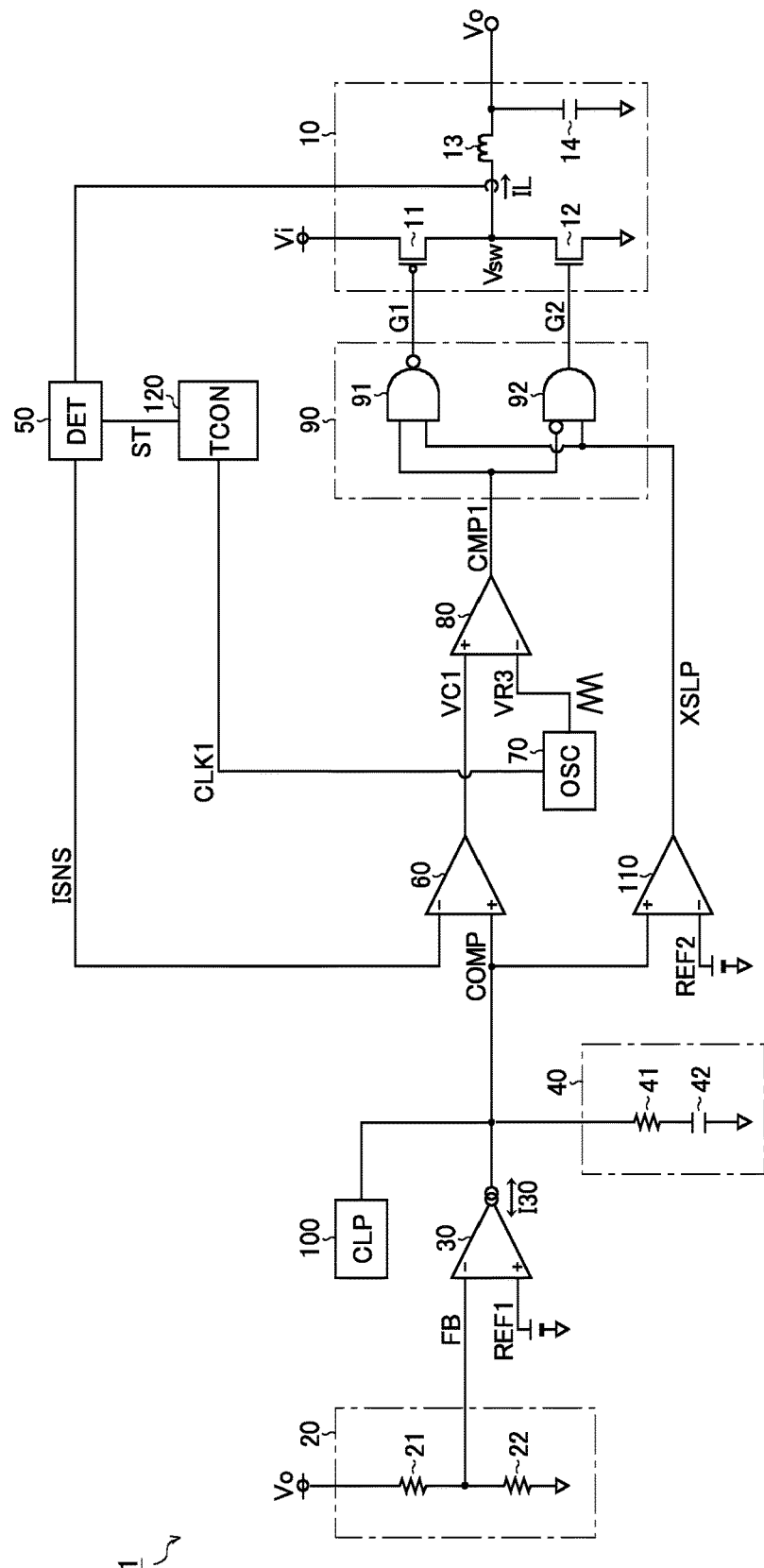
FIG. 18 is a diagram showing a sixth embodiment of the DC-DC converter.

FIG. 18 is a diagram showing a sixth embodiment of the DC-DC converter. The DC-DC converter 1 of this embodiment is based on the first embodiment (FIG. 1) and is characterized in that the PWM control is performed using not the first ramp signal VR1 of a sawtooth waveform but a third ramp signal VR3 of a triangular waveform, and detects timing when the third ramp signal VR3 has a peak value VR3H or a bottom value VR3L (i.e. peak timing or bottom timing) so as to generate the timing control signal ST. Therefore the same structural element as in the first embodiment is denoted by the same numeral or symbol as in FIG. 1 so that overlapping description is omitted, and a characterized part of the sixth embodiment is mainly described below.

In the DC-DC converter 1 of this embodiment, the oscillator 70 generates the third ramp signal VR3 of a triangular waveform having the same slew rate for upward and downward changes, so as to supply it to the inverting input terminal (−) of the PWM comparator 80. In addition, the oscillator 70 generates a first clock signal CLK1 whose logical level is switched at the peak timing and the bottom timing of the third ramp signal VR3, and supplies it to the timing control unit 120.

Figure 19:
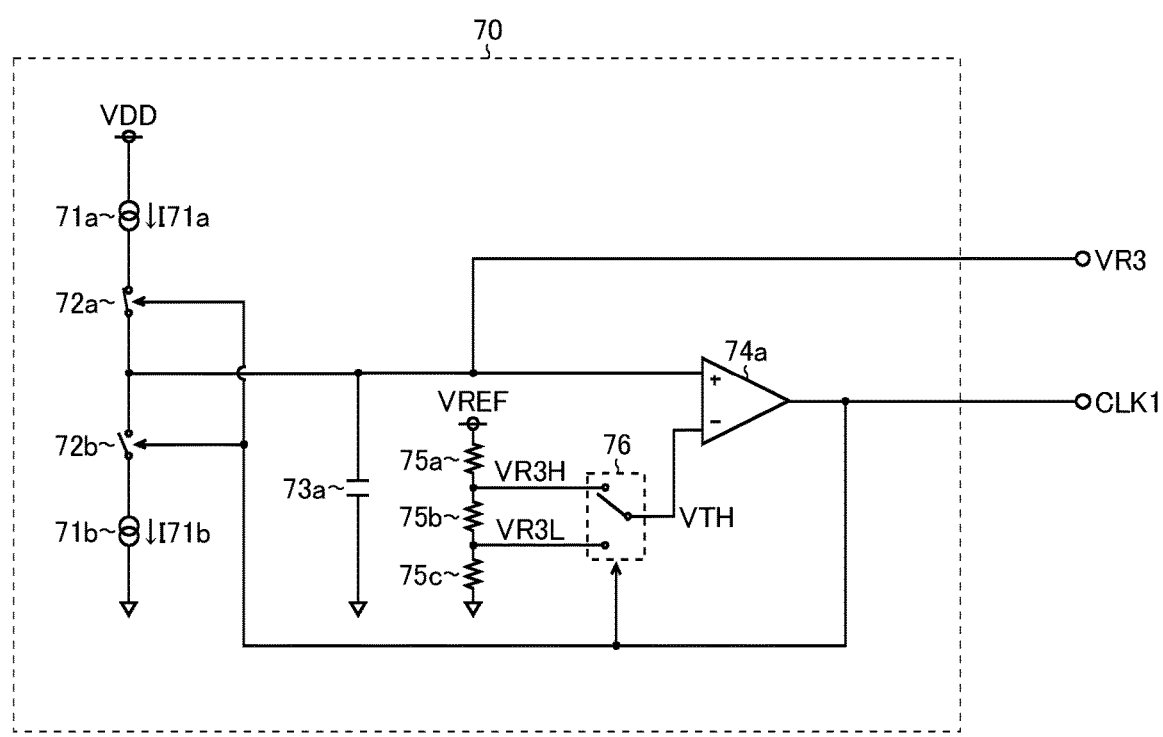
FIG. 19 is a diagram showing one structural example of an oscillator in the sixth embodiment.

FIG. 19 is a circuit diagram showing one structural example of the oscillator 70 according to the sixth embodiment. The oscillator 70 of this structural example includes current sources 71*a* and 71*b*, switches 72*a* and 72*b*, a capacitor 73*a*, a comparator 74*a*, resistors 75*a*, 75*b*, and 75*c*, and a selector 76.

A first terminal of the current source 71*a* is connected to an application terminal of a power supply voltage VDD. A second terminal of the current source 71*a* is connected to a first terminal of the switch 72*a*. A second terminal of the switch 72*a*, a first terminal of the switch 72*b*, a first terminal of the capacitor 73*a*, and a noninverting input terminal (+) of the comparator 74*a* are all connected to an output terminal of the third ramp signal VR3. A second terminal of the switch 72*b* is connected to a first terminal of the current source 71*b*. A second terminal of the current source 71*b* and a second terminal of the capacitor 73*a* are connected to the ground terminal.

The resistors 75*a*, 75*b*, and 75*c* are connected in series between an application terminal of a reference voltage VREF and the ground terminal in the illustrated order. The connection node between the resistor 75*a* and the resistor 75*b* is connected to a first input terminal of the selector 76, as an output terminal of a first divided voltage (i.e. commensurate with the peak value VR3H of the third ramp signal VR3). The connection node between the resistor 75*b* and the resistor 75*c* is connected to a second input terminal of the selector 76, as an output terminal of a second divided voltage lower than the first divided voltage (i.e. commensurate with the bottom value VR3L of the third ramp signal VR3). The output terminal of the selector 76 is connected to an inverting input terminal (−) of the comparator 74, as an output terminal of a threshold value voltage VTH. Note that control terminals of the switches 72*a* and 72*b* and the selector 76 are all connected to the output terminal of the comparator 74*a* (i.e. the output terminal of the first clock signal CLK1).

In the oscillator 70 having the structure described above, the current source 71*a* generates a predetermined charging current I71*a*, and the current source 71*b* generates a discharging current I71*b* equal to the charging current I71*a*.

In addition, the switches 72*a* and 72*b* are turned on and off according to the first clock signal CLK1 so as to switch between charging the capacitor 73*a* by the charging current I71*a* and discharging the same by the discharging current I71*b*.

Figure 20:
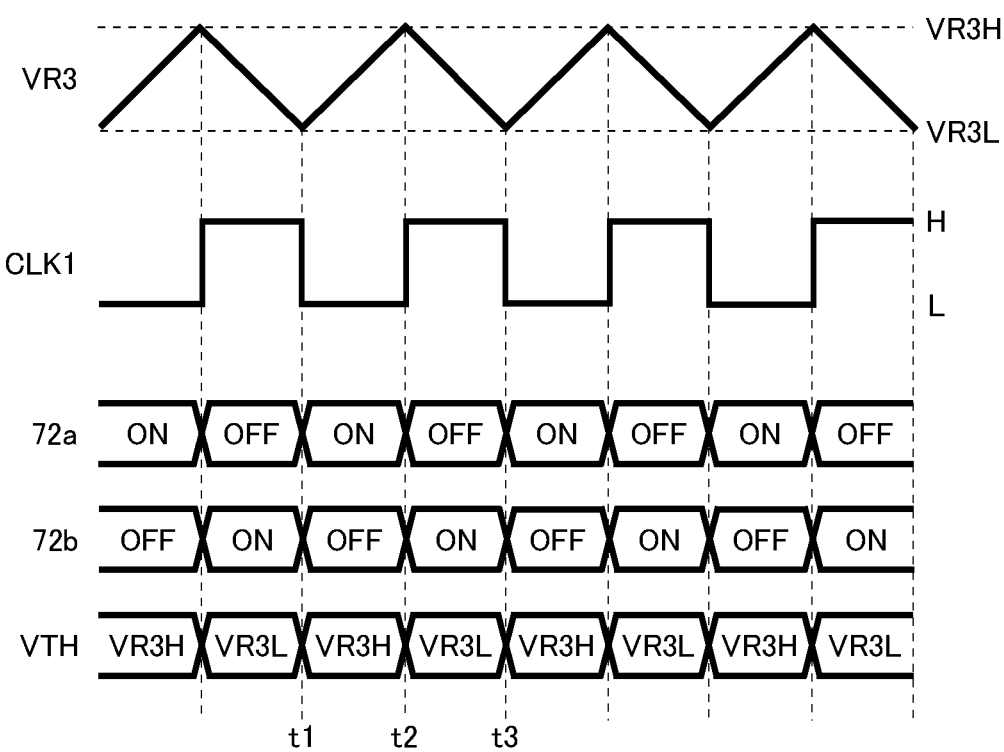
FIG. 20 is a diagram showing an oscillation operational example of the oscillator in the sixth embodiment.

Specifically, when the first clock signal CLK1 is at low level, the switch 72*a* is turned on while the switch 72*b* is turned off, and hence the capacitor 73*a* is charged by the charging current I71*a*. Therefore, the third ramp signal VR3 is monotonously increased at a predetermined upward slew rate (see time t1 to time t2 in FIG. 20).

On the other hand, when first clock signal CLK1 is at high level, the switch 72*a* is turned off while the switch 72*b* is turned on, and hence the capacitor 73*a* is discharged by the discharging current I71*b*. Therefore, the third ramp signal VR3 is monotonously decreased at a downward slew rate equal to the upward slew rate (with opposite polarity) (see time t2 to time t3 in FIG. 20).

The comparator 74*a* compares the third ramp signal VR3 with the threshold value voltage VTH (i.e. the peak value VR3H or the bottom value VR3L) so as to generate the first clock signal CLK1. Note that when the first clock signal CLK1 is at low level, the selector 76 selects the peak value VR3H as the threshold value voltage VTH (see time t1 to time t2 in FIG. 20), and on the contrary, when the first clock signal CLK1 is at high level, the selector 76 selects the bottom value VR3L as the threshold value voltage VTH (see time t2 to time t3 in FIG. 20).

Therefore, when the first clock signal CLK1 is at low level, the first clock signal CLK1 is maintained at low level until the third ramp signal VR3 becomes higher than the peak value VR3H. When the third ramp signal VR3 becomes higher than the peak value VR3H, the first clock signal CLK1 rises from low level to high level (see time t1 to time t2 in FIG. 20).

On the other hand, when the first clock signal CLK1 is at high level, the first clock signal CLK1 is maintained at high level until the third ramp signal VR3 becomes lower than the bottom value VR3L. When the third ramp signal VR3 becomes lower than the bottom value VR3L, the first clock signal CLK1 falls from high level to low level (see time t2 to time t3 in FIG. 20).

In this way, the comparator 74*a*, the resistors 75*a* to 75*c*, and the selector 76 work as a clock signal generation portion that compares the third ramp signal VR3 with the peak value VR3H and the bottom value VR3L so as to generate the first clock signal CLK1.

The timing control unit 120 receives an input of the first clock signal CLK1 described above, and generates the timing control signal ST so that the coil current IL is sampled at a timing when a logical level of the first clock signal CLK1 is switched (i.e. at the peak timing or the bottom timing of the third ramp signal VR3). In the following description, a specific operational example of the timing control unit 120 is described in detail.

Figure 21:
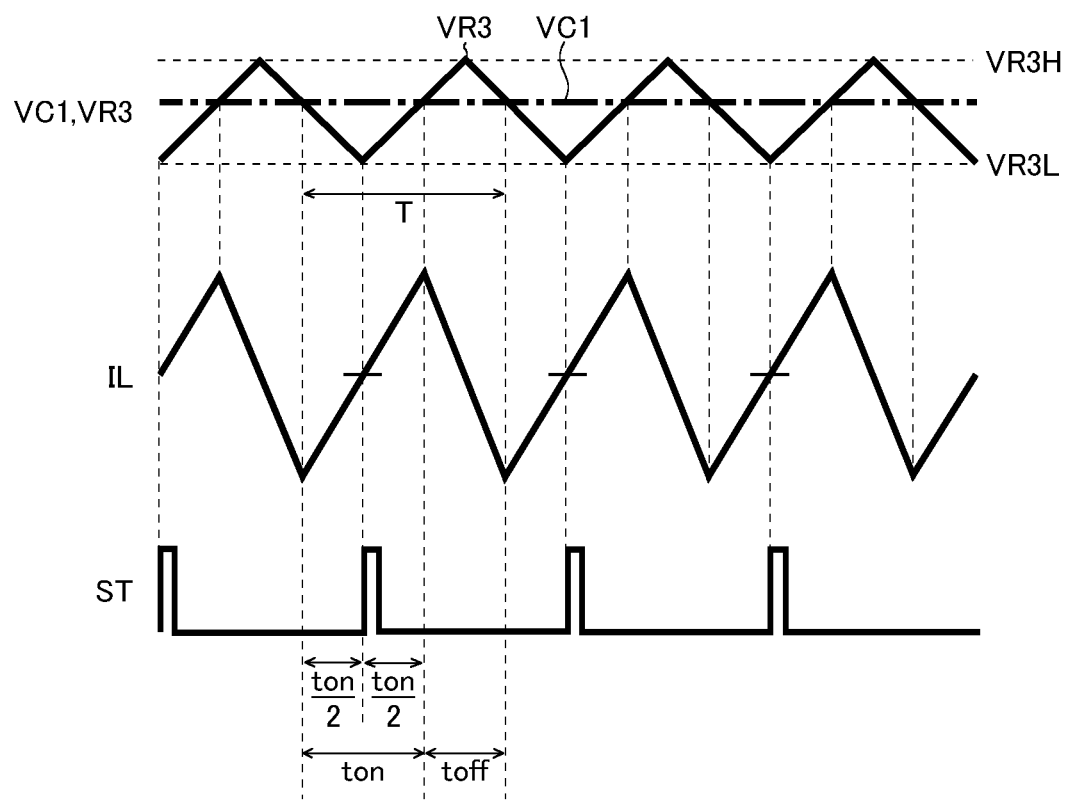
FIG. 21 is a diagram showing a first operational example of the timing control unit in the sixth embodiment.

FIG. 21 is a waveform diagram showing a first operational example of the timing control unit 120 according to the sixth embodiment, in which the first analog signal VC1 (dot-dashed line) and the third ramp signal VR3 (solid line), the coil current IL, and the timing control signal ST are shown in order from upper to lower.

As shown in this diagram, the third ramp signal VR3 has a predetermined switching period T and repeats increase and decrease between the peak value VR3H and the bottom value VR3L so as to decrease after increasing to the peak value VR3H and to increase after decreasing to reach the bottom value VR3L.

Note that when the first analog signal VC1 is higher than the third ramp signal VR3, the switching output stage 10 becomes the ON period ton, and the coil current IL is increased. On the other hand, when the first analog signal VC1 is lower than the third ramp signal VR3, the switching output stage 10 becomes the OFF period toff, and the coil current IL is decreased.

In other words, as the first analog signal VC1 is higher, the on-duty ratio Don of the switching output stage 10 (=ton/T)

becomes larger. On the contrary, as the first analog signal VC1 is lower, the on-duty ratio Don of the switching output stage 10 becomes smaller.

Further, the timing control unit 120 generates a one-shot pulse in the timing control signal ST at the bottom timing when the third ramp signal VR3 has the bottom value VR3L (i.e. corresponding to the timing when the first clock signal CLK1 falls from high level to low level).

Note that as shown in this diagram, the bottom timing of the third ramp signal VR3 coincides with the midpoint of the ON period ton (i.e. the timing when ton/2 has elapsed after the coil current IL starts to increase).

Therefore, the current detecting portion 50 performs sampling of the coil current IL using the one-shot pulse of the timing control signal ST as a trigger, and hence can generate the current sense signal ISNS commensurate with the center value Ic of the coil current IL in the ON period ton.

In this way, with the structure in which the PWM control is performed using not the first ramp signal VR1 of a sawtooth waveform but the third ramp signal VR3 of a triangular waveform, the center value Ic of the coil current IL can be easily sampled only by detecting the peak timing or the bottom timing of the third ramp signal VR3.

Figure 22:
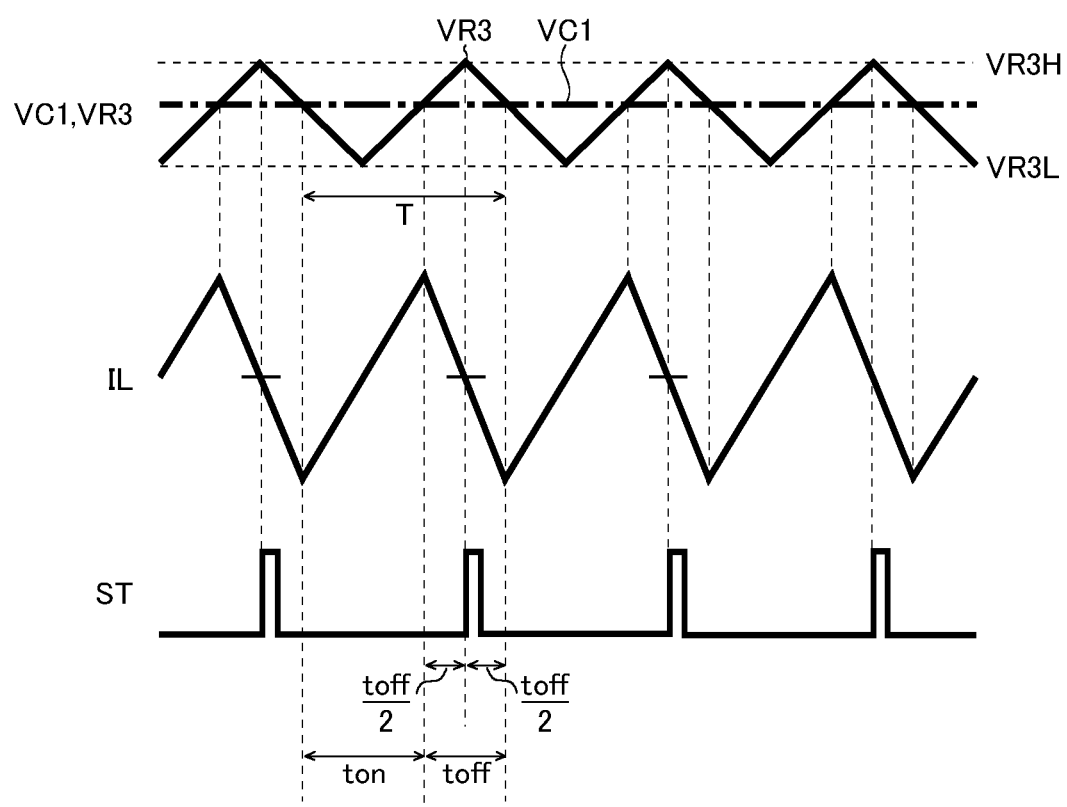
FIG. 22 is a diagram showing a second operational example of the timing control unit in the sixth embodiment.

FIG. 22 is a waveform diagram showing a second operational example of the timing control unit 120 according to the sixth embodiment, in which the first analog signal VC1 (dot-dashed line) and the third ramp signal VR3 (solid line), the coil current IL, and the timing control signal ST are shown in order from upper to lower in the same manner as FIG. 21 described above.

The second operational example of this diagram is basically the same as the first operational example (FIG. 21) described above. However, the timing control unit 120 is different in that it generates a one-shot pulse in the timing control signal ST at the peak timing when the third ramp signal VR3 has the peak value VR3H (i.e. corresponding to the timing when the first clock signal CLK1 rises from low level to high level).

Note that as shown in this diagram, the peak timing of the third ramp signal VR3 coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff.

Seventh Embodiment

Figure 23:
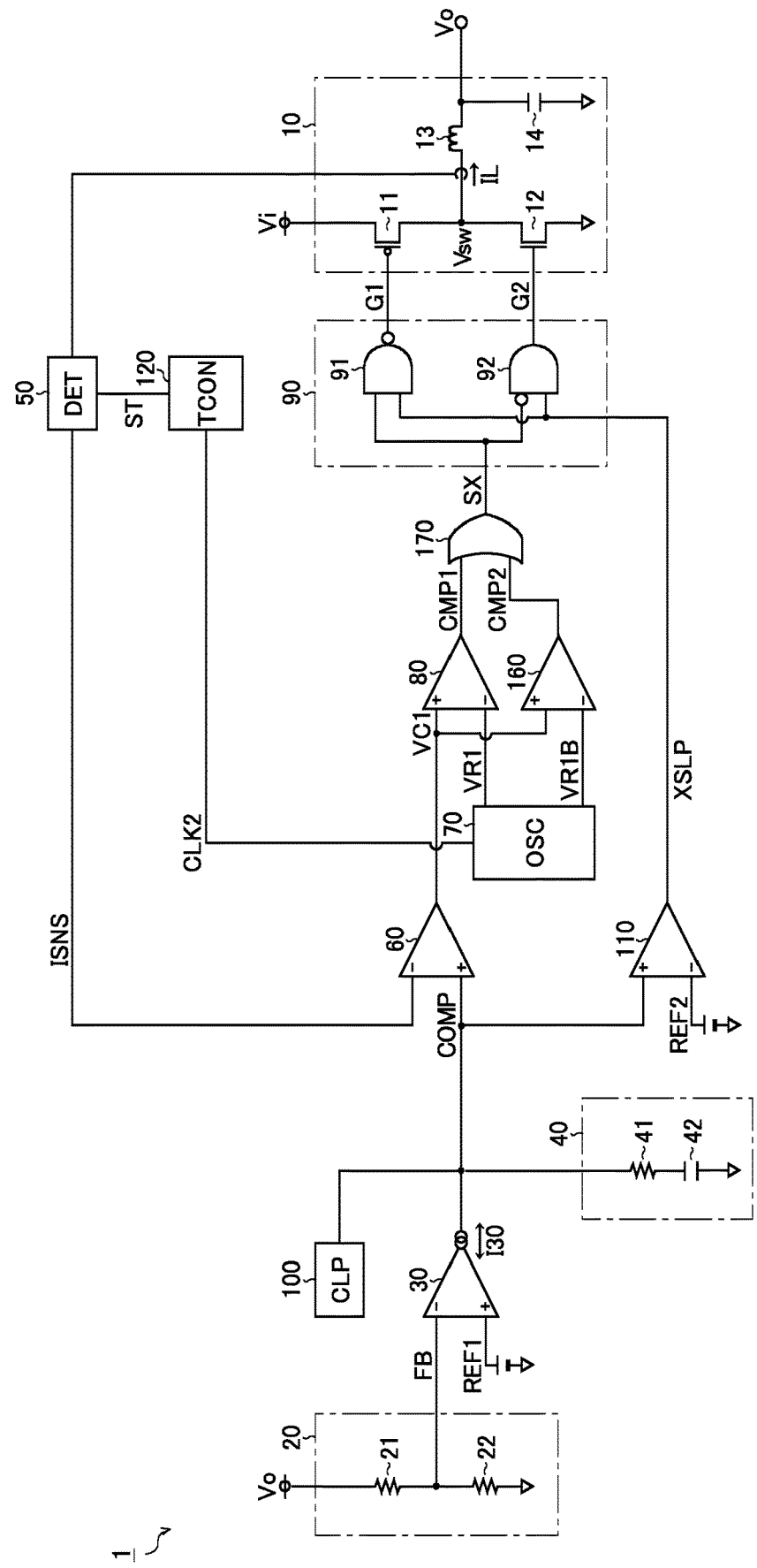
FIG. 23 is a diagram showing a seventh embodiment of the DC-DC converter.

FIG. 23 is a diagram showing a seventh embodiment of the DC-DC converter. The DC-DC converter 1 of this embodiment is based on the first embodiment (FIG. 1) and is characterized in that a PWM comparator 160 and an OR gate 170 are newly added, the PWM control is performed using the first ramp signal VR1 and an inverted first ramp signal VR1B that is a polarity-inverted signal of the first ramp signal VR1, and reset timing of each of them is detected so as to generate the timing control signal ST. Therefore the same structural element as in the first embodiment is denoted by the same numeral or symbol as in FIG. 1 so that overlapping description is omitted, and a characterized part of the seventh embodiment is mainly described below.

In the DC-DC converter 1 of this embodiment, the oscillator 70 generates the first ramp signal VR1 of a sawtooth waveform and the inverted first ramp signal VR1B, which have opposite polarities and repeat increase or decrease and reset at the same switching period T, and supplies them to inverting input terminals (−) of the PWM comparators 80 and 160, respectively. In addition, the oscillator 70 generates a second clock signal CLK2 in which a one-shot pulse is generated at the reset timing of the first ramp signal VR1 and the inverted first ramp signal VR1B, and supplies it to the timing control unit 120.

As described above, the PWM comparator 80 compares the first analog signal VC1 input to the noninverting input terminal (+) with the first ramp signal VR1 input to the inverting input terminal (−) so as to generate the first comparison signal CMP1. The first comparison signal CMP1 becomes high level when the first analog signal VC1 is higher than the first ramp signal VR1, while it becomes low level when the first analog signal VC1 is lower than the first ramp signal VR1.

On the other hand, the PWM comparator 160 compares the first analog signal VC1 input to the noninverting input terminal (+) with the inverted first ramp signal VR1B input to the inverting input terminal (−) so as to generate a second comparison signal CMP2. The second comparison signal CMP2 becomes high level when the first analog signal VC1 is higher than the inverted first ramp signal VR1B, while it becomes low level when the first analog signal VC1 is lower than the inverted first ramp signal VR1B.

The OR gate 170 generates an OR signal SX of the first comparison signal CMP1 and the second comparison signal CMP2 (i.e. corresponding to the control signal for the switching output stage 10) and outputs it to the driver 90. The OR signal SX becomes high level when at least one of the first comparison signal CMP1 and the second comparison signal CMP2 is at high level, while it becomes low level when both the first comparison signal CMP1 and the second comparison signal CMP2 are at low level.

Figure 24:
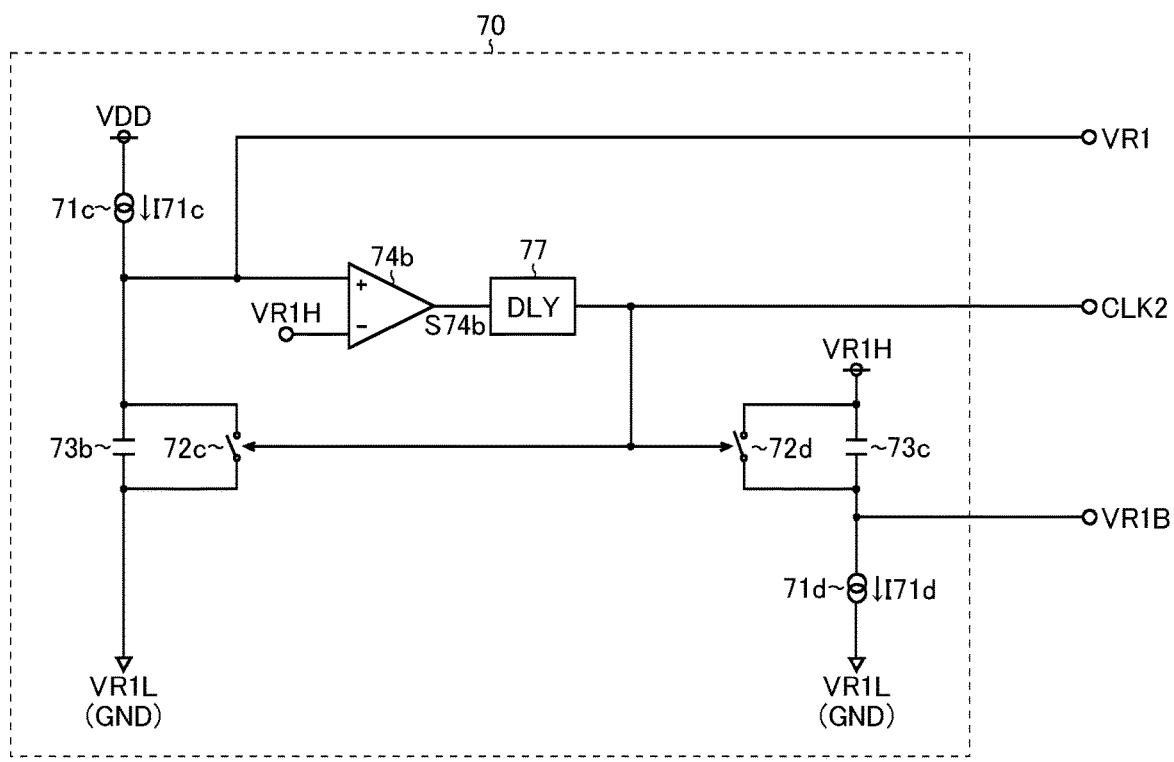
FIG. 24 is a diagram showing one structural example of an oscillator in the seventh embodiment.

FIG. 24 is a circuit diagram showing one structural example of the oscillator 70 according to the seventh embodiment. The oscillator 70 of this structural example includes a current source 71c, switches 72c and 72d, capacitors 73b and 73c, a comparator 74b, and a delay portion 77.

A first terminal of the current source 71c is connected to the application terminal of the power supply voltage VDD. A second terminal of the current source 71c, a first terminal of the switch 73b, a first terminal of the capacitor 73b, and a noninverting input terminal (+) of the comparator 74b are all connected to an output terminal of the first ramp signal VR1. A second terminal of the switch 72c and a second terminal of the capacitor 73b are connected to an application terminal (e.g. the ground terminal) of the first voltage VR1L (i.e. commensurate with the bottom value VR1L of each of the first ramp signal VR1 and the inverted first ramp signal VR1B). An inverting input terminal (−) of the comparator 74b is connected to an application terminal of the second voltage VR1H (i.e. commensurate with the peak value VR1H of the first ramp signal VR1 and the inverted first ramp signal VR1B). The output terminal of the comparator 74b is connected to the input terminal of the delay portion 77.

A first terminal of the switch 72d and a first terminal of the capacitor 73c are both connected to the application terminal of the second voltage VR1H. A second terminal of the switch 72d, a second terminal of the capacitor 73c, and a first terminal of the current source 71d are all connected to the output terminal of the inverted first ramp signal VR1B. A second terminal of the current source 71d is connected to the application terminal of the first voltage VR1L. The control terminals of the switches 72c and 72d are both connected to the output terminal of the delay portion 77 (i.e. the output terminal of the second clock signal CLK2).

In the oscillator 70 having the structure described above, the current source 71c generates a charging current I71c for charging the capacitor 73b, and the current source 71d generates a charging current I71d for charging the capacitor 73c. Note that the charging currents I71c and I71d are set to have the same current value.

In addition, the switches 72c and 72d are both turned on and off so that the capacitors 73b and 73c are discharged according to the second clock signal CLK2. More specifically, when the second clock signal CLK2 is at low level, the switches 72c and 72d are both turned off, and hence the capacitors 73b and 73c are charged by the charging currents I71c and I71d, respectively. Therefore, the first ramp signal VR1 is monotonously increases from the bottom value VR1L to the peak value VR1H at a predetermined upward slew rate, and the inverted first ramp signal VR1B is monotonously decreased from the peak value VR1H to the bottom value VR1L at a downward slew rate equal to the upward slew rate (with opposite polarity) (see time t11 to time t12 in FIG. 25).

On the other hand, when the second clock signal CLK2 is at high level, the switches 72c and 72d are both turned on, and hence the capacitors 73b and 73c are each discharged without delay (i.e. both terminals of each are short-circuited). As a result, the first ramp signal VR1 is reset to the bottom value VR1L, and the inverted first ramp signal VR1B is reset to the peak value VR1H (see time t12 to time t13 in FIG. 25).

The comparator 74b compares the first ramp signal VR1 with the second voltage VR1H (i.e. commensurate with the peak value VR1H) so as to generate a comparison signal S74b. Note that the comparison signal S74b becomes low level when the first ramp signal VR1 is lower than the peak value VR1H, while it becomes high level when the first ramp signal VR1 is higher than the peak value VR1H.

The delay portion 77 performs delay processing on the comparison signal S74b so as to generate the second clock signal CLK2. More specifically, the delay portion 77 increases the second clock signal CLK2 to high level without delay when the comparison signal S74b rises to high level (see time t12 in FIG. 25), while it decreases the second clock signal CLK2 to low level after a predetermined delay time elapses when the comparison signal S74b falls to low level (see time t12 to t13 in FIG. 25). With this structure, the capacitors 73b and 73c can be securely discharged.

In this way, the comparator 74b and the delay portion 77 work as a clock signal generation portion that compares first ramp signal VR1 with the second voltage VR3H (i.e. commensurate with the peak value VR1H) so as to generate the second clock signal CLK2.

The timing control unit 120 receives an input of the second clock signal CLK2 described above and generates the timing control signal ST so that the coil current IL is sampled at a timing when its logical level is switched (i.e. at the reset timing of the first ramp signal VR1 and the inverted first ramp signal VR1B). In the following description, a specific operational example of the timing control unit 120 is described in detail.

Figure 26:
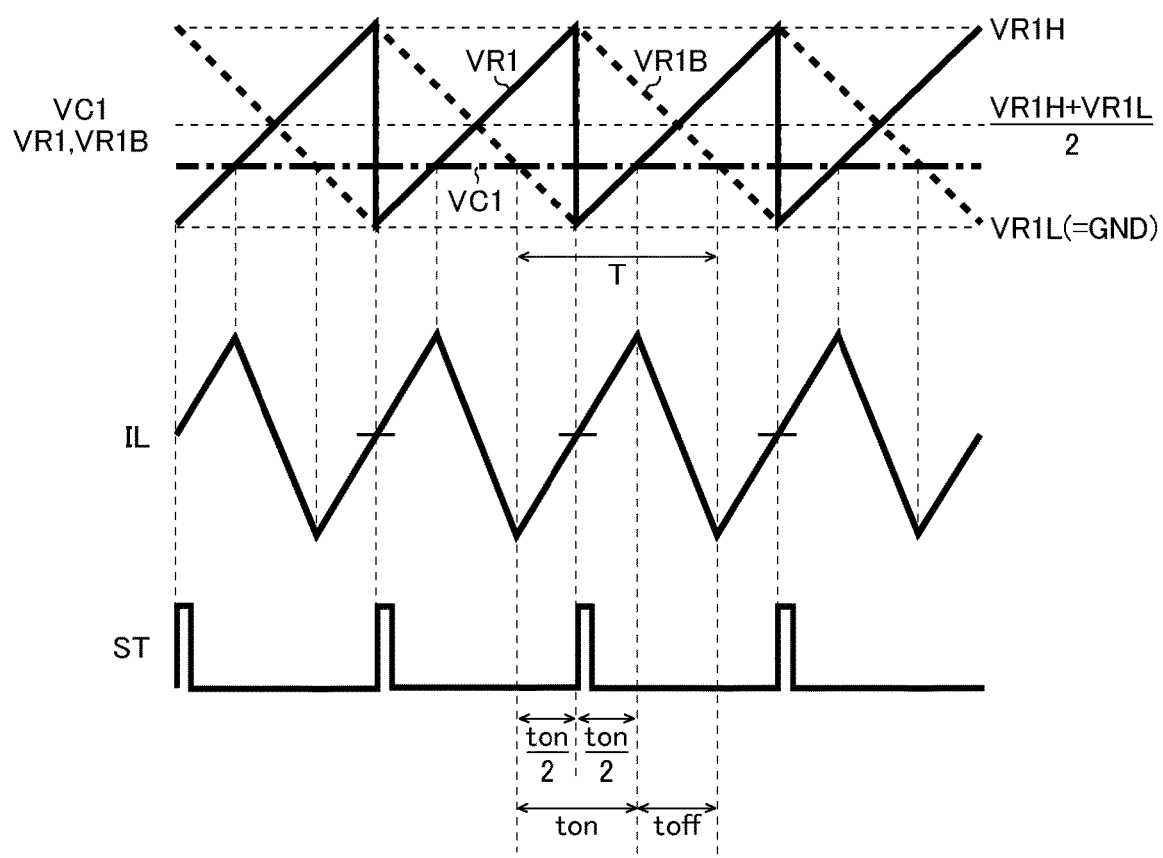
FIG. 26 is a diagram showing one operational example of a timing control unit in the seventh embodiment.

FIG. 26 is a waveform diagram showing an operational example of the timing control unit 120 according to the seventh embodiment, in which the first analog signal VC1 (dot-dashed line), the first ramp signal VR1 (solid line), and the inverted first ramp signal VR1B (broken line), the coil current IL, and the timing control signal ST are shown in order from upper to lower.

Figure 25:
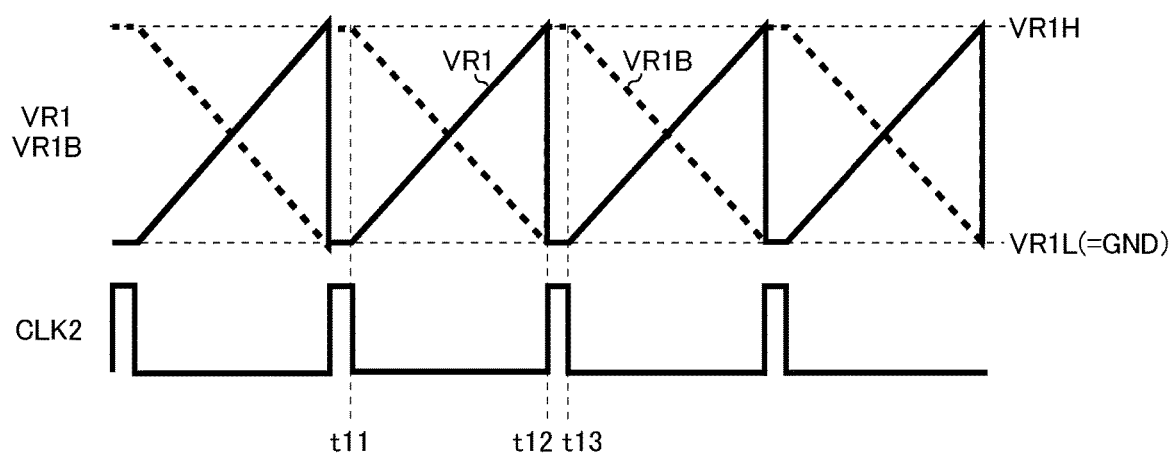
FIG. 25 is a diagram showing an oscillation operational example of the oscillator in the seventh embodiment.

As also shown in FIG. 25 described above, the first ramp signal VR1 and the inverted first ramp signal VR1B repeat increase or decrease and reset with opposite polarities at the same switching period T between the peak value VR1H and the bottom value VR1L. On the other hand, the first analog signal VC1 varies within a voltage range satisfying VR1L<VC1<(VR1H+VR1L)/2.

Note that when the first analog signal VC1 is higher than at least one of the first ramp signal VR1 and the inverted first ramp signal VR1B, the switching output stage 10 becomes the ON period ton, and the coil current IL is increased. On the other hand, when the first analog signal VC1 is lower than each of the first ramp signal VR1 and the inverted first ramp signal VR1B, the switching output stage 10 becomes the OFF period toff, and the coil current IL is decreased.

In other words, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller.

Further, the timing control unit 120 generates a one-shot pulse in the timing control signal ST at the reset timing of the first ramp signal VR1 and the inverted first ramp signal VR1B (i.e. corresponding to the timing when the second clock signal CLK2 rises to high level).

Note that as shown in this diagram, the reset timing of the first ramp signal VR1 and the inverted first ramp signal VR1B coincides with the midpoint of the ON period ton (i.e. the timing when ton/2 has elapsed after the coil current IL starts to increase).

Therefore, the current detecting portion 50 performs sampling of the coil current IL using the one-shot pulse of the timing control signal ST as a trigger, and hence can generate the current sense signal ISNS commensurate with the center value Ic of the coil current IL in the ON period ton.

Eighth Embodiment

Figure 27:
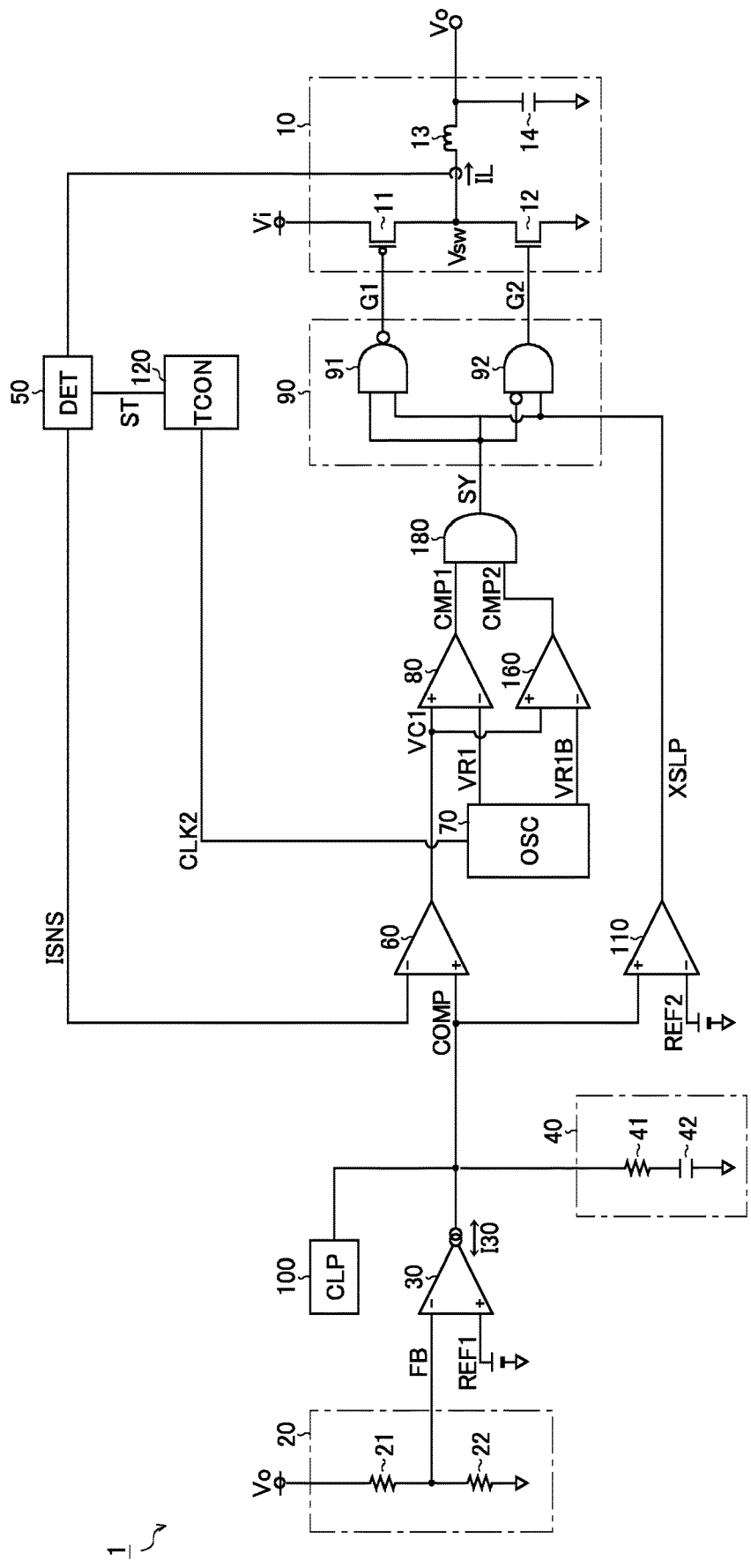
FIG. 27 is a diagram showing an eighth embodiment of the DC-DC converter.

FIG. 27 is a diagram showing an eighth embodiment of the DC-DC converter. The DC-DC converter 1 of this embodiment is based on the seventh embodiment (FIG. 23) and is characterized in that an AND gate 180 is used instead of the OR gate 170. Therefore the same structural element as in the seventh embodiment is denoted by the same numeral or symbol as in FIG. 23 so that overlapping description is omitted, and a characterized part of the eighth embodiment is mainly described below.

In the DC-DC converter 1 of this embodiment, the AND gate 180 generates an AND signal SY of the first comparison signal CMP1 and the second comparison signal CMP2 (i.e. corresponding to the control signal for the switching output stage 10) and outputs it to the driver 90. The AND signal SY becomes high level when both the first comparison signal CMP1 and the second comparison signal CMP2 are at high level, while it becomes low level when at least one of the first comparison signal CMP1 and the second comparison signal CMP2 is at low level.

Figure 28:
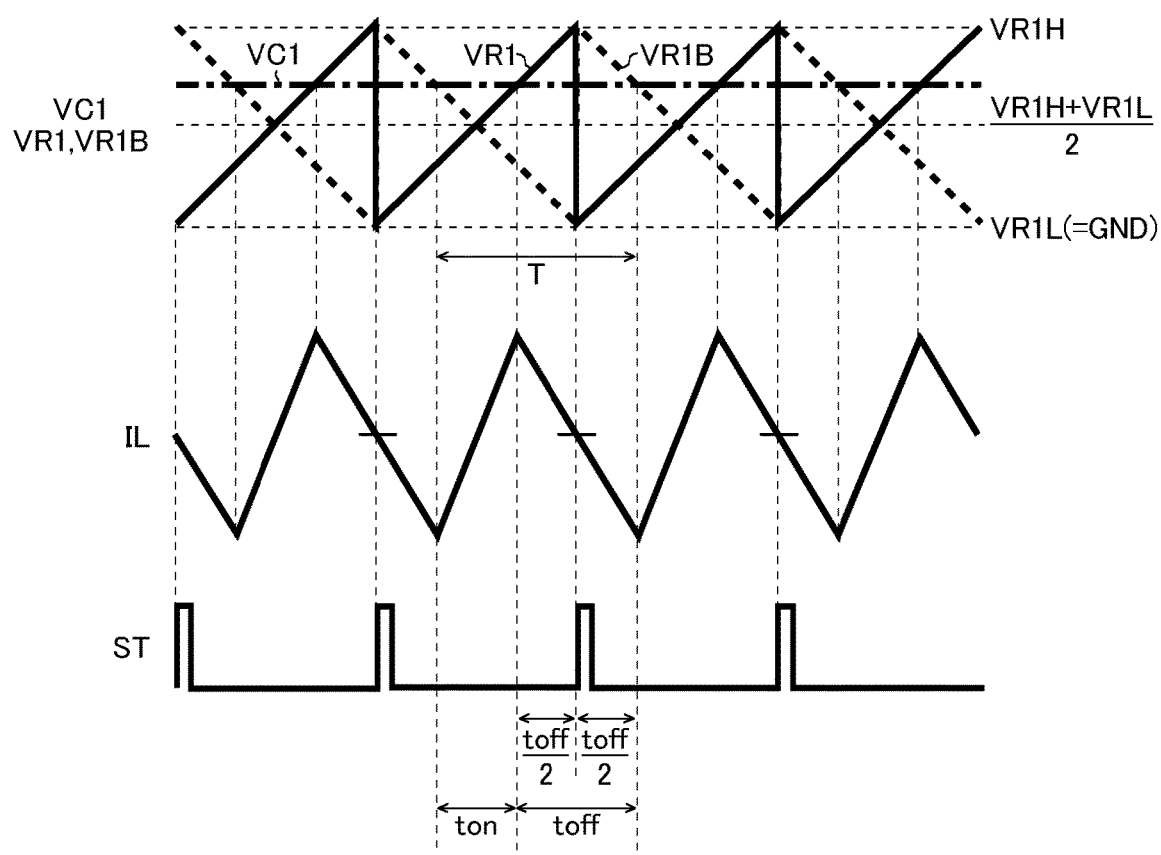
FIG. 28 is a diagram showing one operational example of a timing control unit in the eighth embodiment.

FIG. 28 is a waveform diagram showing one operational example of the timing control unit 120 according to the eighth embodiment, in which the first analog signal VC1 (dot-dashed line), the first ramp signal VR1 (solid line), and the inverted first ramp signal VR1B (broken line), the coil current IL, and the timing control signal ST are shown in order from upper to lower in the same manner as FIG. 26 described above.

In the operational example of this diagram too, the first ramp signal VR1 and the inverted first ramp signal VR1B repeat increase or decrease and reset with opposite polarities at the same switching period T between the peak value VR1H and the bottom value VR1L. On the other hand, the first analog signal VC1 varies within a voltage range satisfying (VR1H+VR1L)/2<VC1<VR1H.

Note that when the first analog signal VC1 is higher than each of the first ramp signal VR1 and the inverted first ramp signal VR1B, the switching output stage 10 becomes the ON period ton, and the coil current IL is increased. On the other hand, when the first analog signal VC1 is lower than at least one of the first ramp signal VR1 and the inverted first ramp signal VR1B, the switching output stage 10 becomes the OFF period toff, and the coil current IL is decreased.

In other words, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller.

Further, the timing control unit 120 generates a one-shot pulse in the timing control signal ST at the reset timing of the first ramp signal VR1 and the inverted first ramp signal VR1B (i.e. corresponding to the timing when the second clock signal CLK2 rises to high level).

Note that as shown in this diagram, the reset timing of the first ramp signal VR1 and the inverted first ramp signal VR1B coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff.

Ninth Embodiment

Figure 29:
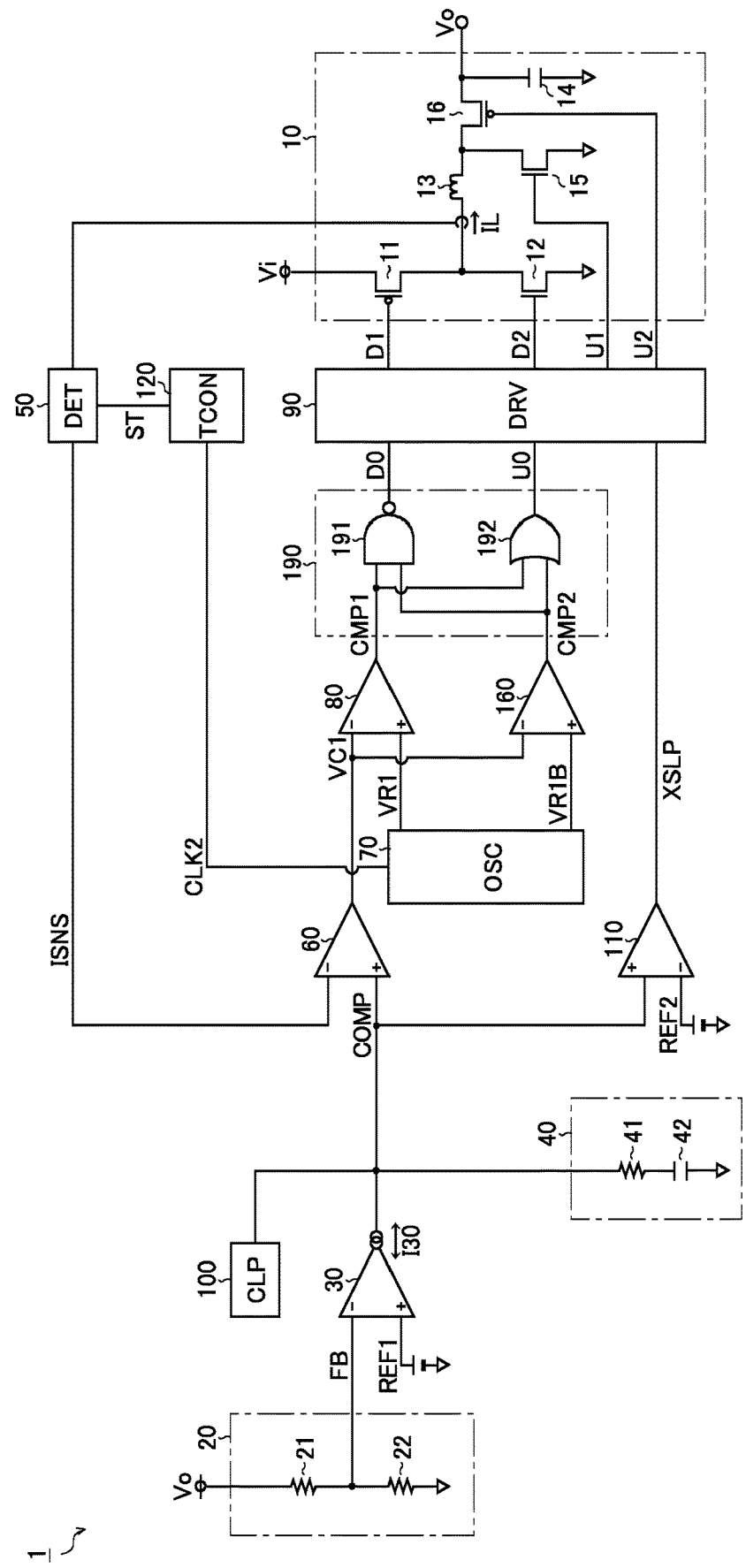
FIG. 29 is a diagram showing a ninth embodiment of the DC-DC converter.

FIG. 29 is a diagram showing a ninth embodiment of the DC-DC converter. The DC-DC converter 1 of this embodiment is based on the seventh embodiment (FIG. 23) and the eighth embodiment (FIG. 27), and is characterized in that the switching output stage 10 is replaced with a step-up/down type, input polarities of the PWM comparators 80 and 160 are each inverted, and a logical arithmetic unit 190 is used instead of the OR gate 170 and the AND gate 180. Therefore, the same structural element as in the seventh embodiment and the eighth embodiment is denoted by the same numeral or symbol as in FIGS. 23 and 27 so that overlapping description is omitted, and a characterized part of the ninth embodiment is mainly described below.

In the DC-DC converter 1 of this embodiment, the switching output stage 10 includes a step-up output transistor 15 (NMOSFET in this diagram) and a synchronous rectification transistor 16 (PMOSFET in this diagram) in addition to the step-down output transistor 11 and the synchronous rectification transistor 12, so as to step up or down the input voltage Vin for generating a desired output voltage Vout.

The source of the output transistor 11 is connected to the application terminal of the input voltage Vi. The drain of the output transistor 11 and the drain of the synchronous rectification transistor 12 are connected to the first terminal of the coil 13. The source of the synchronous rectification transistor 12 is connected to the ground terminal. The drain of the output transistor 15 and the drain of the synchronous rectification transistor 16 are connected to the second terminal of the coil 13. The source of the output transistor 15 is connected to the ground terminal. The source of the synchronous rectification transistor 16 is connected to the output terminal of the output voltage Vo and the first terminal of the capacitor 14. The second terminal of the capacitor 14 is connected to the ground terminal.

The output transistor 11 is turned on when a step-down drive signal D1 is at low level and is turned off when the step-down drive signal D1 is at high level. The synchronous rectification transistor 12 is turned on when a step-down drive signal D2 is at high level and is turned off when the step-down drive signal D2 is at low level. The output transistor 15 is turned on when a step-up drive signal U1 is at high level and is turned off when the step-up drive signal U1 is at low level. The synchronous rectification transistor 16 is turned on when a step-up drive signal U2 is at low level and is turned off when the step-up drive signal U2 is at high level.

In addition, in the DC-DC converter 1 of this embodiment, the logical arithmetic unit 190 includes a NAND gate 191 and an OR gate 192, and receives inputs of the first comparison signal CMP1 and the second comparison signal CMP2 so as to generate a step-down control signal D0 and a step-up control signal U0.

The NAND gate 191 generates the step-down control signal D0 by NAND operation of the first comparison signal CMP1 and the second comparison signal CMP2. Therefore, the step-down control signal D0 becomes low level when both the first comparison signal CMP1 and the second comparison signal CMP2 are at high level, and it becomes high level when at least one of the first comparison signal CMP1 and the second comparison signal CMP2 is at low level.

The OR gate 192 generates the step-up control signal U0 by OR operation of the first comparison signal CMP1 and the second comparison signal CMP2. Therefore, the step-up control signal U0 becomes low level when both the first comparison signal CMP1 and the second comparison signal CMP2 are at low level, and it becomes high level when at least one of the first comparison signal CMP1 and the second comparison signal CMP2 is at high level.

In other words, the logical arithmetic unit 190 receives inputs of the first comparison signal CMP1 and the second comparison signal CMP2, extracts a state where the first analog signal VC1 is lower than each of the first ramp signal VR1 and the inverted first ramp signal VR1B (CMP1=CMP2=H), and the opposite state where the first analog signal VC1 is higher than each of the first ramp signal VR1 and the inverted first ramp signal VR1B (CMP1=CMP2=L), generates the step-down control signal D0 based on one of the extraction results, and generates the step-up control signal U0 based on the other extraction result.

In addition, in the DC-DC converter 1 of this embodiment, the driver 90 receives inputs of the step-down control signal D0 and the step-up control signal U0, generates the step-down drive signals D1 and D2, and the step-up drive signals U1 and U2, and drives the switching output stage 10 using the drive signals.

Figure 30:
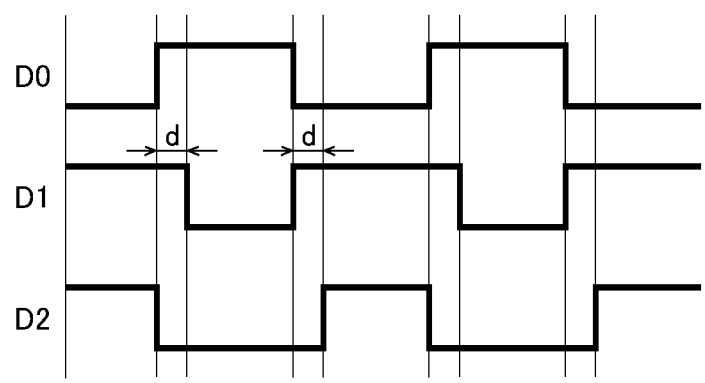
FIG. 30 is a timing chart showing an operation of generating a step-down drive signal.

FIG. 30 is a timing chart showing generation operation of the step-down drive signals D1 and D2, in which the step-down control signal D0, and the step-down drive signals D1 and D2 are shown.

The step-down drive signal D1 becomes low level after a delay time d from a rising edge of the step-down control signal D0 and becomes high level synchronously with a falling edge of the step-down control signal D0. In contrast, the step-down drive signal D2 becomes low level synchronously with a rising edge of the step-down control signal D0 and becomes high level after the delay time d from a falling edge of the step-down control signal D0.

In this way, the step-down drive signals D1 and D2 are basically a logically inverted signal of the step-down control signal D0. Therefore, the output transistor 11 and the synchronous rectification transistor 12 are turned on and off in a complementary manner. However, the step-down drive signals D1 and D2 are provided with a period in which both the output transistor 11 and the synchronous rectification transistor 12 are turned off for the delay time d (so-called dead time). Therefore, it is possible to prevent occurrence of a through-current due to simultaneous turning on of the output transistor 11 and the synchronous rectification transistor 12.

Figure 31:
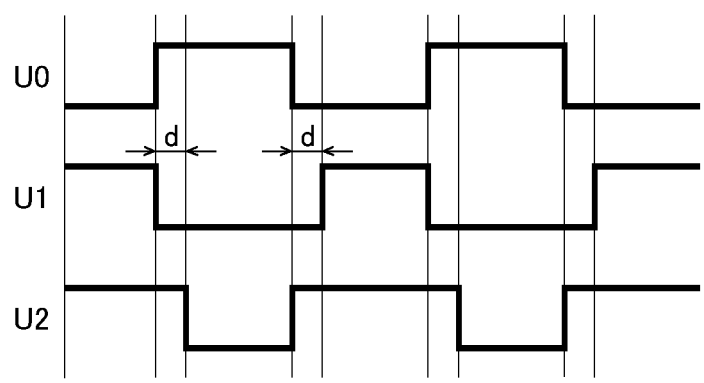
FIG. 31 is a timing chart showing an operation of generating a step-up drive signal.

FIG. 31 is a timing chart showing generation operation of the step-up drive signals U1 and U2, in which the step-up control signal U0, and the step-up drive signals U1 and U2 are shown.

The step-up drive signal U1 becomes low level synchronously with a rising edge of the step-up control signal U0 and becomes high level after the delay time d from a falling edge of the step-up control signal U0. In contrast, the step-up drive signal U2 becomes low level after the delay time d from the rising edge of the step-up control signal U0 and becomes high level synchronously with the falling edge of the step-up control signal U0.

In this way, the step-up drive signals U1 and U2 are basically a logically inverted signal of the step-up control signal U0. Therefore, the output transistor 15 and the synchronous rectification transistor 16 are turned on and off in a complementary manner. However, the step-up drive signals U1 and U2 are provided with a period in which both the output transistor 15 and the synchronous rectification transistor 16 are turned off for the delay time d (so-called dead time). Therefore, it is possible to prevent occurrence of a through-current due to simultaneous turning on of the output transistor 15 and the synchronous rectification transistor 16.

Figure 32:
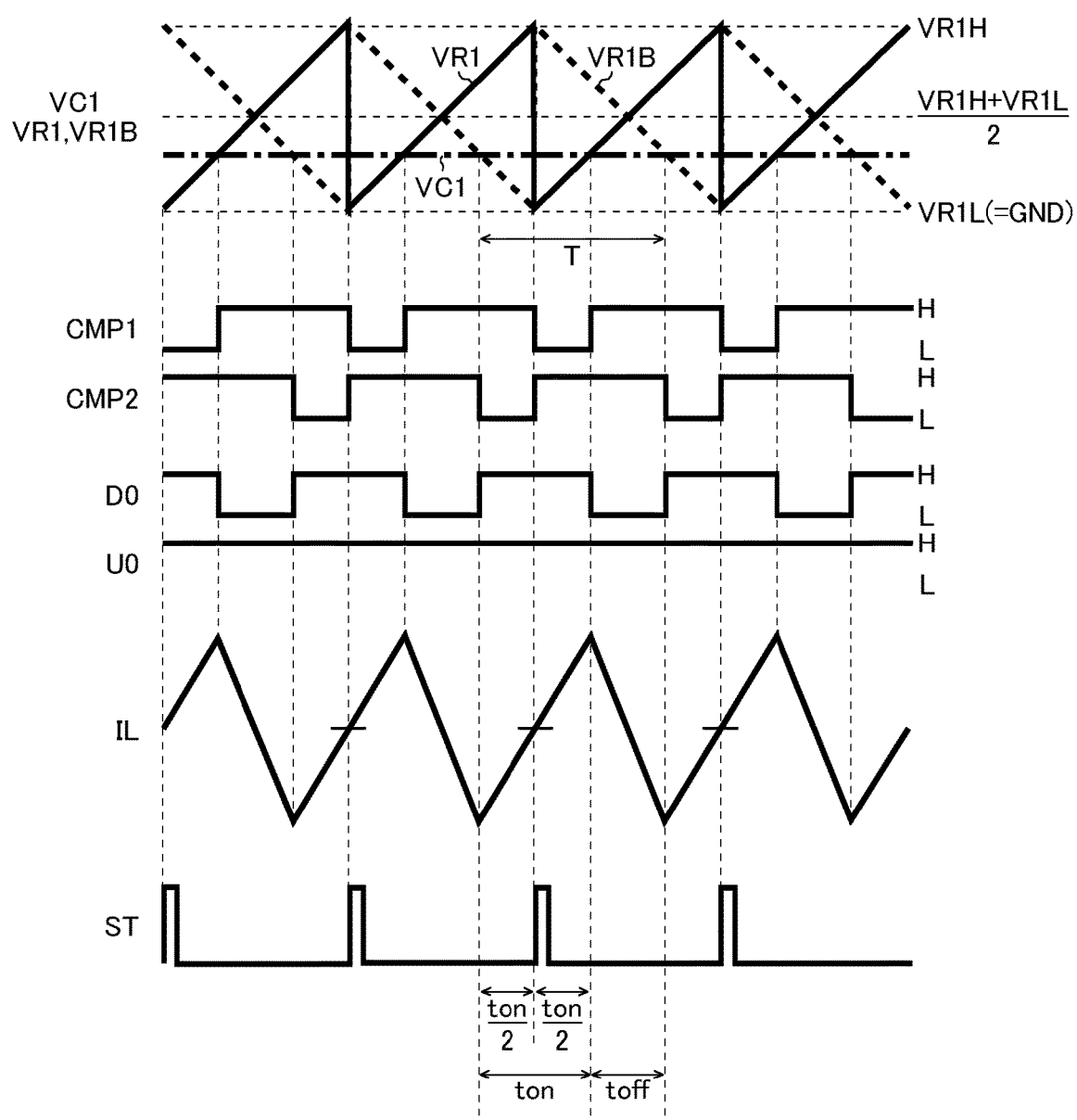
FIG. 32 is a diagram showing a first operational example (in step-down) of a timing control unit in the ninth embodiment.

FIG. 32 is a waveform diagram showing a first operational example (in step-down) of the timing control unit 120 according to the ninth embodiment, in which the first analog signal VC1 (dot-dashed line), the first ramp signal VR1 (solid line), and the inverted first ramp signal VR1B (broken line), the first comparison signal CMP1 and the second comparison signal CMP2, the step-down control signal D0 and the step-up control signal U0, the coil current IL, and the timing control signal ST are shown in order from upper to lower.

As shown in FIG. 25 described above, too, the first ramp signal VR1 and the inverted first ramp signal VR1B repeat increase or decrease and reset with opposite polarities at the same switching period T between the peak value VR1H and the bottom value VR1L.

When VR1L<VC1<(VR1H+VR1L)/2 is satisfied, the step-up control signal U0 is always at high level, and hence the output transistor 15 is always turned off, while the synchronous rectification transistor 16 is always turned on. On the other hand, because the step-down control signal D0 is pulse-driven with the on-duty ratio Don (i.e. the ratio of the ON period ton to the switching period T) corresponding to the first analog signal VC1, the output transistor 11 and the synchronous rectification transistor 12 are turned on and off in a complementary manner.

When the output transistor 11 is turned on while the synchronous rectification transistor 12 is turned off, energy is accumulated in the coil 13. On the other hand, when the output transistor 11 is turned off while the synchronous rectification transistor 12 is turned on, the energy accumulated in the coil 13 is discharged. By repeating this accumulation and discharge of energy, the input voltage Vi is stepped down so that the output voltage Vo is generated.

Note that when the first analog signal VC1 is higher than at least one of the first ramp signal VR1 and the inverted first ramp signal VR1B, the switching output stage 10 becomes the ON period ton, and the coil current IL is increased. On the other hand, when the first analog signal VC1 is lower than each of the first ramp signal VR1 and the inverted first ramp signal VR1B, the switching output stage 10 becomes the OFF period toff, and the coil current IL is decreased.

In other words, in the step-down operation of this diagram, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller.

Further, the timing control unit 120 generates a one-shot pulse in the timing control signal ST at the reset timing of the first ramp signal VR1 and the inverted first ramp signal VR1B (i.e. corresponding to the timing when the second clock signal CLK2 rises to high level).

Note that as shown in this diagram, the reset timing of the first ramp signal VR1 and the inverted first ramp signal VR1B coincides with the midpoint of the ON period ton (i.e. the timing when ton/2 has elapsed after the coil current IL starts to increase).

Therefore, the current detecting portion 50 performs sampling of the coil current IL using the one-shot pulse of the timing control signal ST as a trigger, and hence can generate the current sense signal ISNS commensurate with the center value Ic of the coil current IL in the ON period ton. In this way, the sampling timing in the step-down operation is the same as FIG. 26 described above.

Figure 33:
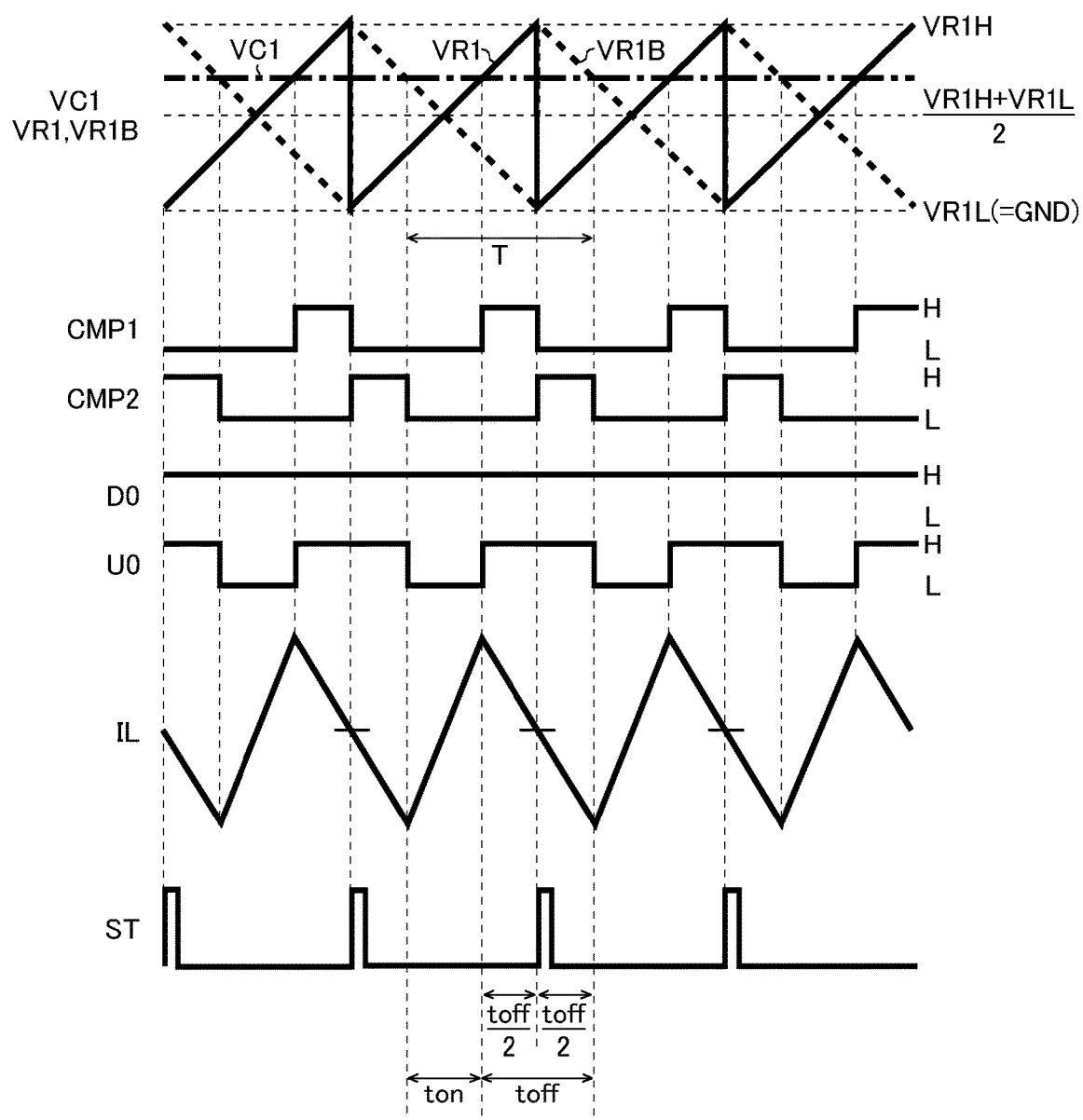
FIG. 33 is a diagram showing a second operational example (in step-up) of the timing control unit in the ninth embodiment.

FIG. 33 is a waveform diagram showing a second operational example (in step-up) of the timing control unit 120 according to the ninth embodiment, in which the first analog signal VC1 (dot-dashed line), the first ramp signal VR1 (solid line), and the inverted first ramp signal VR1B (broken line), the first comparison signal CMP1 and the second comparison signal CMP2, the step-down control signal D0 and the step-up control signal U0, the coil current IL, and the timing control signal ST are shown in order from upper to lower.

In the operational example of this diagram too, the first ramp signal VR1 and the inverted first ramp signal VR1B repeat increase or decrease and reset with opposite polarities at the same switching period T between the peak value VR1H and the bottom value VR1L.

When (VR1H+VR1L)/2<VC1<VR1H is satisfied, the step-down control signal D0 is always at high level, and hence the output transistor 11 is always turned on while the synchronous rectification transistor 12 is always turned off. On the other hand, the step-up control signal U0 is pulse-driven with the on-duty ratio Don (i.e. the ratio of the ON period ton to the switching period T) corresponding to the first analog signal VC1, and hence the output transistor 15 and the synchronous rectification transistor 16 are turned on and off in a complementary manner.

When the output transistor 15 is turned on while the synchronous rectification transistor 16 is turned off, energy is accumulated in the coil 13. On the other hand, when the output transistor 15 is turned off while the synchronous rectification transistor 16 is turned on, the energy accumulated in the coil 13 is discharged. By repeating this accumulation and discharge of energy, the input voltage Vi is stepped up so that the output voltage Vo is generated.

Note that when the first analog signal VC1 is higher than each of the first ramp signal VR1 and the inverted first ramp signal VR1B, the switching output stage 10 becomes the ON period ton, and the coil current IL is increased. On the other hand, when the first analog signal VC1 is lower than at least one of the first ramp signal VR1 and the inverted first ramp signal VR1B, the switching output stage 10 becomes the OFF period toff, and the coil current IL is decreased.

In other words, in the step-up operation of this diagram, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller.

Further, the timing control unit 120 generates a one-shot pulse in the timing control signal ST at the reset timing of the first ramp signal VR1 and the inverted first ramp signal VR1B (i.e. corresponding to the timing when the second clock signal CLK2 rises to high level).

Note that as shown in this diagram, the reset timing of the first ramp signal VR1 and the inverted first ramp signal VR1B coincides with the midpoint of the OFF period toff (i.e. the timing when toff/2 has elapsed after the coil current IL starts to decrease).

Therefore, the current detecting portion 50 performs sampling of the coil current IL using the one-shot pulse of the timing control signal ST as a trigger, and hence can generate the current sense signal ISNS commensurate with the center value Ic of the coil current IL in the OFF period toff. In this way, the sampling timing in the step-up operation is the same as FIG. 28 described above.

Tenth Embodiment

The DC-DC converter 1 of this embodiment has basically the same structure as the first embodiment (FIG. 1) and characterized in a circuit structure of the timing control unit 120. Therefore, description of the overall structure of the DC-DC converter 1 is omitted, and a characterized part of the tenth embodiment is mainly described below.

Figure 34:
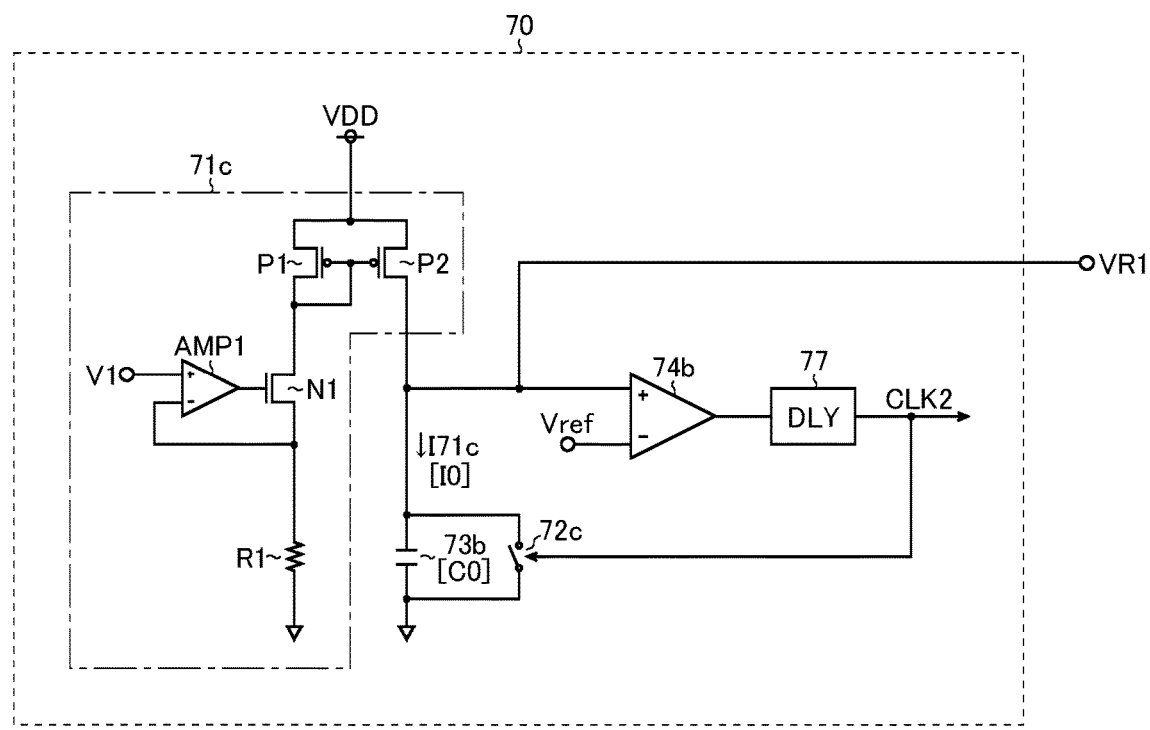
FIG. 34 is a diagram showing one structural example of an oscillator in a tenth embodiment.

First, prior to description of the structure and operation of the timing control unit 120, the structure and operation of the oscillator 70 are described in a supplementary manner with reference to FIG. 34.

FIG. 34 is a circuit diagram showing one structural example of the oscillator 70 according to the tenth embodiment. The oscillator 70 of this structural example is based on the seventh embodiment (FIG. 24), and structural elements related to generation of the inverted first ramp signal VR1B (the current source 71d, the switch 72d, and the capacitor 73c) are eliminated.

In addition, for easy understanding of the description, the oscillator 70 of this structural example generates the first ramp signal VR1 in which the reference voltage Vref is the peak value while the ground voltage GND is the bottom value. More specifically, the reference voltage Vref is input to the inverting input terminal (−) of the comparator 74b, and the ground voltage GND is applied to the second terminal of the capacitor 73b.

Further, in the oscillator 70 of this structural example, as circuit elements forming the current source 71c, P-channel MOS field-effect transistors P1 and P2, an N-channel MOS field-effect transistor N1, and an operational amplifier AMP1, and a resistor R1 are specifically shown.

The sources of the transistors P1 and P2 are both connected to the application terminal of the power supply voltage VDD. The gates of the transistors P1 and P2 are connected to the drain of the transistor P1. The drain of the transistor P1 is connected to the drain of the transistor N1. The drain of the transistor P2 is connected to the first terminal of the capacitor 73b, as the output terminal of the charging current I71c.

A noninverting input terminal (+) of the operational amplifier AMP1 is connected to an application terminal of a constant voltage Vi. An inverting input terminal (−) of the operational amplifier AMP1 is connected to the source of the transistor N1 and a first terminal of the resistor R1. The output terminal of the operational amplifier AMP1 is connected to the gate of the transistor N1. A second terminal of the resistor R1 is connected to the ground terminal.

In the current source 71c having the structure described above, the operational amplifier AMP1 performs gate control of the transistor N1 so that the noninverting input terminal (+) and the inverting input terminal (−) are short-circuited in an imaginary manner. Therefore, the first terminal of the resistor R1 is applied with the constant voltage V1, and hence a predetermined drain current (V1/R1) flows in the transistor N1.

The transistors P1 and P2 constitute a current mirror, which mirrors the drain current (V1/R1) by a mirror ratio $\alpha$, so as to generate the charging current I71c (=$\alpha \times$(V1/R1)) of the capacitor 73b.

Note that when current value of the charging current I71c is I0 and capacitance value of the capacitor 73b is C0, in order to generate the first ramp signal VR1 and the second clock signal CLK2 at the desired switching period T, the mirror ratio $\alpha$, a voltage value of the constant voltage V1, and a resistance value of the resistor R1 are appropriately set so that I0=Vref$\times$C0$\times$(1/T) is satisfied.

Figure 35:
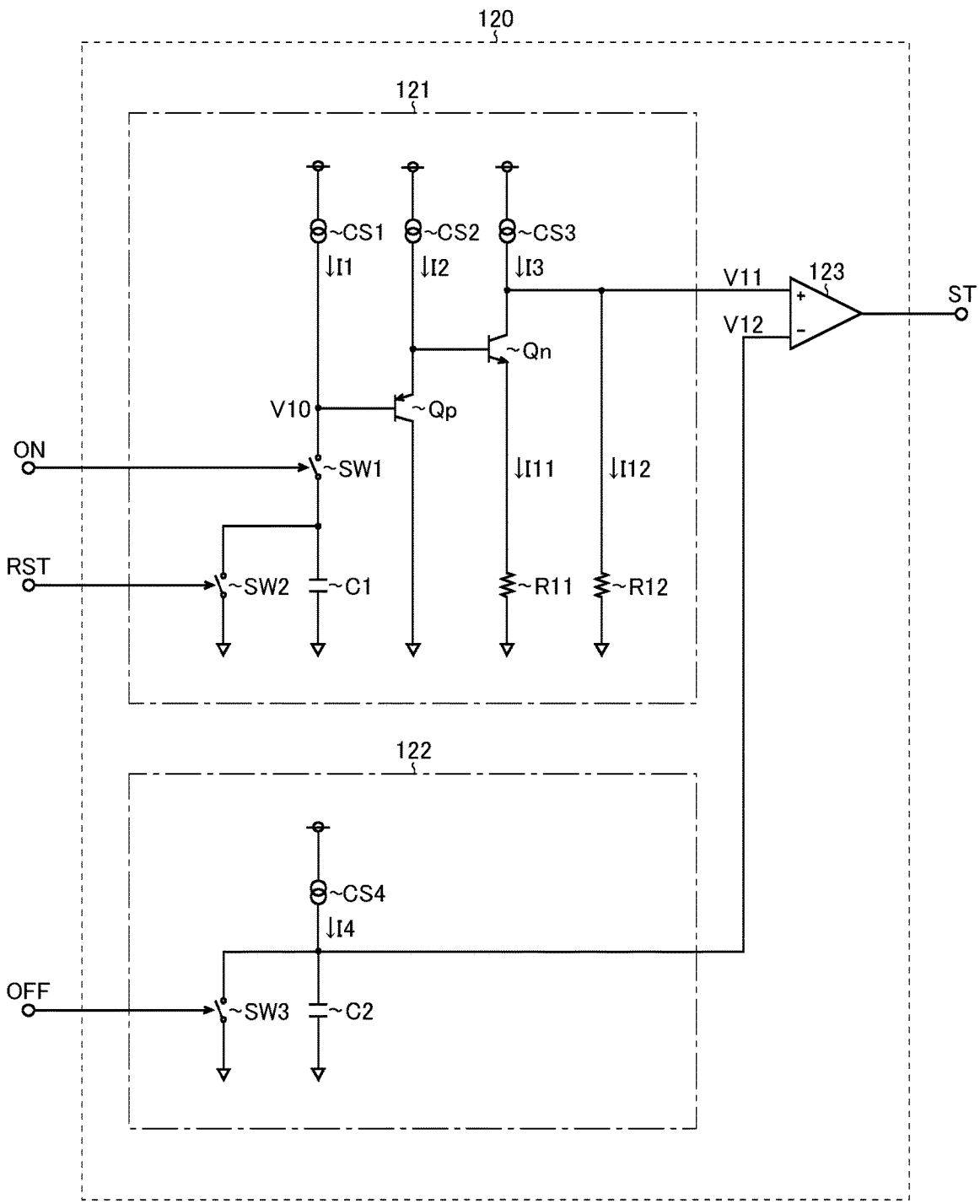
FIG. 35 is a diagram showing one structural example of a timing control unit in the tenth embodiment.

FIG. 35 is a circuit diagram showing one structural example of the timing control unit 120 according to the tenth embodiment. The timing control unit 120 of this structural example includes a first internal signal generation portion 121, a second internal signal generation portion 122, and a comparator 123.

The first internal signal generation portion 121 is a circuit portion that performs charge and discharge of the capacitor C1 in synchronization with an on-signal ON so as to generate a first internal signal V11, and includes the capacitor C1, current sources CS1 to CS3, switches SW1 and SW2, a pnp bipolar transistor Qp, an npn bipolar transistor Qn, and resistors R11 and R12.

First terminals of the current sources CS1 to CS3 are all connected to a power supply terminal. A second terminal of the current source CS1 is connected to the base of the transistor Qp and a first terminal of the switch SW1. A second terminal of the switch SW1 is connected to a first terminal of the capacitor C1 and a first terminal of the switch SW2. A second terminal of the current source CS2 is connected to the base of the transistor Qn and the emitter of the transistor Qp. A second terminal of the current source CS3 is connected to a noninverting input terminal (+) of the comparator 123, the collector of the transistor Qn, and a first terminal of the resistor R12. The emitter of the transistor Qn is connected to a first terminal the resistor R11. A second terminal of the capacitor C1, a second terminal of the switch SW2, the collector of the transistor Qp, and second terminals of the resistors R11 and R12 are all connected to the ground terminal. The control terminal of the switch SW1 is connected to an application terminal of the on-signal ON. The control terminal of the switch SW2 is connected to an application terminal of a reset signal RST.

The switch SW1 is turned on when the switching output stage 10 is in the ON period ton (e.g. ON=H), while it is turned off when the switching output stage 10 is in the OFF period toff (e.g. ON=L). Note that the on-signal ON is a logic signal that synchronizes with ON/OFF control of the switching output stage 10, and the first comparison signal CMP1 can be used as it, for example.

The switch SW2 is turned on when the reset signal RST is at high level and is turned off when the reset signal RST is at low level, for example. The reset signal RST is a signal for discharging the capacitor C1 prior to the ON period ton, and the second clock signal CLK2 described above (see FIG. 34) can be used as it, for example.

The second internal signal generation portion 122 is a circuit portion that performs charge and discharge of the capacitor C2 in synchronization with an off-signal OFF so as to generate a second internal signal V12, and it includes the capacitor C2, a current source CS4, and a switch SW3.

A first terminal of the current source CS4 is connected to the power supply terminal. A second terminal of the current source CS4 is connected to an inverting input terminal (−) of the comparator 123, a first terminal of the capacitor C2, and a first terminal of the switch SW3. A second terminal of the capacitor C2 and a second terminal of the switch SW3 are connected to the ground terminal. The control terminal of the switch SW3 is connected to an application terminal of the off-signal OFF.

The switch SW3 is turned on when the switching output stage 10 is in the ON period ton (e.g. OFF=H) and is turned off when the switching output stage 10 is in the OFF period toff (e.g. OFF=L). Note that the off-signal OFF is a logic signal that synchronizes with ON/OFF control of the switching output stage 10, and the first comparison signal CMP1 can be used as it, for example.

The comparator 123 compares the first internal signal V11 input to the noninverting input terminal (+) with the second internal signal V12 input to the inverting input terminal (−), so as to generate the timing control signal ST. The timing control signal ST becomes high level when the first internal signal V11 is higher than the second internal signal V12, and on the contrary, it becomes low level when the first internal signal V11 is lower than the second internal signal V12.

In this way, unlike the fourth to ninth embodiments (FIGS. 8 to 33) described above, the timing control unit 120 in this embodiment uses the first internal signal V11 and the second internal signal V12 generated by itself in synchronization with ON/OFF control of the switching output stage 10, and generates the timing control signal ST so that the coil current IL is sampled at the midpoint of the OFF period toff of the switching output stage 10. In the following description, a specific operational example of the timing control unit 120 is described in detail with reference to this diagram and FIG. 36.

Figure 36:
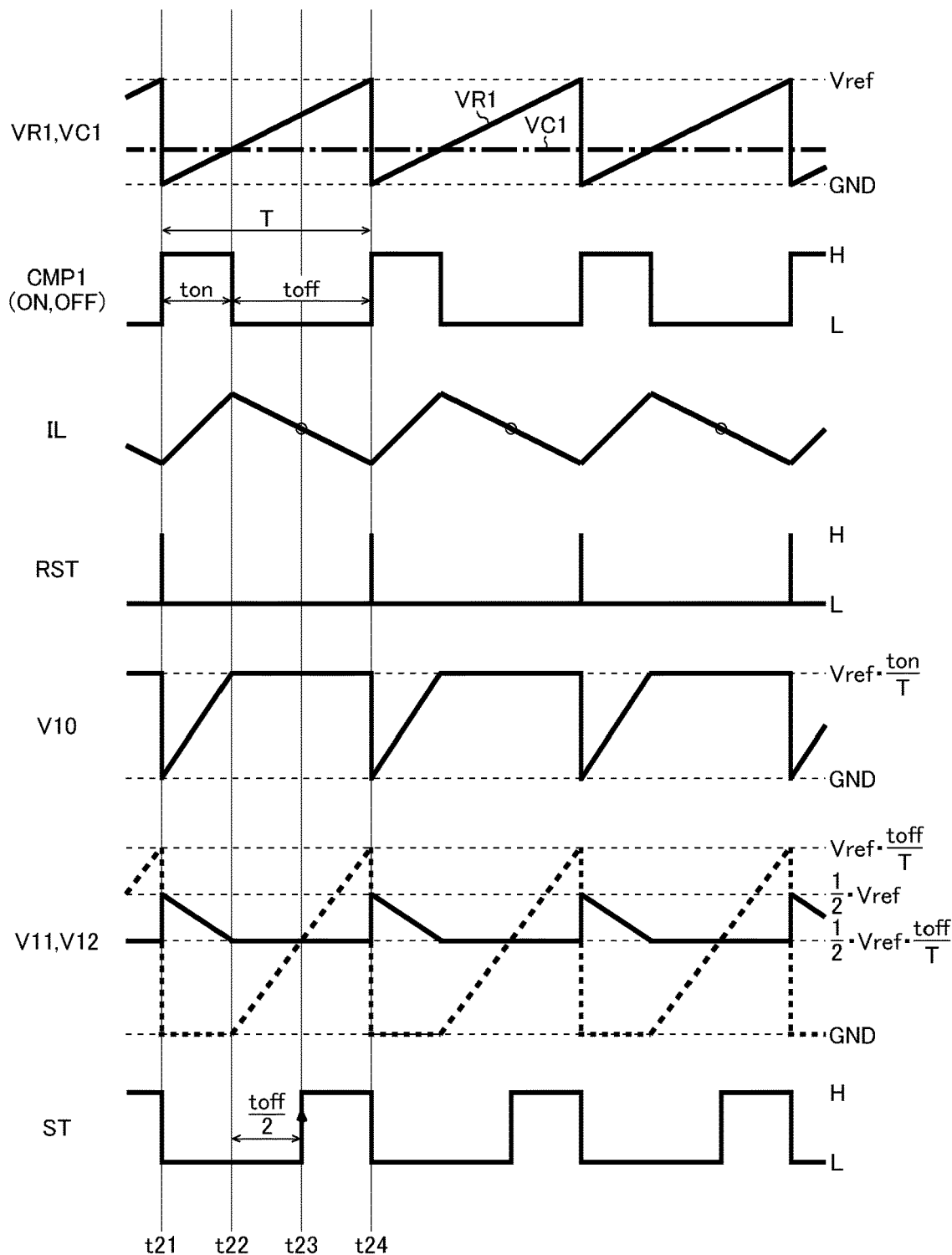
FIG. 36 is a diagram showing one operational example of the timing control unit in the tenth embodiment.

FIG. 36 is a waveform diagram showing one operational example of the timing control unit 120 according to the tenth embodiment, in which the first ramp signal VR1 (solid line) and the first analog signal VC1 (dot-dashed line), the first comparison signal CMP1 (i.e. the on-signal ON and the off-signal OFF), the coil current IL, the reset signal RST, a charging voltage V10 for the capacitor C1, the first internal signal V11 (solid line) and the second internal signal V12 (broken line), and the timing control signal ST are shown in order from upper to lower.

First, with reference to upper three stages in this diagram (VR1/VC1, CMP1, and IL), the entire operation of the DC-DC converter 1 is reconfirmed.

When the first analog signal VC1 is higher than the first ramp signal VR1, the switching output stage 10 becomes the ON period ton (i.e. time t21 to time t22), and the coil current IL is increased. On the other hand, when the first analog signal VC1 is lower than the first ramp signal VR1, the switching output stage 10 becomes the OFF period toff (i.e. time t22 to time t24), and the coil current IL is decreased. In other words, as the first analog signal VC1 is higher, the on-duty ratio Don of the switching output stage 10 (=ton/T) becomes larger. On the contrary, as the first analog signal VC1 is lower, the on-duty ratio Don of the switching output stage 10 becomes smaller.

In this way, the entire operation of the DC-DC converter 1 is not different from that of the first embodiment (FIG. 1).

Next, with reference to the lower four stages in this diagram (RST, V10, V11/V12, and ST), the operation of the timing control unit 120 is described in detail.

First, noting the first internal signal generation portion 121, at time t21, prior to the ON period ton of the switching output stage 10, a one-shot pulse is generated in the reset signal RST. As a result, the switch SW2 is turned on so that the capacitor C1 is discharged, and hence the charging voltage V10 is reset to zero value (i.e. GND).

After that, in the ON period ton of the switching output stage 10 (i.e. time t21 to time t22), the switch SW1 is turned on so that the current source CS1 is electrically connected to the capacitor C1. As a result, the capacitor C1 is charged by charging current I1 supplied from the current source CS1, and hence the charging voltage V10 is increased at a predetermined gradient (=I1/C1) as time t passes. Therefore, when I1 is set to Vref×C1×(1/T), the charging voltage V10($t$) after time t has elapsed from time t21 can be expressed as V10($t$)=Vref×(t/T). In other words, V10 becomes GND at time t21 (t=0), and V10 becomes Vref×(ton/T) at time t22 (t=ton).

Note that the charging voltage V10 is applied to the first terminal of the resistor R11 via the transistors Qp and Qn which are supplied with drive current I2 from the current source CS2. Therefore, a lower side current I11 (=V10/R11) corresponding to the charging voltage V10 flows in the resistor R11. In this way, the current source CS2, the transistors Qp and Qn, and the resistor R11 work as a voltage-to-current converter that converts the charging voltage V10 for the capacitor C1 into the lower side current I11.

In addition, a differential current I12 (=I3−I11), obtained by subtracting the above-mentioned lower side current I11 from an upper side current I3 generated by the current source CS3, flows in the resistor R12. Therefore, the first internal signal V11 extracted from the first terminal of the resistor R12 can be expressed as V11=I12×R12. In this way, the resistor R12 works as a current-to-voltage converter that converts the differential current I12 between the upper side current I3 and the lower side current I11 into the first internal signal V11.

When I3 is set to Vref/R11 and R11 is set to 2×R12, the first internal signal V11($t$) after time t has elapsed from time t21 can be expressed as V11($t$)=(½)×Vref×(1−(t/T)). In other words, V11 becomes (½)×Vref at time t21 (t=0), and V11 becomes (½)×Vref×(toff/T) at time t22 (t=ton).

On the other hand, in the OFF period toff (i.e. time t22 to time t24) of the switching output stage 10, the switch SW1 is turned off. Therefore, increase of the charging voltage V10 is stopped and maintained at the voltage value just before the first internal signal V11 is turned off (i.e. (½)×Vref×(toff/T)).

In this way, in the ON period ton of the switching output stage 10, the first internal signal V11 varies from half the reference voltage Vref (i.e. (½)×Vref) to a value ((½)×Vref× (toff/T)) obtained by multiplying the same by an off-duty ratio of the switching output stage 10 (=toff/T, i.e. a ratio of the OFF period toff to the switching period T). After that, the first internal signal V11 is maintained at the value in the OFF period toff of the switching output stage 10.

Next, noting the second internal signal generation portion 122, in the ON period ton of the switching output stage 10 (i.e. time t21 to time t22), the switch SW3 is turned on so that both terminals of the capacitor C2 are short-circuited, and hence the second internal signal V12 is maintained at zero value (i.e. GND). Therefore, in the ON period ton of the switching output stage 10, the first internal signal V11 is always higher than the second internal signal V12, and hence the timing control signal ST is maintained at low level.

On the other hand, in the OFF period toff (i.e. time t22 to time t24) of the switching output stage 10, the switch SW3 is turned off. As a result, the capacitor C2 is charged by charging current I4 supplied from the current source CS4, and hence the second internal signal V12 is increased at a predetermined gradient (=I4/C2) as time t passes. Therefore, when I4 is set to Vref×C2×(1/T), the second internal signal V12(t) after time t has elapsed from time t22 can be expressed as V12(t)=Vref×(t/T). In other words, V12 becomes GND at time t22 (t=0), and V12 becomes Vref×(toff/T) at time t24 (t=toff).

In this way, the second internal signal V12 is maintained at zero value (i.e. GND) in the ON period ton of the switching output stage 10. After that, in the OFF period toff of the switching output stage 10, the second internal signal V12 varies from zero value to a value (Vref×(toff/T)) obtained by multiplying the reference voltage Vref by the off-duty ratio (i.e. toff/T).

Further, the timing when the first internal signal V11 and the second internal signal V12 cross each other (i.e. time t23) coincides with the midpoint of the OFF period toff (i.e. the timing when toff/2 has elapsed after the coil current IL starts to decrease). In other words, the timing control signal ST rises from low level to high level at time t23.

Therefore, the current detecting portion 50 performs sampling of the coil current IL using a rising edge of the timing control signal ST as a trigger, and hence can generate the current sense signal ISNS commensurate with the center value Ic of the coil current IL in the OFF period toff.

SUMMARY

In the following description, the various embodiments described above are described in a comprehensive manner.

The DC-DC converter described in this specification includes a current detecting portion arranged to sample coil current of a switching output stage at a timing corresponding to a timing control signal so as to generate a current sense signal, and a timing control unit arranged to generate the timing control signal so that the coil current is sampled at the midpoint of an OFF period of the switching output stage using a first internal signal and a second internal signal generated by itself in synchronization with ON/OFF control of the switching output stage, in which the DC-DC converter performs current-mode control output feedback control using the current sense signal, so as to generate a desired output voltage from an input voltage (first structure).

Note that in the DC-DC converter having the first structure, it is preferred to arrange that the timing control unit includes a first internal signal generation portion arranged to generate the first internal signal in synchronization with the ON period, a second internal signal generation portion arranged to generate the second internal signal in synchronization with the OFF period, and a comparator arranged to compare the first internal signal with the second internal signal so as to generate the timing control signal (second structure).

In addition, in the DC-DC converter having the second structure, it is preferred to arrange that the first internal signal varies from half a reference voltage to a value obtained by multiplying the half the reference voltage by an off-duty ratio of the switching output stage in the ON period, and after that in the OFF period the first internal signal is maintained at the value, while the second internal signal is maintained at zero value in the ON period, and after that in the OFF period the second internal signal varies from the zero value to a value obtained by multiplying the reference voltage by the off-duty ratio (third structure).

In addition, in the DC-DC converter having the third structure, it is preferred to arrange that the first internal signal generation portion includes a first capacitor, a first current source arranged to generate a charging current for the first capacitor, a first switch arranged to charge the first capacitor in the ON period, a second switch arranged to discharge the first capacitor prior to the ON period, a second current source arranged to generate a predetermined upper side current, a voltage-to-current converter arranged to convert a charging voltage for the first capacitor into a lower side current, a current-to-voltage converter arranged to convert a differential current between the upper side current and the lower side current into the first internal signal (fourth structure).

In addition, in the DC-DC converter having the third or fourth structure, it is preferred to arrange that the second internal signal generation portion includes a second capacitor, a current source arranged to generate a charging current for the second capacitor, and a switch arranged to charge the second capacitor in the OFF period (fifth structure).

In addition, the DC-DC converter having any one of first to fifth structures preferably includes an error amplifier arranged to generate an error signal corresponding to a difference between the output voltage or a feedback voltage corresponding to the output voltage and a predetermined reference voltage, an oscillator arranged to generate a ramp signal at a predetermined switching period, a differential amplifier arranged to generate an analog signal corresponding to a difference between the error signal and the current sense signal, a comparator arranged to compare the analog signal with the ramp signal so as to generate a comparison signal, and a driver arranged to generate a drive signal for the switching output stage according to the comparison signal (sixth structure).

In addition, the DC-DC converter having the sixth structure preferably further includes a damper arranged to limit the error signal to have a predetermined upper limit value or lower, or to have a predetermined lower limit value or higher (seventh structure).

In addition, the DC-DC converter having the sixth or seventh structure preferably further includes a light load detection comparator arranged to compare the error signal with a predetermined threshold value so as to control to enable or disable the switching output stage (eighth structure).

In addition, the DC-DC converter disclosed in this specification includes a comparator arranged to compare a first analog signal with a ramp signal so as to generate a control signal for a switching output stage, a current detecting portion arranged to sample coil current of the switching output stage at a timing corresponding to a timing control signal so as to generate a current sense signal, an average value generation portion arranged to generate a second analog signal having a simple average value of a signal value of the first analog signal and a start point value or an end point value of the ramp signal, and a timing control unit arranged to generate the timing control signal so that the coil current is sampled at the midpoint of an ON period or an OFF period of the switching output stage using the ramp signal and the second analog signal, in which the DC-DC converter performs current-mode control output feedback control using the current sense signal, so as to generate a desired output voltage from an input voltage (ninth structure).

In addition, the DC-DC converter disclosed in this specification includes a comparator arranged to compare a first analog signal with a first ramp signal so as to generate a control signal for a switching output stage, a current detecting portion arranged to sample coil current of the switching output stage at a timing corresponding to a timing control signal so as to generate a current sense signal, an average value generation portion arranged to generate a second analog signal having a weighted average value of a signal value of the first analog signal and a start point value or an end point value of the first ramp signal, and a timing control unit arranged to generate the timing control signal so that the coil current is sampled at the midpoint of an ON period or an OFF period of the switching output stage using a second ramp signal having a slew rate different from that of the first ramp signal and the second analog signal, in which the DC-DC converter performs current-mode control output feedback control using the current sense signal, so as to generate a desired output voltage from an input voltage (tenth structure).

In addition, in the DC-DC converter having the tenth structure, it is preferred to arrange that the second analog signal has a weighted average value of a signal value (weight m) of the first analog signal and a start point value (weight n) of the first ramp signal (where m+n=1, 0<m<1, 0<n<1, and m n), and the second ramp signal has a slew rate that is 2 m/(m+n) times that of the first ramp signal (eleventh structure).

In addition, in the DC-DC converter having any one of the ninth to eleventh structures, it is preferred to arrange that both the first ramp signal and the second ramp signal have a sawtooth waveform that repeats increase or decrease and reset at the same switching period (twelfth structure).

In addition, the DC-DC converter having any one of the ninth to twelfth structures preferably further includes an error amplifier arranged to generate an error signal corresponding to a difference between the output voltage or a feedback voltage corresponding to the output voltage and a predetermined reference voltage, and a differential amplifier arranged to generate the first analog signal according to a difference between the error signal and the current sense signal (thirteenth structure).

In addition, the DC-DC converter having the thirteenth structure preferably further includes a damper arranged to limit the error signal to have a predetermined upper limit value or lower, or to have a predetermined lower limit value or higher (fourteenth structure).

In addition, the DC-DC converter having the thirteenth or fourteenth structure preferably further includes a light load detection comparator arranged to compare the error signal with a predetermined threshold value so as to control to enable or disable the switching output stage (fifteenth structure).

In addition, the DC-DC converter disclosed in this specification includes an oscillator arranged to generate a ramp signal of a triangular waveform having the same slew rate for upward and downward changes, a comparator arranged to compare an analog signal with the ramp signal so as to generate a control signal for a switching output stage, a current detecting portion arranged to sample coil current of the switching output stage at a timing corresponding to a timing control signal so as to generate a current sense signal, and a timing control unit arranged to generate the timing control signal so that the coil current is sampled at a timing when the ramp signal has a peak value or a bottom value, in which the DC-DC converter performs current-mode control output feedback control using the current sense signal, so as to generate a desired output voltage from an input voltage (sixteenth structure).

Note that in the DC-DC converter having the sixteenth structure, it is preferred to arrange that the oscillator includes a capacitor connected between an output terminal of the ramp signal and a constant potential terminal, a first current source arranged to generate a predetermined charging current, a second current source arranged to generate a discharging current equal to the charging current, a switch arranged to switch between charging of the capacitor by the charging current and discharging by the discharging current according to a clock signal, and a clock signal generation portion arranged to compare the ramp signal with the peak value and the bottom value so as to generate the clock signal (seventeenth structure).

In addition, in the DC-DC converter having the seventeenth structure, the timing control unit is preferably arranged to generate the timing control signal using the clock signal (eighteenth structure).

In addition, the DC-DC converter disclosed in this specification includes an oscillator arranged to generate a ramp signal and an inverted ramp signal of sawtooth waveforms that repeat increase or decrease and reset at the same switching period with opposite polarities, a first comparator and a second comparator arranged to compare an analog signal with the ramp signal and the inverted ramp signal so as to generate a first comparison signal and a second comparison signal, respectively, a logical arithmetic unit arranged to generate a control signal for a switching output stage by logical operation using the first comparison signal and the second comparison signal, a current detecting portion arranged to sample coil current of the switching output stage at a timing corresponding to a timing control signal so as to generate a current sense signal, and a timing control unit arranged to generate the timing control signal so that the coil current is sampled at a reset timing of the ramp signal and the inverted ramp signal, in which the DC-DC converter performs current-mode control output feedback control using the current sense signal, so as to generate a desired output voltage from an input voltage (nineteenth structure).

Note that in the DC-DC converter having the nineteenth structure, it is preferred to arrange that the oscillator includes a first capacitor connected between an output terminal of the ramp signal and an application terminal of a first voltage, a second capacitor connected between an application terminal of a second voltage different from the first voltage and an output terminal of the inverted ramp signal, a first current source and a second current source arranged to generate charging currents for the first capacitor and the second capacitor, respectively, a first switch and a second switch arranged to respectively discharge the first capacitor and the second capacitor according to a clock signal, and a clock signal generation portion arranged to compare the ramp signal with the second voltage so as to generate the clock signal (twentieth structure).

In addition, in the DC-DC converter having the twentieth structure, it is preferred to arrange that the timing control unit generates the timing control signal using the clock signal (twenty-first structure).

In addition, in the DC-DC converter having any one of the nineteenth to twenty-first structures, it is preferred to arrange that the switching output stage becomes an ON period when the analog signal is higher than at least one of the ramp signal and the inverted ramp signal, while it becomes an OFF period when the analog signal is lower than each of the ramp signal and the inverted ramp signal (twenty-second structure).

In addition, in the DC-DC converter having any one of the nineteenth to twenty-first structures, it is possible to arrange that the switching output stage becomes an ON period when the analog signal is higher than each of the ramp signal and the inverted ramp signal, while it becomes an OFF period when the analog signal is lower than at least one of the ramp signal and the inverted ramp signal twenty-third structure).

In addition, the DC-DC converter having any one of the sixteenth to twenty-third structures preferably further includes an error amplifier arranged to generate an error signal corresponding to a difference between the output voltage or a feedback voltage corresponding to the output voltage and a predetermined reference voltage, and a differential amplifier arranged to generate the analog signal according to a difference between the error signal and the current sense signal (twenty-fourth structure).

In addition, the DC-DC converter having the twenty-fourth structure preferably further includes a damper arranged to limit the error signal to have a predetermined upper limit value or lower, or to have a predetermined lower limit value or higher (twenty-fifth structure).

In addition, the DC-DC converter having the twenty-fourth or twenty-fifth structure preferably further includes a light load detection comparator arranged to compare the error signal with a predetermined threshold value so as to control to enable or disable the switching output stage (twenty-sixth structure).

In addition, the DC-DC converter disclosed in this specification samples coil current of a switching output stage at the midpoint of an ON period or an OFF period of the switching output stage, and performs current-mode control output feedback control using a current sense signal corresponding to the sampled value so as to generate a desired output voltage from an input voltage (twenty-seventh structure).

Note that the DC-DC converter having the twenty-seventh structure is preferably arranged to perform the current-mode control output feedback control by supplying the current sense signal or a signal obtained by performing a predetermined computing process on the current sense signal and a signal having error information of the output voltage to an amplifier or a comparator (twenty-eighth structure).

In addition, the DC-DC converter having the twenty-seventh structure may be arranged to perform the current-mode control output feedback control by performing addition or subtraction between the current sense signal and the signal having error information of the output voltage so as to supply its result to an amplifier or a comparator (twenty-ninth structure).

In addition, the DC-DC converter having the twenty-seventh structure may be arranged to monitor the current sense signal, so as to control to enable or disable the switching output stage according to a comparison result between the monitored current sense signal and a predetermined threshold value (thirtieth structure).

In addition, the DC-DC converter having the twenty-eighth or twenty-ninth structure is preferably arranged to clamp a signal to be added to or subtracted from the current sense signal, or a signal to be differentiated from or compared with the current sense signal by the amplifier or the comparator, so as to perform overcurrent protection or negative current protection of the coil current (thirty-first structure).

In addition, the DC-DC converter having the twenty-eighth or twenty-ninth structure may be arranged to monitor a signal to be added to or subtracted from the current sense signal, or a signal to be differentiated from or compared with the current sense signal by the amplifier or the comparator, so as to control to enable or disable the switching output stage according to a comparison result between the monitored current sense signal and a predetermined threshold value (thirty-second structure).

In addition, the DC-DC converter having any one of the twenty-seventh to thirty-second structures preferably includes a current detecting portion arranged to sample the coil current at a timing corresponding to a timing control signal so as to generate the current sense signal, and a timing control unit arranged to generate the timing control signal so that the coil current is sampled at the midpoint of an ON period or an OFF period of the switching output stage (thirty-third structure).

In addition, the DC-DC converter having the thirty-third structure preferably includes an error amplifier arranged to generate an error signal corresponding to a difference between the output voltage or a feedback voltage corresponding to the output voltage and a predetermined reference voltage, an oscillator arranged to generate a ramp signal at a predetermined switching period, a differential amplifier arranged to generate an analog signal corresponding to a difference between the error signal and the current sense signal, a comparator arranged to compare the analog signal with the ramp signal so as to generate a comparison signal, a driver arranged to generate a drive signal for the switching output stage according to the comparison signal (thirty-fourth structure).

In addition, the DC-DC converter having the thirty-fourth structure preferably further includes a damper arranged to limit the error signal to have a predetermined upper limit value or lower, or to have a predetermined lower limit value or higher (thirty-fifth structure).

In addition, the DC-DC converter having the thirty-fourth or thirty-fifth structure preferably further includes a light load detection comparator arranged to compare the error signal with a predetermined threshold value so as to control to enable or disable the switching output stage (thirty-sixth structure).

In addition, the DC-DC converter disclosed in this specification includes a comparator arranged to compare a first analog signal with a first ramp signal so as to generate a control signal for a switching output stage, a current detecting portion arranged to sample coil current of the switching output stage at a timing corresponding to a timing control signal so as to generate a current sense signal, and a timing control unit arranged to generate the timing control signal so that the coil current is sampled at the midpoint of an ON period or an OFF period of the switching output stage using a second ramp signal having a slew rate that is twice that of the first ramp signal, in which the DC-DC converter performs current-mode control output feedback control using the current sense signal, so as to generate a desired output voltage from an input voltage (thirty-seventh structure).

Note that in the DC-DC converter having the thirty-seventh structure, it is preferred to arrange that the timing control unit compares the analog signal with the second ramp signal so as to generate the timing control signal (thirty-eighth structure).

In addition, in the DC-DC converter having the thirty-eighth structure, it is preferred to arrange that both the first ramp signal and the second ramp signal repeat increase and reset at the same switching period, and the switching output stage becomes an ON period when the analog signal is higher than the first ramp signal, while it becomes an OFF period when the analog signal is lower than the first ramp signal (thirty-ninth structure).

In addition, in the DC-DC converter having the thirty-eighth structure, both the first ramp signal and the second ramp signal may repeat increase and reset at the same switching period, and the switching output stage becomes an OFF period when the analog signal is higher than the first ramp signal, while it becomes an ON period when the analog signal is lower than the first ramp signal (fortieth structure).

In addition, in the DC-DC converter having the thirty-eighth structure, both the first ramp signal and the second ramp signal may repeat decrease and reset at the same switching period, and the switching output stage becomes an ON period when the analog signal is higher than the first ramp signal, while it becomes an OFF period when the analog signal is lower than the first ramp signal (forty-first structure).

In addition, in the DC-DC converter having the thirty-eighth structure, the second ramp signal may start to vary after a delay of half the switching period from a variation start time point of the first ramp signal (forty-second structure).

In addition, in the DC-DC converter having any one of the thirty-eighth to forty-second structures, it is preferred to arrange that the timing control unit compares the second ramp signal with an equivalent analog signal having the same information as the analog signal, instead of the analog signal (forty-third structure).

In addition, the DC-DC converter having any one of thirty-seventh to forty-third structures preferably further includes an error amplifier arranged to generate an error signal corresponding to a difference between the output voltage or a feedback voltage corresponding to the output voltage and a predetermined reference voltage, and a differential amplifier arranged to generate the analog signal according to a difference between the error signal and the current sense signal (forty-fourth structure).

In addition, the DC-DC converter having the forty-fourth structure preferably further includes a damper arranged to limit the error signal to have a predetermined upper limit value or lower, or to have a predetermined lower limit value or higher (forty-fifth structure).

In addition, the DC-DC converter having the forty-fourth or forty-fifth structure preferably further includes a light load detection comparator arranged to compare the error signal with a predetermined threshold value so as to control to enable or disable the switching output stage (forty-sixth structure).

<Other Variations>

Note that the step-down type or step-up/down type DC-DC converter is exemplified and described in the embodiments described above, but the structure of the present invention is not limited thereto and can also be applied to DC-DC converters adopting other output types (such as a step-up type or an inverting type).

In addition, other than the embodiments described above, various technical features disclosed in this specification can be variously modified without deviating from the spirit of the technical creation. For example, a bipolar transistor and a MOS field-effect transistor can be arbitrarily replaced with each other, and logical levels of various signals can be arbitrarily inverted. In other words, the embodiments described above are merely examples in every aspect and should not be interpreted as limitations. The technical scope of the present invention is not limited by the embodiments described above and should be understood to include every modifications within meanings and scopes equivalent to the claims.

INDUSTRIAL APPLICABILITY

The DC-DC converter disclosed in this specification can be used as power supply means for various applications.

What is claimed is:

1. A DC-DC converter comprising:
    an oscillator configured to generate a ramp signal of a triangular waveform having the same slew rate for upward and downward changes;
    a comparator configured to compare an analog signal with the ramp signal so as to generate a control signal for a switching output stage;
    a current detecting portion configured to sample coil current of the switching output stage at a timing corresponding to a timing control signal so as to generate a current sense signal, and
    a timing control unit configured to generate the timing control signal so that the coil current is sampled at a timing when the ramp signal has a peak value or a bottom value,
    wherein the DC-DC converter performs current-mode control output feedback control using the current sense signal, so as to generate a desired output voltage from an input voltage.

2. The DC-DC converter according to claim 1, wherein the oscillator includes:
    a capacitor configured to be connected between an output terminal of the ramp signal and a constant potential terminal;
    a first current source configured to generate a predetermined charging current;
    a second current source configured to generate a discharging current equal to the charging current;
    a switch configured to switch between charging of the capacitor by the charging current and discharging by the discharging current according to a clock signal, and
    a clock signal generation portion configured to compare the ramp signal with the peak value and the bottom value so as to generate the clock signal.

3. The DC-DC converter according to claim 2, wherein the timing control unit is configured to generate the timing control signal using the clock signal.

4. The DC-DC converter according to claim 1, further comprising:
    an error amplifier configured to generate an error signal corresponding to a difference between the output voltage or a feedback voltage corresponding to the output voltage and a predetermined reference voltage, and
    a differential amplifier configured to generate the analog signal according to a difference between the error signal and the current sense signal.

5. The DC-DC converter according to claim 4, further comprising:

a damper configured to limit the error signal to have a predetermined upper limit value or lower, or to have a predetermined lower limit value or higher.

6. The DC-DC converter according to claim 4, further comprising:
a light load detection comparator arranged to compare the error signal with a predetermined threshold value so as to control to enable or disable the switching output stage.

7. A DC-DC converter comprising:
an oscillator configured to generate a ramp signal and an inverted ramp signal of sawtooth waveforms that repeat increase or decrease and reset at the same switching period with opposite polarities;
a first comparator and a second comparator configured to compare an analog signal with the ramp signal and the inverted ramp signal so as to generate a first comparison signal and a second comparison signal, respectively;
a logical arithmetic unit configured to generate a control signal for a switching output stage by logical operation using the first comparison signal and the second comparison signal;
a current detecting portion configured to sample coil current of the switching output stage at a timing corresponding to a timing control signal so as to generate a current sense signal, and
a timing control unit configured to generate the timing control signal so that the coil current is sampled at a reset timing of the ramp signal and the inverted ramp signal,
wherein the DC-DC converter performs current-mode control output feedback control using the current sense signal, so as to generate a desired output voltage from an input voltage.

8. The DC-DC converter according to claim 7, wherein the oscillator includes:
a first capacitor configured to be connected between an output terminal of the ramp signal and an application terminal of a first voltage;
a second capacitor configured to be connected between an application terminal of a second voltage different from the first voltage and an output terminal of the inverted ramp signal;
a first current source and a second current source configured to generate charging currents for the first capacitor and the second capacitor, respectively,
a first switch and a second switch configured to respectively discharge the first capacitor and the second capacitor according to a clock signal, and
a clock signal generation portion configured to compare the ramp signal with the second voltage so as to generate the clock signal.

9. The DC-DC converter according to claim 8, wherein the timing control unit generates the timing control signal using the clock signal.

10. The DC-DC converter according to claim 7, wherein the switching output stage becomes an ON period when the analog signal is higher than at least one of the ramp signal and the inverted ramp signal, while it becomes an OFF period when the analog signal is lower than each of the ramp signal and the inverted ramp signal.

11. The DC-DC converter according to claim 7, wherein the switching output stage becomes an ON period when the analog signal is higher than each of the ramp signal and the inverted ramp signal, while it becomes an OFF period when the analog signal is lower than at least one of the ramp signal and the inverted ramp signal.

* * * * *